(12) United States Patent
Ohashi et al.

(10) Patent No.: US 9,336,610 B2
(45) Date of Patent: May 10, 2016

(54) INFORMATION PROCESSING DEVICE, METHOD, AND PROGRAM

(75) Inventors: Takeshi Ohashi, Tokyo (JP); Kohtaro Sabe, Tokyo (JP)

(73) Assignee: SONY CORPORATION, Tokyo (JP)

(*) Notice: Subject to any disclaimer, the term of this patent is extended or adjusted under 35 U.S.C. 154(b) by 736 days.

(21) Appl. No.: 13/071,951

(22) Filed: Mar. 25, 2011

(65) Prior Publication Data

US 2011/0249863 A1    Oct. 13, 2011

(30) Foreign Application Priority Data

Apr. 9, 2010   (JP) .................................. 2010-090716

(51) Int. Cl.
  *G06K 9/00*   (2006.01)
  *G06T 11/00*  (2006.01)
  *H04N 1/62*   (2006.01)
  *G06T 7/00*   (2006.01)

(52) U.S. Cl.
  CPC .......... *G06T 11/001* (2013.01); *G06K 9/00234* (2013.01); *G06K 9/00308* (2013.01); *G06T 7/0081* (2013.01); *H04N 1/62* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 6,611,613 B1* | 8/2003 | Kang et al. | 382/118 |
| 6,690,822 B1* | 2/2004 | Chen et al. | 382/162 |
| 7,916,963 B2* | 3/2011 | Reid | G06T 5/009 345/590 |
| 2003/0053689 A1* | 3/2003 | Watanabe | G06T 5/004 382/167 |
| 2005/0025376 A1* | 2/2005 | Ishida | G06T 5/001 382/254 |
| 2005/0141762 A1* | 6/2005 | Zhao | G06K 9/00234 382/164 |
| 2006/0176400 A1* | 8/2006 | Shimizu | G06T 7/408 348/570 |
| 2006/0232684 A1* | 10/2006 | Miki | H04N 9/735 348/223.1 |
| 2006/0274936 A1* | 12/2006 | Ohkubo et al. | 382/167 |
| 2007/0031032 A1* | 2/2007 | Oh | G06K 9/00234 382/167 |
| 2007/0031033 A1* | 2/2007 | Oh | G06K 9/00228 382/167 |
| 2007/0133024 A1* | 6/2007 | Kang | G06T 11/001 358/1.9 |
| 2007/0211315 A1* | 9/2007 | Fuji | H04N 1/62 358/518 |
| 2007/0258627 A1* | 11/2007 | Geng | 382/118 |
| 2007/0274573 A1* | 11/2007 | Hori | G06K 9/00234 382/118 |

(Continued)

FOREIGN PATENT DOCUMENTS

| | | |
|---|---|---|
| JP | 2000-311248 | 11/2000 |
| JP | 2009-223500 | 10/2009 |

Primary Examiner — Aaron W Carter
(74) Attorney, Agent, or Firm — Hazuki International, LLC

(57) ABSTRACT

An information processing device includes a face detection unit that detects a face area from a target image, a feature point detection unit that detects a feature point of the detected face area, a determination unit that determines an attention area that is an area to which attention is paid in the face area based on the detected feature point, a reference color extraction unit that extracts a reference color that is color setting obtained from the target image in the determined attention area, an adjustment unit that adjusts the extracted reference color to a color setting for a modified image generated from the target image as a base, and a generation unit that generates the modified image from the target image by drawing the attention area using the color setting for the modified image.

16 Claims, 43 Drawing Sheets

(56) References Cited

U.S. PATENT DOCUMENTS

| | | | | |
|---|---|---|---|---|
| 2008/0025577 A1* | 1/2008 | Kugo | ............... | G06K 9/00234 382/118 |
| 2008/0232692 A1* | 9/2008 | Kaku | ............... | G06K 9/00362 382/190 |
| 2009/0067682 A1* | 3/2009 | Ohk et al. | ............... | 382/118 |
| 2009/0316168 A1* | 12/2009 | Enjuji | ............... | G06K 9/00234 358/1.9 |
| 2011/0249863 A1* | 10/2011 | Ohashi | ............... | G06T 7/0081 382/103 |
| 2012/0019879 A1* | 1/2012 | Aronoff et al. | ............... | 358/505 |
| 2013/0343647 A1* | 12/2013 | Aoki | ............... | H04N 1/62 382/165 |
| 2014/0064617 A1* | 3/2014 | Kafuku | ............... | G06T 11/00 382/170 |
| 2015/0169939 A1* | 6/2015 | Kim | ............... | G06K 9/00234 382/167 |

* cited by examiner

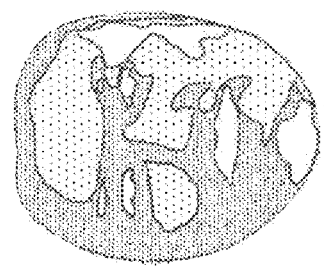
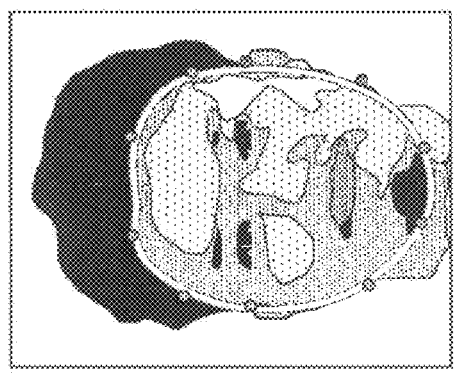
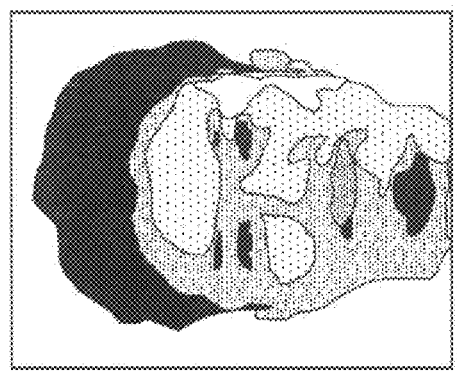
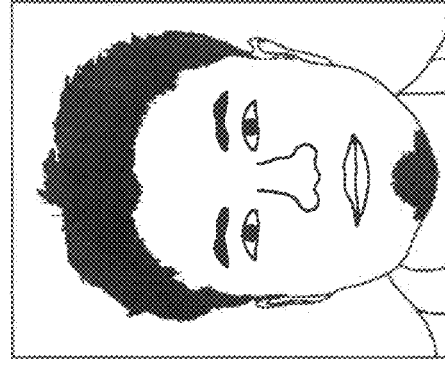

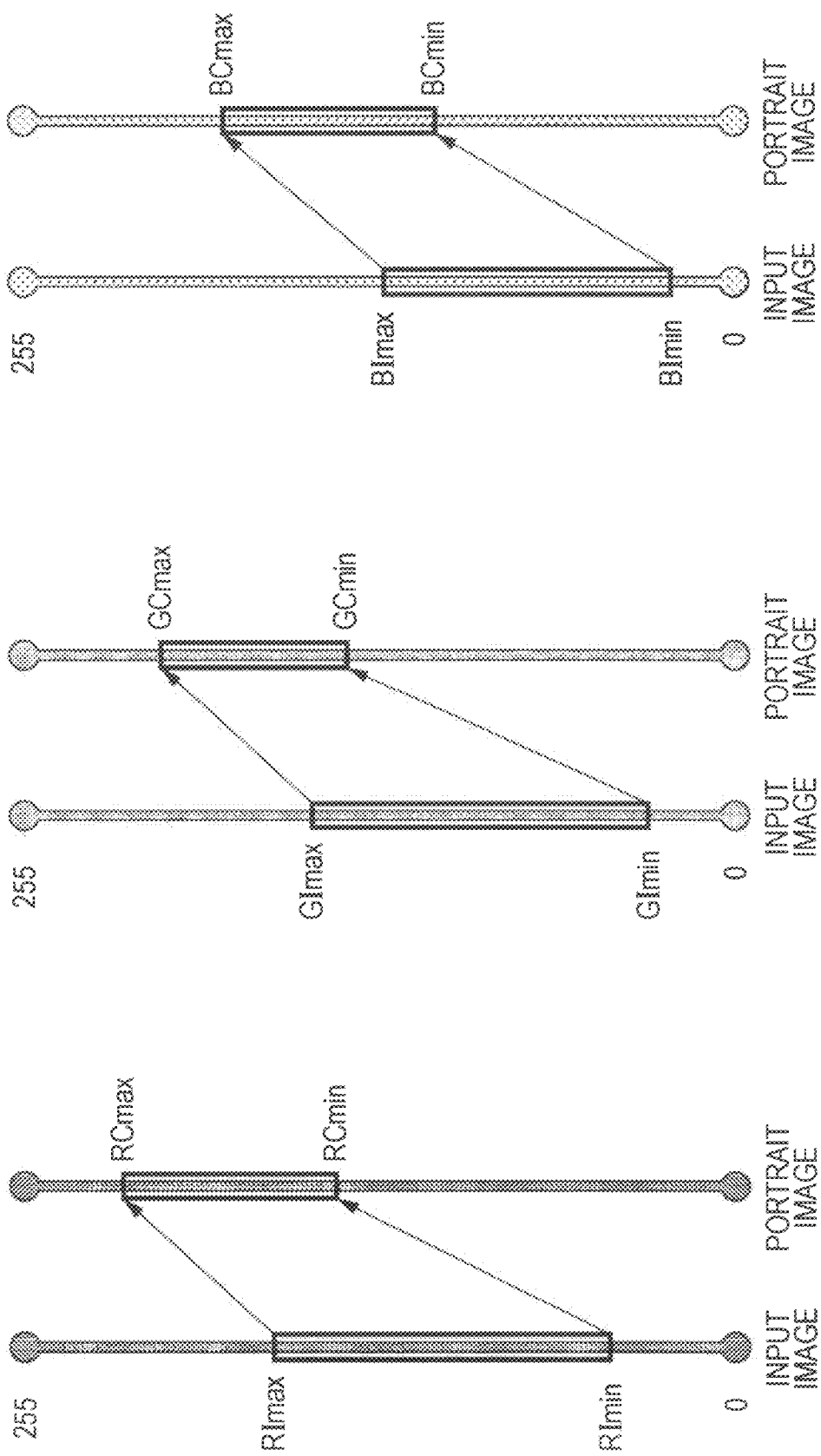

FIG. 8A

| VALUE IN REFERENCE COLOR | R VALUE | | G VALUE | | B VALUE | |
|---|---|---|---|---|---|---|
| | RImin | RImax | GImin | GImax | BImin | BImax |
| | 90 | 170 | 60 | 140 | 40 | 120 |

FIG. 8B

| VALUE IN PORTRAIT IMAGE | R VALUE | | G VALUE | | B VALUE | |
|---|---|---|---|---|---|---|
| | ROmin | ROmax | GOmin | GOmax | BOmin | BOmax |
| | 217 | 255 | 191 | 231 | 172 | 212 |

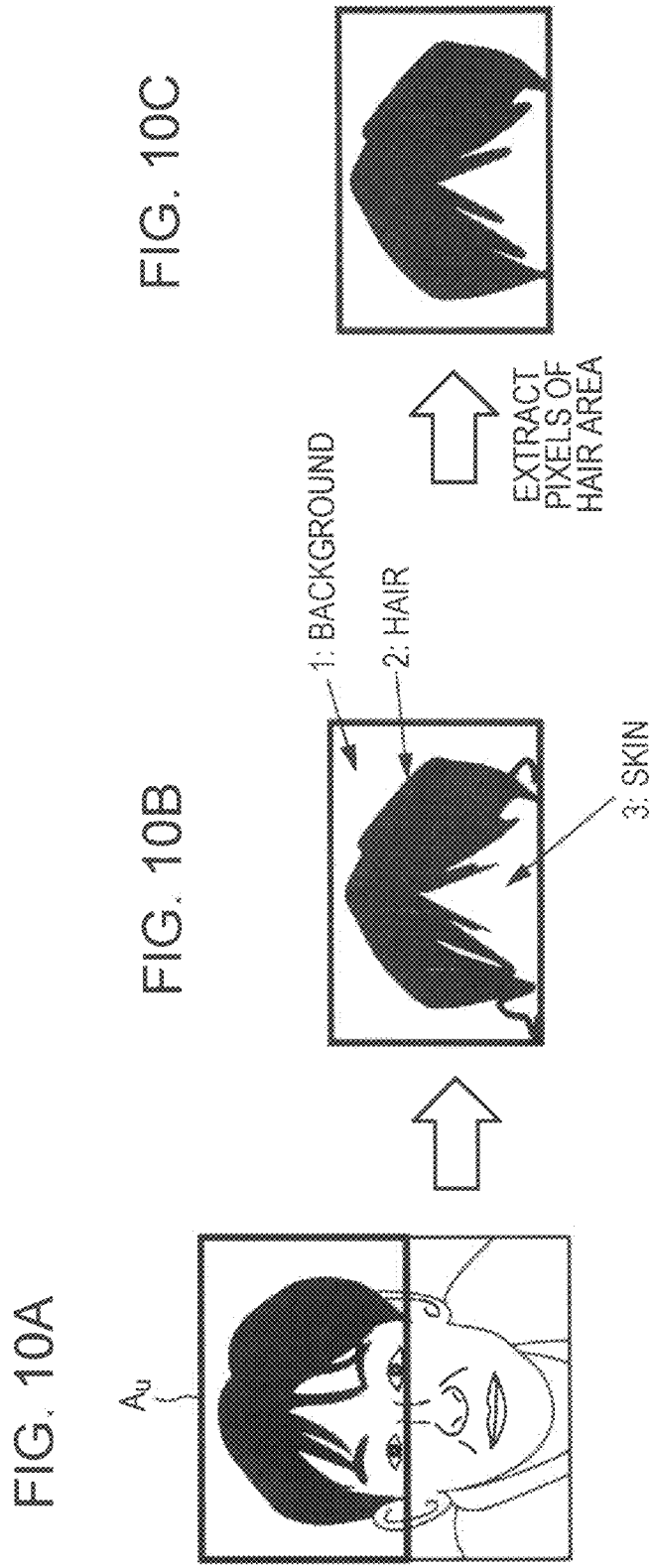

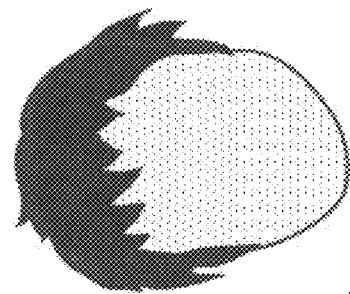
FIG. 11B
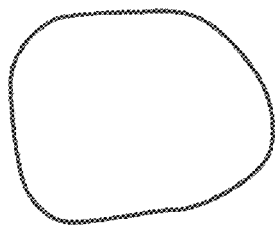
FIG. 11A
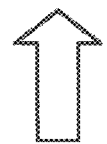
⇧ SPLINED CURVE INTERPOLATION
FIG. 11D
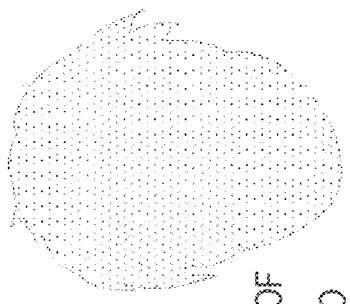
⇧ FILL ONLY HAIR AREA WITH HAIR COLOR SUBJECTED TO ADJUSTMENT OF COLOR ADJUSTMENT SETTING
FIG. 11C
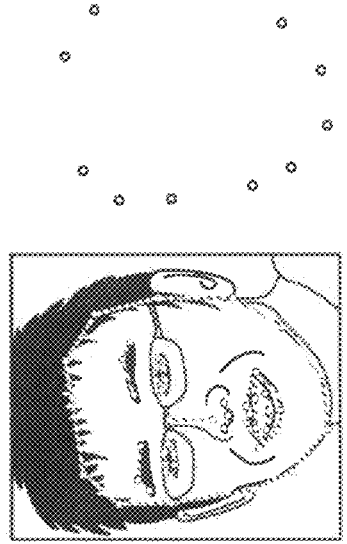
⇧ FILL HAIR AREA AND INSIDE OF FACE OUTLINE AREA WITH SKIN COLOR SUBJECTED TO ADJUSTMENT OF COLOR ADJUSTMENT SETTING

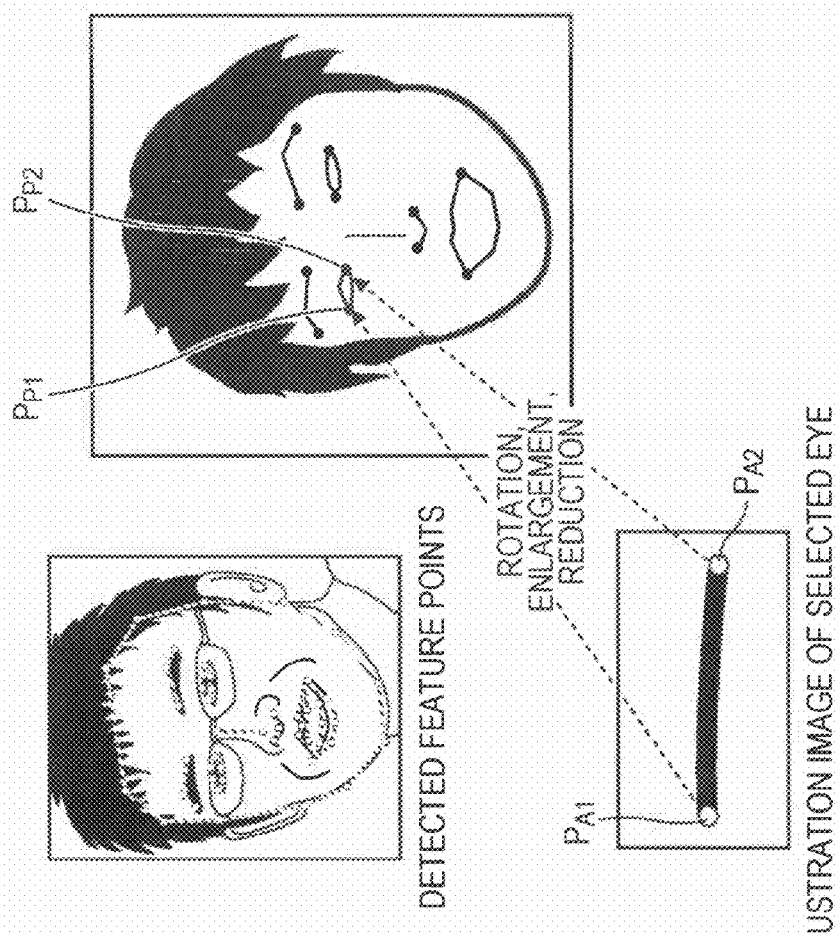

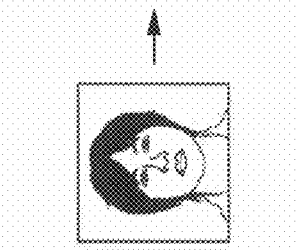
FIG. 16A
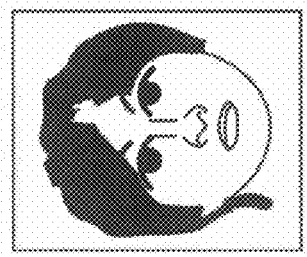
FIG. 16B
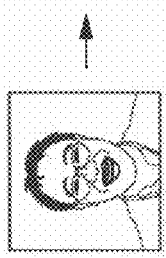
FIG. 16C
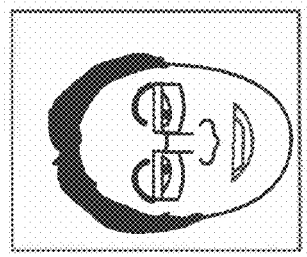
FIG. 16D
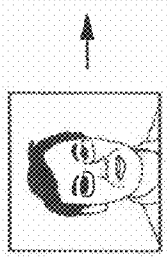
FIG. 16E
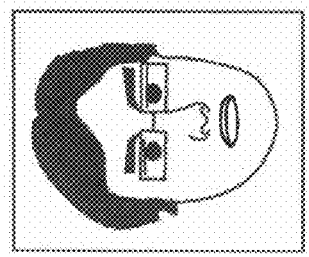
FIG. 16F
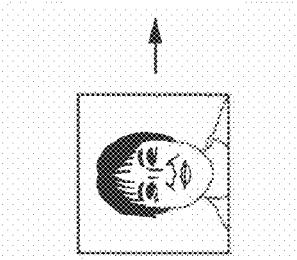
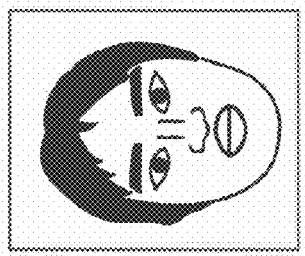
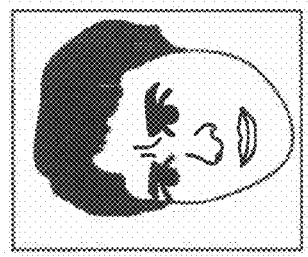
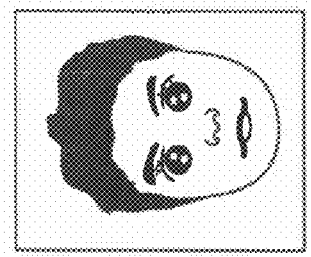

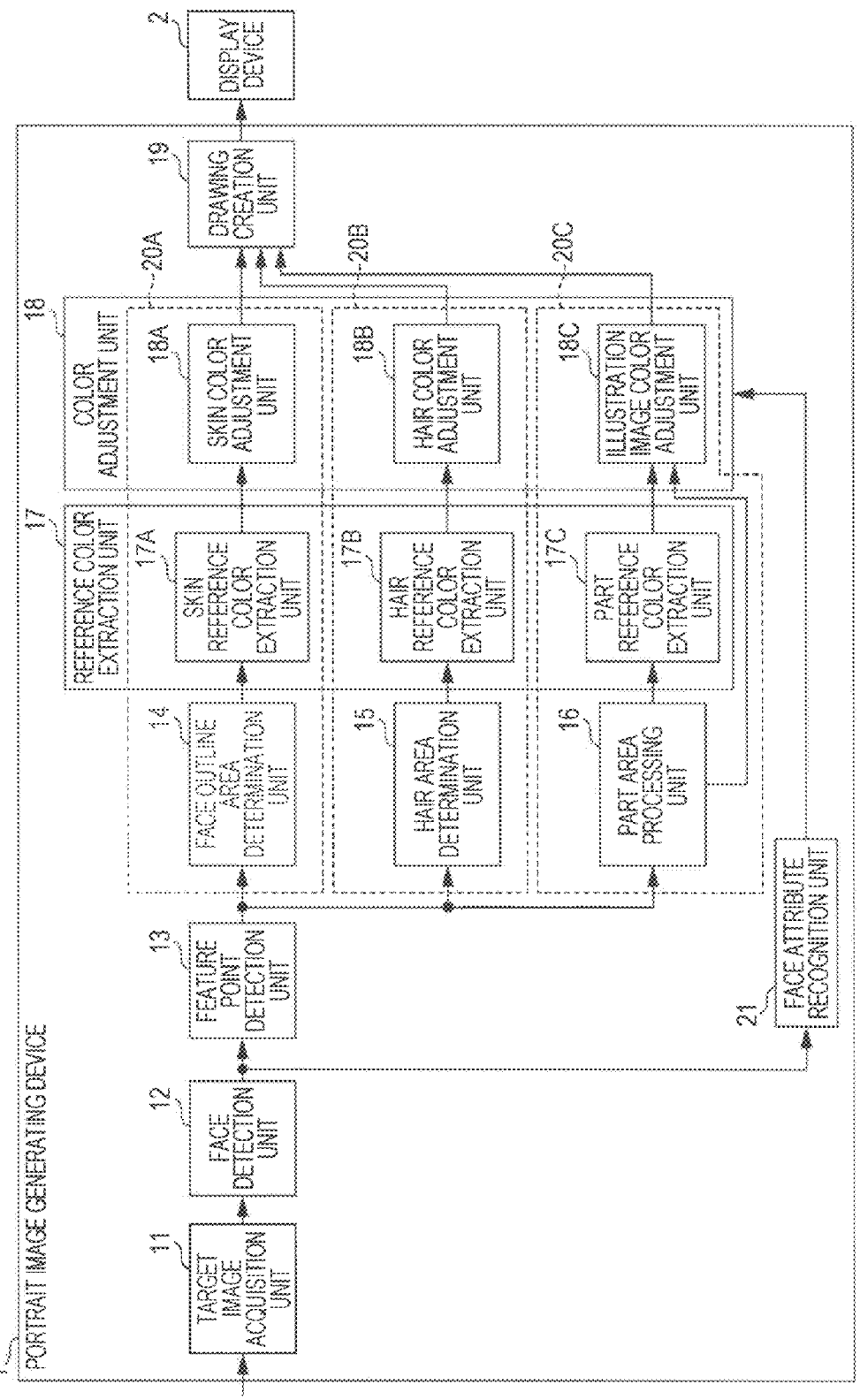

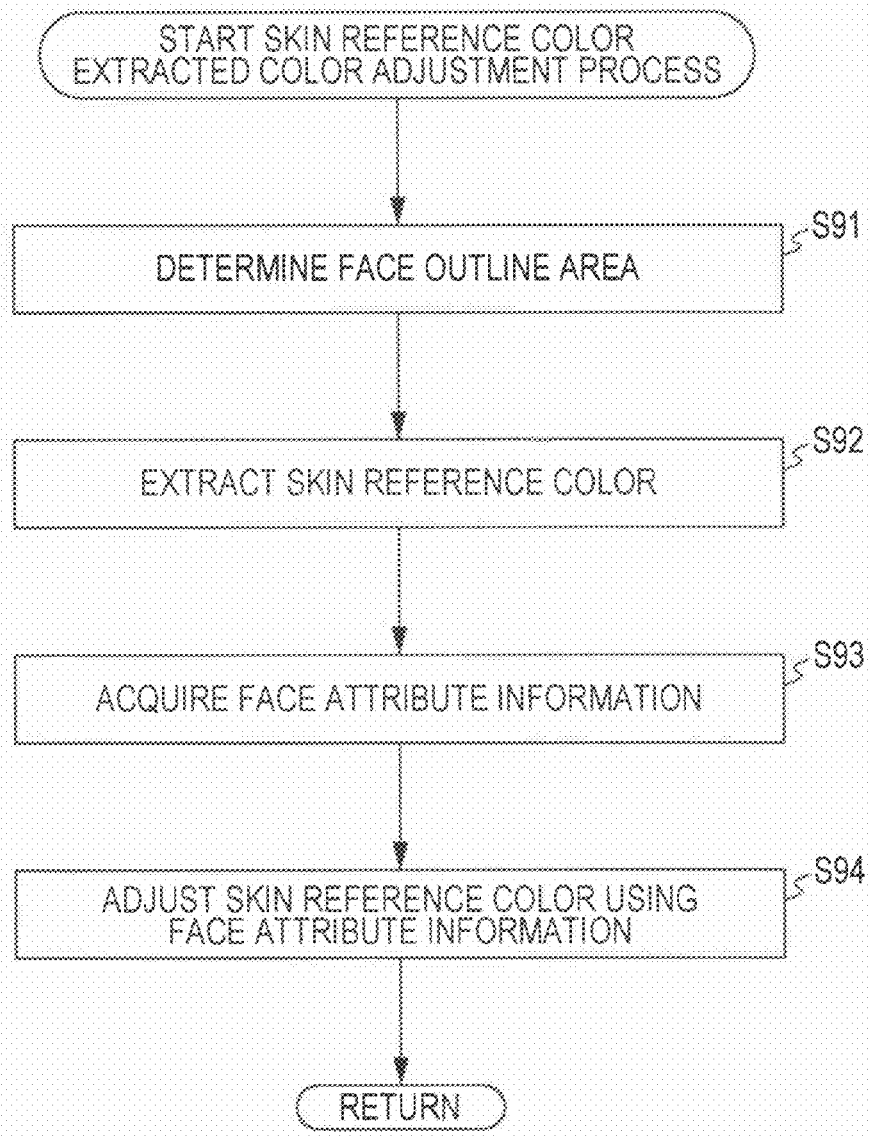

FIG. 20A

| | R VALUE | | G VALUE | | B VALUE | | AVERAGE COLOR |
|---|---|---|---|---|---|---|---|
| | RCmin | RCmax | GCmin | GCmax | BCmin | BCmax | |
| BASE SETTING | 217 | 255 | 191 | 231 | 172 | 212 | |
| WOMAN | 227 | 255 | 214 | 254 | 205 | 245 | |
| MAN | 197 | 237 | 142 | 182 | 101 | 141 | |

FIG. 20B

| | R VALUE | | G VALUE | | B VALUE | | AVERAGE COLOR |
|---|---|---|---|---|---|---|---|
| | RCmin | RCmax | GCmin | GCmax | BCmin | BCmax | |
| BASE SETTING | 217 | 255 | 191 | 231 | 172 | 212 | |
| SMILING FACE | 220 | 255 | 171 | 211 | 170 | 210 | |
| DEPRESSED | 177 | 217 | 212 | 252 | 213 | 253 | |

FIG. 21A
(a) INDOOR IMAGE
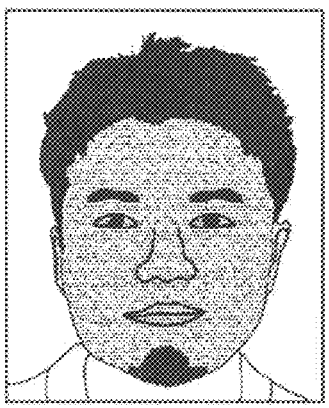
(b) SELECTED SKIN COLOR AREA
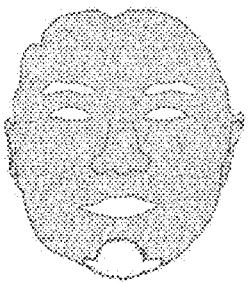
(c) SKIN COLOR AND RGB VALUES
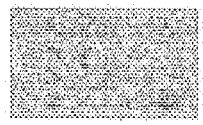
R 131
G 62
B 32
FIG. 21B
(a) OUTDOOR IMAGE
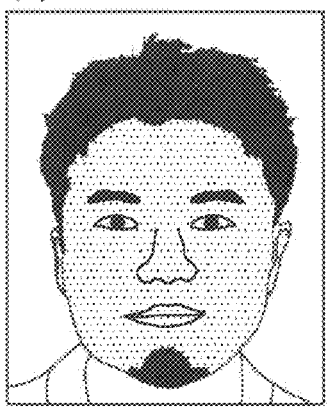
(b) SELECTED SKIN COLOR AREA
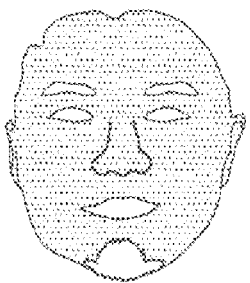
(c) SKIN COLOR AND RGB VALUES
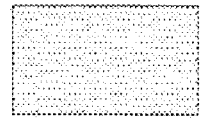
R 175
G 138
B 132

FIG. 25

| | R VALUE | | G VALUE | | B VALUE | | AVERAGE COLOR |
|---|---|---|---|---|---|---|---|
| | Rlmin | Rlmax | Glmin | Glmax | Blmin | Blmax | |
| OUTDOOR | 155 | 195 | 118 | 158 | 112 | 152 | |
| INDOOR | 111 | 151 | 42 | 82 | 12 | 52 | |

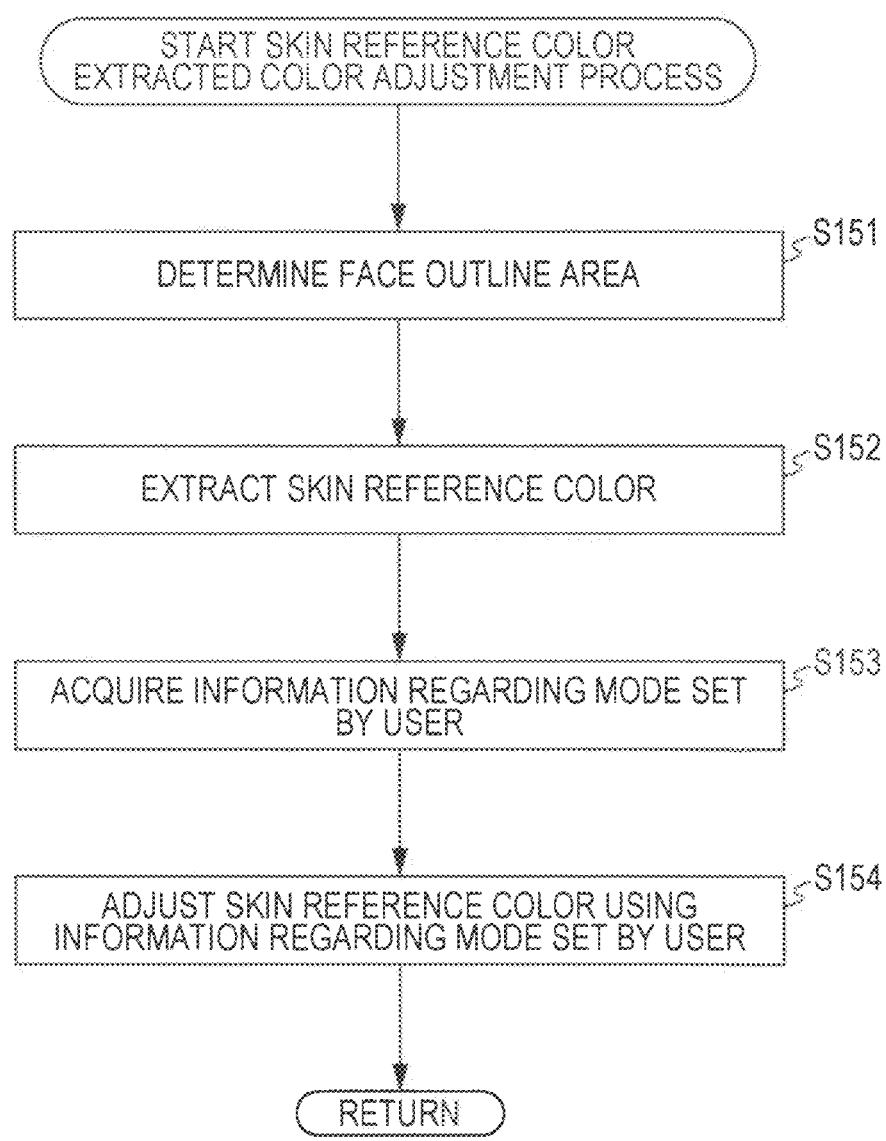

FIG. 31

| | R VALUE | | | G VALUE | | | | B VALUE | | | |
|---|---|---|---|---|---|---|---|---|---|---|---|
| | RImin | RImax | RCmin | RCmax | GImin | GImax | GCmin | GCmax | BImin | BImax | BCmin | BCmax |
| DEFAULT SETTING | 90 | 170 | 217 | 255 | 60 | 140 | 191 | 231 | 40 | 120 | 172 | 212 |
| WOMAN | 90 | 170 | 227 | 255 | 60 | 140 | 214 | 254 | 40 | 120 | 205 | 245 |
| MAN | 90 | 170 | 197 | 237 | 60 | 140 | 142 | 182 | 40 | 120 | 101 | 141 |
| OUTDOOR | 155 | 195 | 217 | 255 | 118 | 158 | 191 | 231 | 112 | 152 | 172 | 212 |
| INDOOR | 111 | 151 | 217 | 255 | 42 | 82 | 191 | 231 | 12 | 52 | 172 | 212 |

FIG. 41
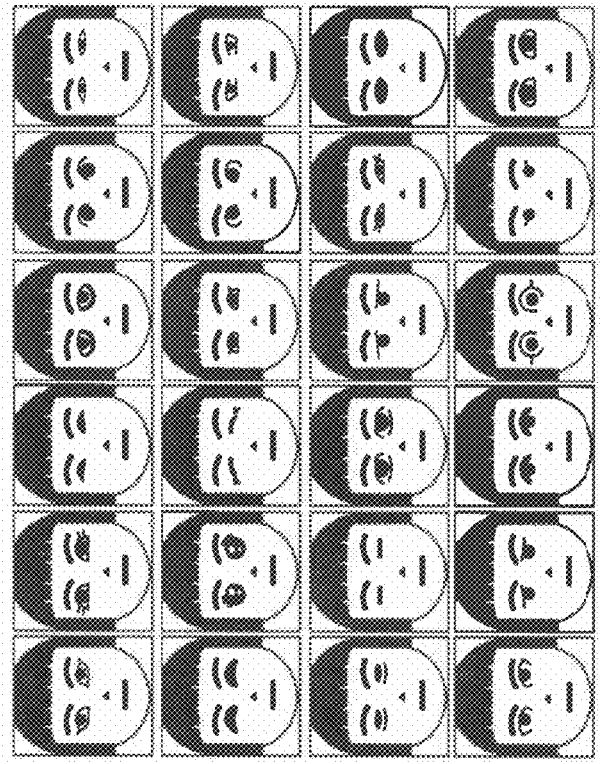
ILLUSTRATION IMAGE
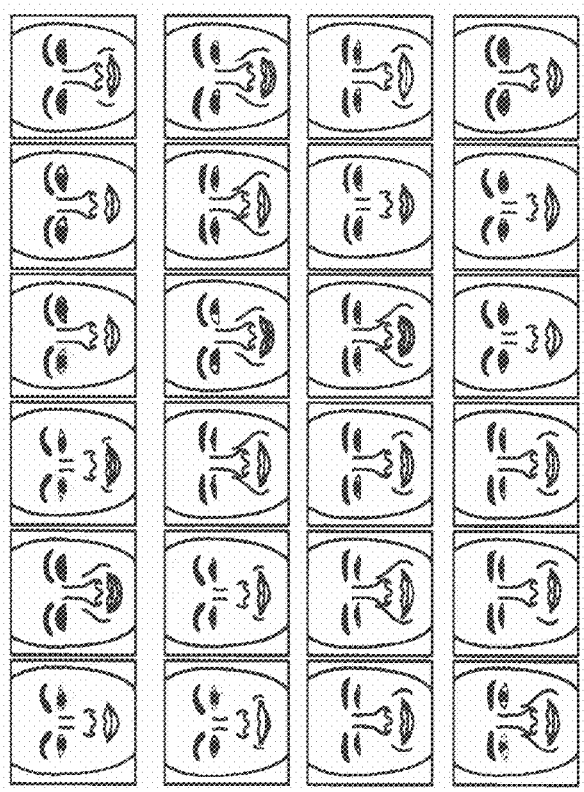
MODEL IMAGE

INFORMATION PROCESSING DEVICE, METHOD, AND PROGRAM

BACKGROUND OF THE INVENTION

1. Field of the Invention

The present invention relates to an information processing device, method, and program, particularly to an information processing device, method, and program that aim to enhance the expressiveness of portrait images.

2. Description of the Related Art

As the technology of face image recognition has been developing in recent years, a technology of generating a portrait image from a face image included in a captured image such as a photograph or the like has come into practical use.

When it comes to the generation of such portrait images, various methods are suggested in order to make the images closer to the original face images.

For example, Japanese Unexamined Patent Application Publication No. 2009-223500 discloses that, when an image is to be processed which has been obtained by replacing the face of a subject in a contributed photographic image with a portrait, outlines are drawn based on specific edges of the face or the hair of the head, and colors close to the original photographic image are set, in order not to disclose the photographic image of a person as it is (particularly, paragraph 0039 of Japanese Unexamined Patent Application Publication No. 2009-223500).

In addition, Japanese Unexamined Patent Application Publication No. 2000-311248 discloses that the skin color is extracted by using pixel values in the area around the nose based on coordinates of the right eye, the left eye and the mouth, and the information of the skin color is used in the latter process when a portrait image is created from an input image (particularly, paragraph 0172 of Japanese Unexamined Patent Application Publication No. 2000-311248).

SUMMARY OF THE INVENTION

However, in the technologies of the related art, there is a problem in that there is a possibility that unsuitable colors will be used in generating portrait images depending on the capturing conditions of the captured images.

In other words, Japanese Unexamined Patent Application Publication No. 2009-223500 states that colors close to the original photographic image are to be set for the color of the skin and the hair, but there is a case where an unsuitable color is used depending on the capturing conditions.

In addition, Japanese Unexamined Patent Application Publication No. 2000-311248 states that the average value of the pixel values around the nose and the value around the center value are used, but there is a case where an unsuitable color is used depending on the capturing conditions. Furthermore, there is a possibility that the influence of an area that is inappropriate for deciding a color, such as shadows of the lips, nose and the like, may arise.

The present invention takes the above circumstances into consideration, and it is desirable for the invention to generate a portrait image with colors adjusted suitably and without awkwardness, thereby enhancing the expressiveness of the portrait image.

According to an embodiment of the present invention, an information processing device includes a face detection unit that detects a face area from a target image, a feature point detection unit that detects a feature point of the detected face area, a determination unit that determines an attention area that is an area to which attention is paid in the face area based on the detected feature point, a reference color extraction unit that extracts a reference color that is color setting obtained from the target image in the determined attention area, an adjustment unit that adjusts the extracted reference color to a color setting for a modified image generated from the target image as a base, and a generation unit that generates the modified image from the target image by drawing the attention area using the color setting for the modified image.

The attention area may be composed of a face outline area, a hair area, and a part area including a predetermined part, the reference color extraction unit may extract a reference color in the face outline area, the hair area, and the part area, the adjustment unit may adjust each grayscale of the extracted reference color to the grayscales in the color setting for the modified image according to a predetermined grayscale converting condition, and the generation unit may draw the face outline area, the hair area, and the part area by each of the grayscales in the color setting for the modified image.

The adjustment unit may adjust each of the grayscales of the extracted reference color to the grayscale in the color setting for the modified image according to the grayscale converting condition based on the face attribute information of which the attributes are obtained from the face area.

The adjustment unit may adjust each of the grayscales of the extracted reference color to the grayscale in the color setting for the modified image according to the grayscale converting condition based on illumination information regarding an illumination state obtained from the target image or information added to the target image.

The adjustment unit may adjust each of the extracted reference color to the color setting for the modified image based on the face attribute information that is information regarding the attributes of a face or illumination information regarding an illumination state set by a user.

The information processing device includes a discrimination unit that discriminates a model image to be similar to a part image in the part area from among model images corresponding to modified part images expressed by modifying the part, and a selection unit that selects the modified part image corresponding to the model image according to the discrimination result, the adjustment unit adjusts the grayscale of the color setting for the selected modified part image to the grayscale in the color setting for the modified image, and the generation unit draws the modified part image of which the grayscale is adjusted.

The target image may be a captured image, the modified image may be a portrait image obtained by expressing a face image in a detected face area by a picture, and the modified part image may be an illustration image obtained by expressing the part by a picture.

The information processing device further includes a display unit that displays the generated modified image.

According to another embodiment of the invention, an information processing method includes the steps performed by an information processing device of detecting a face area from a target image, detecting a feature point of the detected face area, determining an attention area that is an area to which attention is paid in the face area based on the detected feature point, extracting a reference color that is a color setting obtained from the target image in the determined attention area, adjusting the extracted reference color to the color setting for a modified image generated from the target image as a base, and generating the modified image from the target image by drawing the attention area using the color setting for the modified image.

According to still another embodiment of the invention, there is provided a program that causes a computer to function as a face detection unit that detects a face area from a target image, a feature point detection unit that detects a feature point of the detected face area, a determination unit that determines an attention area that is an area to which attention is paid in the face area based on the detected feature point, a reference color extraction unit that extracts a reference color that is color setting obtained from the target image in the determined attention area, an adjustment unit that adjusts the extracted reference color to a color setting for a modified image generated from the target image as a base, and a generation unit that generates the modified image from the target image by drawing the attention area using the color setting for the modified image.

In an information processing device and method and a program according to the embodiments of the invention, a face area is detected from a target image, a feature point of the detected face area is detected, an attention area that is an area to which attention is paid in the face area is determined based on the detected feature point, a reference color that is a color setting obtained from the target image in the determined attention area is extracted, the extracted reference color is adjusted to the color setting for a modified image, the attention area is drawn by using the color setting for the modified image, and a modified image is generated from the target image.

As above, according to an embodiment of the invention, the expressiveness of a portrait image can be enhanced.

BRIEF DESCRIPTION OF THE DRAWINGS

FIGS. 6A to 6D are diagrams illustrating details of a process for extracting the skin reference color from an input image;

FIGS. 7A to 7C are diagrams illustrating the principle of converting the reference color obtained from the input image into the color of a portrait image;

FIGS. 8A and 8B are diagram showing an example of specific numerical values of a color adjustment setting of the skin color;

FIGS. 10A to 10C are diagrams illustrating the details of a hair area extraction process;

FIGS. 11A to 11D are diagrams illustrating the details of a drawing process;

FIGS. 15A and 15B are diagrams illustrating the details of an illustration image drawing process;

FIGS. 16A to 16F are diagrams illustrating examples of portrait images;

FIG. 17 is a diagram showing the composition of an embodiment of a portrait image generating device to which the present invention is applied;

FIG. 18 is a flowchart describing the details of a skin reference color extracted color adjustment process;

FIGS. 20A and 20B are diagrams showing specific values of the color adjustment setting using the face attribute information;

FIGS. 21A and 21B are schematic diagrams showing examples of skin colors that change according to capturing conditions;

FIG. 25 is a diagram showing an example of values of color adjustment setting according to illumination scores;

FIG. 28 is a flowchart describing the details of a skin reference color extracted color adjustment process;

FIG. 31 is a diagram showing an example of specific values of the color adjustment setting when a user adjusts the color adjustment setting;

FIG. 41 is a diagram showing corresponding examples of the model images and the illustration images of eyes;

DESCRIPTION OF THE PREFERRED EMBODIMENTS

Hereinbelow, exemplary embodiments of the present invention (hereinafter, referred to as embodiments) will be described. In addition, the description will be provided in the following order.

1. First Embodiment
2. Second Embodiment

3. Third Embodiment
4. Fourth Embodiment
5. Modified Example
6. Composition Example of Pre-processing device <1. First Embodiment>

First, the first embodiment of the present invention will be described with reference to FIGS. 1 to 16F.

[Composition Example of Portrait Image Generating Device]

Figure 1:
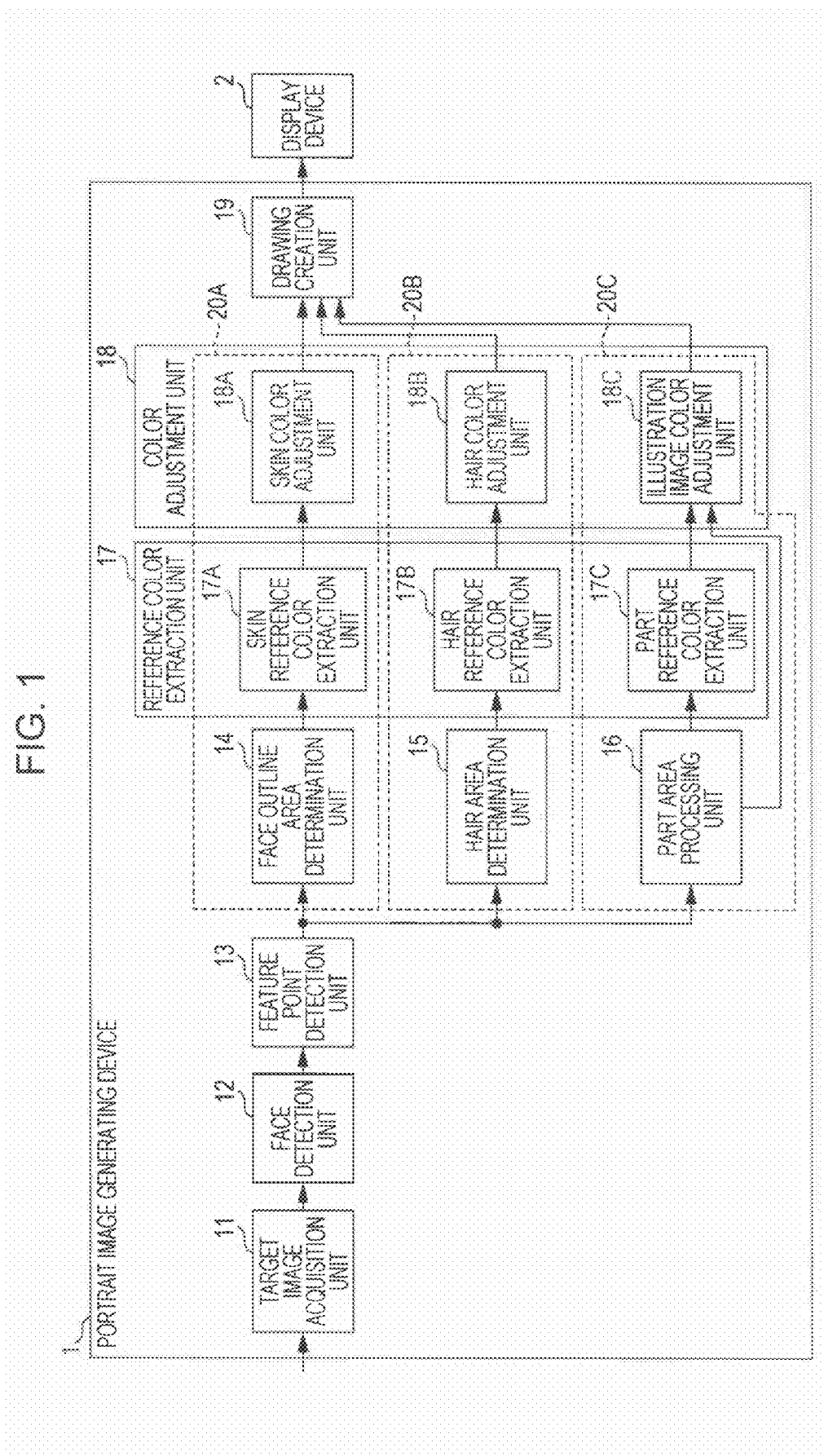
FIG. 1 is a diagram showing the composition of an embodiment of a portrait image generating device to which the present invention is applied.

FIG. 1 is a diagram showing the composition of an embodiment of a portrait image generating device to which the invention is applied.

The portrait image generating device 1 of FIG. 1 generates a modified image such as a portrait image, and the like from a target image (for example, an input image) including a face image, and causes a display device 2 such as Liquid Crystal Display (LCD), or the like to display the image on the screen thereof.

The portrait image generating device 1 is constituted by a target image acquisition unit 11, a face detection unit 12, a feature point detection unit 13, a face outline area determination unit 14, a hair area determination unit 15, a part area processing unit 16, a reference color extraction unit 17, a color adjustment unit 18, and a drawing creation unit 19 as shown in FIG. 1.

The target image acquisition unit 11 acquires an input image input as a target image and supplies the image to the face detection unit 12.

When the target image acquisition unit 11 is a camera unit constituted by imaging devices such as a lens, charge coupled devices (CCD), complementary metal oxide semiconductors (CMOS), or the like, the target image is an image captured by the camera unit. In addition, the target image may be acquired by reading image data recorded on a recording medium such as a memory care or the like, or acquired from equipment connected to a network such as the Internet, or the like via a network. In other words, the target image may be an image including a face image, and the acquiring method is arbitrary.

The face detection unit 12 makes the input image supplied from the target image acquisition unit 11 be subjected to a predetermined image process for detecting the face area and supplies information pertaining to the face image in thus-obtained face area to the feature point detection unit 13.

The feature point detection unit 13 makes the face image in the face area supplied from the face detection unit 12 be subjected to a predetermined image process in order to detect feature points for specifying organs (parts) such as eyes, eyebrows, nose, mouth, and the like and outlines, and supplies information pertaining to thus-obtained feature points to the face outline area determination unit 14, the hair area determination unit 15, and the part area processing unit 16.

The face outline area determination unit 14 determines the inner area of the face outline (hereinafter, referred to as a face outline area) based on the information pertaining to the feature points supplied from the feature point detection unit 13, and supplies the determined result to the reference color extraction unit 17.

The hair area determination unit 15 determines the area of hair in the face (hereinafter, referred to as a hair area) based on the information pertaining to the feature points supplied from the feature point detection unit 13, and supplies the determined result to the reference color extraction unit 17.

The part area processing unit 16 determines and extracts the area of each part (hereinafter, referred to as a part area) corresponding to a predetermined part such as eyes, eyebrows, nose, mouth, and the like in the face area based on the information pertaining to the feature points supplied from the feature point detection unit 13, and supplies the extracted result to the reference color extraction unit 17. In addition, the part area processing unit 16 selects an illustration image of eyes, eyebrows, nose, mouth, and the like corresponding to the extracted part area, and supplies the image to the color adjustment unit 18.

Furthermore, these face outline area, hair area, part area can be said as attention areas because attention is paid to the areas in the face area. In addition, the details of the part area processing unit 16 will be described later with reference to FIG. 2.

The reference color extraction unit 17 is constituted by a skin reference color extraction unit 17A, a hair reference color extraction unit 17B, and a part reference color extraction unit 17C. In addition, corresponding to each reference color extraction unit constituting the reference color extraction unit 17, the color adjustment unit 18 is constituted by a skin color adjustment unit 18A, a hair color adjustment unit 18B, and a illustration image color adjustment unit 18C.

The skin reference color extraction unit 17A is supplied with a result from the determination of the face outline area from the face outline area determination unit 14. The skin reference color extraction unit 17A extracts the skin reference color based on the face outline area determined by the face outline area determination unit 14, and supplies the extracted color to the skin color adjustment unit 18A.

The hair reference color extraction unit 17B is supplied with a result from the determination of the hair area from the hair area determination unit 15. The hair reference color extraction unit 17B extracts the hair reference color based on the hair area determined by the hair area determination unit 15 and supplies the extracted color to the hair color adjustment unit 18B.

The part reference color extraction unit 17C is supplied with an extracted result of the part area for each part from the part area processing unit 16. The part reference color extraction unit 17C extracts the part reference color for each part based on the part area of each part extracted by the part area processing unit 16, and supplies the extracted color to the illustration image color adjustment unit 18C.

Furthermore, in the embodiment, the "reference color" indicates color setting which is setting for colors obtained from the target image (input image). Then, description will be provided by collectively referring the reference color obtained from the face outline area to the "skin reference color", the reference color obtained from the hair area to the "hair reference color", and the reference color obtained from the part area to the "part reference color".

The skin color adjustment unit 18A adjusts the skin reference color in the face outline area supplied from the skin reference color extraction unit 17A to a color for portrait image (color setting) according to predetermined converting conditions, and supplies information obtained from the adjustment to a drawing creation unit 19.

The hair color adjustment unit 18B adjusts the hair reference color in the hair area supplied from the hair reference color extraction unit 17B to a color for portrait image (color setting) according to predetermined converting conditions, and supplies information obtained from the adjustment to the drawing creation unit 19.

The illustration image color adjustment unit 18C is supplied with the illustration images corresponding to each part from the part area processing unit 16 and the part reference color for each part from the part reference color extraction unit 17C. The illustration image color adjustment unit 18C adjusts the color of the corresponding illustration images to the color for the portrait image (color setting) based on predetermined converting conditions and each part reference color, and supplies information obtained from the adjustment to the drawing creation unit 19.

The drawing creation unit 19 is supplied with the information obtained from the adjustment of the color adjustment setting from the skin color adjustment unit 18A, the hair color adjustment unit 18B, and the illustration image color adjustment unit 18C.

Furthermore, in the description below, the corresponding relationship of color setting (color range) in the reference color obtained from the input image and color setting (color range) used in the portrait image will be referred to as "color adjustment setting".

The drawing creation unit 19 fills the union area of the face outline area and the hair area with the skin color subjected to the adjustment of the color adjustment setting based on the information pertaining to the face outline area and the hair area, and after that, fills the hair area with the hair color subjected to the adjustment of the color adjustment setting to draw an image formed only of the skin area and the hair area (hereinafter, referred to as a base image).

After that, the drawing creation unit 19 performs a predetermined process such as rotation, enlargement, reduction (re-sizing), or the like for the illustration images subjected to the adjustment of the color adjustment setting so that a part point and an anchor point defined based on anchor point defining information coincide with each other, and draws and arranges thus-obtained an illustration image on the base image to generate a portrait image. Furthermore, the anchor point defining information is information, for example, acquired from the part area processing unit 16, and will be described later in detail.

The portrait image generated as such is displayed on a display device 2 by the drawing creation unit 19.

Furthermore, for the sake of convenience in description below, the face outline area determination unit 14, the skin reference color extraction unit 17A, and the skin color adjustment unit 18A are referred to as a skin reference color extracted color adjustment unit 20A. In the same manner, the hair area determination unit 15, the hair reference color extraction unit 17B, and the hair color adjustment unit 18B are referred to as a hair reference color extracted color adjustment unit 20B, and the part area processing unit 16, the part reference color extraction unit 17C, and the illustration image color adjustment unit 18C are referred to as a part reference color extracted color adjustment unit 20C.

The portrait image generating device 1 of FIG. 1 is constituted as above.

[Composition Example of Part Area Processing Area]

Figure 2:
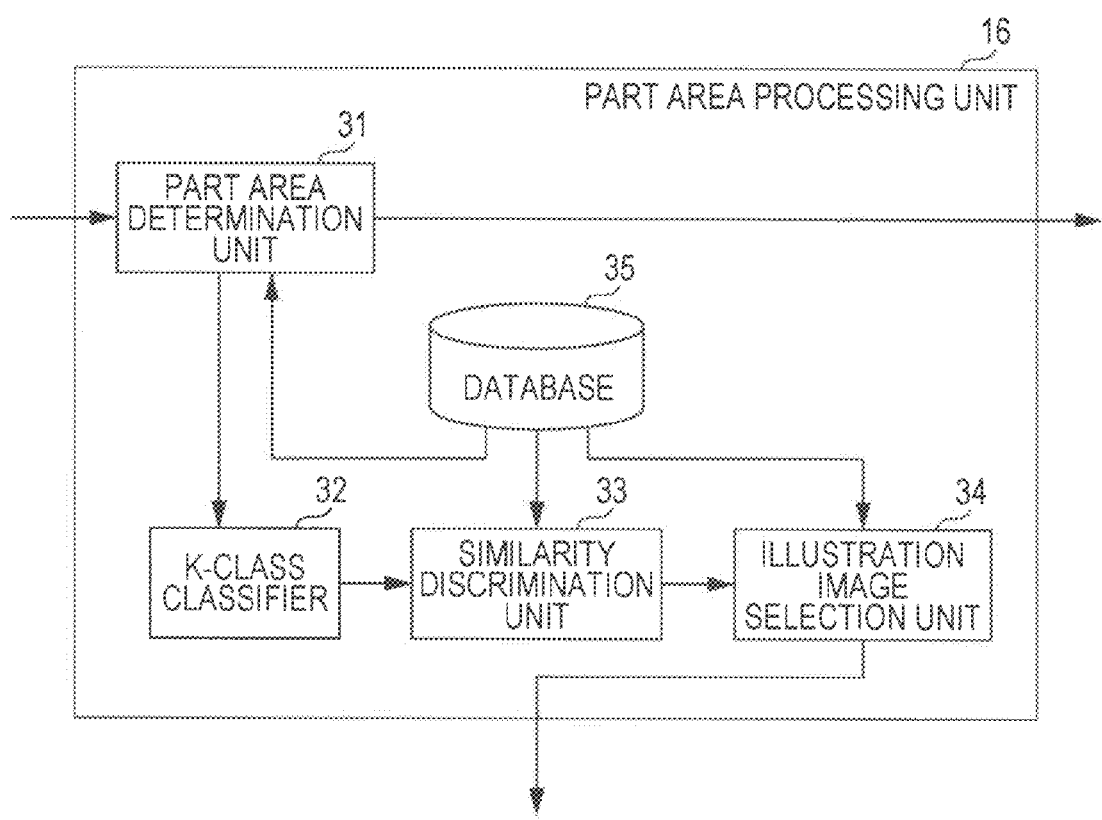
FIG. 2 is a diagram showing an example of the composition of a part area processing unit.

FIG. 2 is a diagram showing a composition example of the part area processing unit 16 of FIG. 1.

The part area processing unit 16 is constituted by a part area determination unit 31, a K-class classifier 32, a similarity discrimination unit 33, an illustration image selection unit 34, and a database 35.

The part area determination unit 31 is supplied with the information pertaining to the feature points from the feature point detection unit 13 and the part area defining information from the database 35. The part area determination unit 31 determines and extracts a part area including a predetermined part from the face image in the face area based on the feature points from the feature point detection unit 13, based on the part area defining information, and supplies the extraction result to the part reference color extraction unit 17C (FIG. 1) and the K-class classifier 32.

Furthermore, the part area defining information is, for example, registered in the database 35 or the like in advance, and acquired therefrom by the part area determination unit 31.

The K-class classifier 32 obtains a K-dimensional score (hereinafter, referred to as a K-dimensional score vector) for a part image in the part area supplied from the part area determination unit 31, and supplies the score to the similarity discrimination unit 33.

Furthermore, the K-class classifier 32 is prepared for each part, obtained by a pre-processing device 101 in FIG. 32 to be described later, and detailed description thereof will be provided later.

The similarity discrimination unit 33 specifies a K-dimensional score vector that is most similar to the K-dimensional score vector supplied from the K-class classifier 32 out of K-dimensional score vectors of model images corresponding to part correspondence information registered in the database 35, discriminates the most similar model image, and supplies the discrimination result to the illustration image selection unit 34.

Furthermore, the part correspondence information is information that gives correspondence between the illustration image and the model image, and registered in the database 35. The illustration image is an example of a modified part image expressed by modifying each part, and an image shown by expressing each part with a picture (illustration). In addition, the model image is an image generated such that a part image of an input image is classified into a plurality of prototypes, and an average image of a part image group included in each prototype is obtained based on a multi-dimensional score vector for the input image output from a multi-class classifier (K-class classifier 32 of FIG. 32 to be described later) generated by AdaBoost ECOC (Error Correct Output Coding) learning that uses a image feature amount of a plurality of sample images.

The part correspondence information will be described later in detail since the information is obtained by the pre-processing device 101 of FIG. 32.

The illustration image selection unit 34 selects an illustration image corresponding to the model image that has been discriminated to be the most similar from the part correspondence information registered in the database 35 based on the discrimination result supplied from the similarity discrimination unit 33, and supplies the image to the illustration image color adjustment unit 18C.

The database 35 stores various information such as anchor point defining information necessary for generating a portrait image in addition to the part area defining information and the part correspondence information described before. Furthermore, the anchor point defining information defines a point (hereinafter, referred to as an anchor point) on an illustration image corresponding to the location of each part (hereinafter, referred to as a part point) detected from the face image included in the input image. The anchor point defining information is used when a portrait image is generated by the drawing creation unit 19, and supplied to the drawing creation unit 19 when the generation of a portrait image is performed. The anchor point defining information will be described later in detail since the information is obtained by the pre-processing device 101 of FIG. 32.

[Description of Portrait Image Generation Process]

Next, a process of generating a portrait image (portrait image generation process) executed by the portrait image generating device 1 of FIG. 1 will be described with reference to the flowchart of FIG. 3.

In Step S11, the target image acquisition unit 11 acquires an input image including the face image such as a captured image.

In Step S12, the face detection unit 12 detects the location (x, y, w, h) of the face area in the input image by scanning the face pattern in the input image supplied from the target image acquisition unit 11.

In Step S13, the feature point detection unit 13 detects the location (x, y) of feature points by scanning the pattern of each feature point of the face image in the face area detected by the face detection unit 12. With the feature points, the face outline area, the hair area, and each part area are specified.

In Step S14, a skin reference color extracted color adjustment process is performed by the skin reference color extracted color adjustment unit 20A.

Here, the details of the skin reference color extracted color adjustment process corresponding to the process of Step S14 in FIG. 3 will be described with reference to the flowchart of FIG. 4.

In Step S31, the face outline area determination unit 14 determines the face outline area based on the feature points detected by the feature point detection unit 13.

Figure 5:
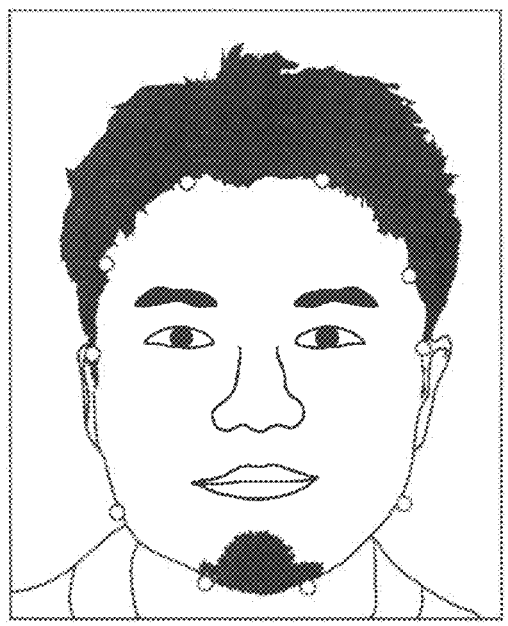
FIG. 5 is a diagram illustrating feature points detected for extracting the skin reference color.

In other words, since points in the outline of the face are detected as feature points, for example, as in FIG. 5, the inside of the outline of the face is determined as the face outline area by the face outline area determination unit 14 based on these feature points.

In Step S32, the skin reference color extraction unit 17A extracts the skin reference color in the face outline area determined by the face outline area determination unit 14.

FIGS. 6A to 6D are diagrams showing an example of the flow of a series of a process from the acquisition of the input image to the extraction of the skin reference color in the face outline area in the input image.

First of all, when a color segmentation process is performed for the input image of FIG. 6A, an image shown in FIG. 6B is obtained. Herein, for example, clustering is performed which uses k-means algorithm for an RGB value of the input image of FIG. 6A. Next, as shown in FIG. 6C, the range to extract the skin reference color is designated for the image of FIG. 6B obtained as a result of the color segmentation process by using the feature points detected by the feature point detection unit 13. For the designation of the range, for example, a method of connecting the detected feature points with splined curves is used.

When the range of extracting the skin reference color of FIG. 6C is designated, as shown in FIG. 6D, the skin reference color is extracted from the area in the designated range. For the extraction of the skin reference color, it is desirable to select a color occupying a relatively wide range in the designated range. For example, in the designated range of FIG. 6C, the color of a predetermined area occupying 50% or more, 30% or more, or the like is extracted as the skin reference color. FIG. 6D illustrates an example in which two kinds of the skin reference color are extracted, but in order to have one kind of the skin reference color, an average value of the colors may be adopted, or a color occupying the widest area in the designated range may be selected. In addition, a plurality of reference colors may be reflected in each area of a portrait image, and a plurality of color information pieces may be used as setting values of a gradation process.

Figure 4:
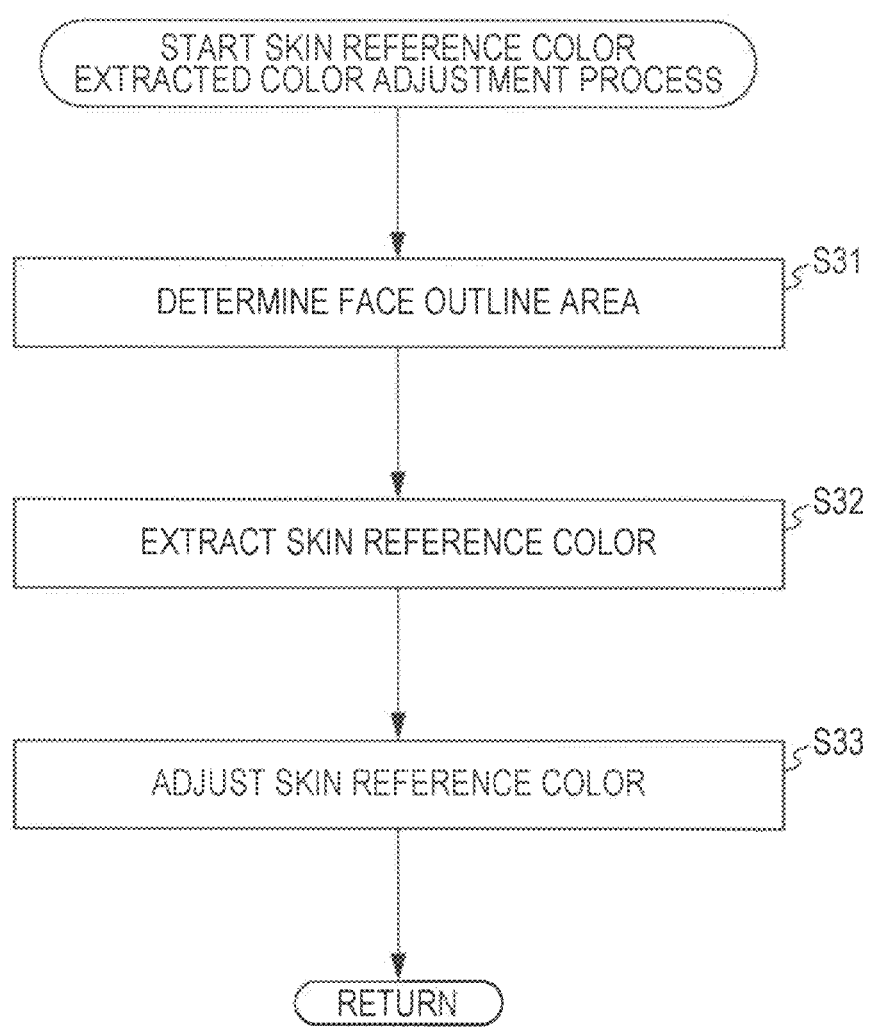
FIG. 4 is a flowchart describing a detailed skin reference color extracted color adjustment process.

Returning to the flowchart of FIG. 4, in Step S33, the skin color adjustment unit 18A adjusts the skin reference color extracted by the skin reference color extraction unit 17A according to predetermined grayscale converting conditions, and converts the color into the skin color to be used in the portrait image.

Herein, with reference to FIGS. 7A to 7C, a method of converting the skin reference color into the skin color to be used in the portrait image will be described.

Furthermore, as an example of the converting method, color information is treated as an RGB value of 8 bit, and a method of adjusting each value will be shown. FIGS. 7A to 7C illustrate the correspondence relationship between the reference color obtained from the input image (indicated by "input image" in the left side of each color component in the drawings) and the color range of a color for the portrait image (indicated by "portrait image" in the right side of each color component in the drawings) for each of the red component (FIG. 7A), the green component (FIG. 7B), and the blue component (FIG. 7C). The color range is the range surrounded by thick frames in grayscale values of RGB having the range from 0 to 255 in the drawings, and corresponds to the "input image" and the "portrait image" as shown by arrows in the drawings. Furthermore, the relationship is the same as other corresponding drawings to be described later.

As shown in FIG. 7A, the color range of the reference color obtained from the input image for the red component is set to [RImin, RImax]. The color range may be obtained by statistically acquiring a range in an image that has a possibility of being input.

Herein, conversion is performed such that a case when the R value of the reference color is smaller than RImin is set to RImin, and a case where the R value is greater than RImax is set to RImax so that an input value is in the range of [RImin, RImax]. In addition, in the same manner for the green component and the blue component, [GImin, GImax] and [BImin, BImax] are defined as shown in FIGS. 7B and 7C.

Furthermore, in the description below, the color range of the reference color obtained from the input image is indicated by [XImin, XImax] for generalization of RGB.

As shown in FIG. 7A, for the red component, the color range used in the portrait image is set to [RCmin, RCmax]. The color range is determined, for example, according to face attribute, ambience, theme or the like of the generated portrait image.

In addition, in the same manner for the green component and the blue component, [GCmin, GCmax] and [BCmin, BCmax] are defined as shown in FIGS. 7B and 7C.

Furthermore, in the description below, the color range of a color used in the portrait image is indicated by [XCmin, XCmax] for generalization of RGB.

As a simple example of a method of converting (grayscale of) the reference color into (grayscale of) the color used in the portrait image, linear conversion from [XImin, XImax] to [XCmin, XCmax] can be considered.

When the reference color is set to [Rin, Gin, Bin] and the color used in the portrait image is set to [R, G, B] in a method of independently converting each of RGB values, the following conversion formula (1) can be used.

if (Rin<RImin){Rin=RImin}
if (RImax<Rin){Rin=RImax}

$$R=(RCmax-RCmin)*(Rin-RImin)/(RImax-RImin)+RCmin$$

if (Gin<GImin){Gin=GImin}
if (GImax<Gin){Gin=GImax}

$$G=(GCmax-GCmin)*(Gin-GImin)/(GImax-GImin)+GCmin$$

if (Bin<BImin){Bin=Bimin}
if (BImax<Bin){Bin=Bimax}

$$B=(BCmax-BCmin)*(Bin-BImin)/(BImax-BImin)+BCmin \quad (1)$$

However, since the RGB values are independently adjusted in the case of the conversion formula (1) above, there is a case where an intended color is not shown as the balance of the RGB values are broken depending on cases. In order to avoid the problem, the following conversion formula (2) that adjusts the RGB values in an interlocking manner can be considered.

$RGBin=(Rin+Gin+Bin)/3$ $RGBImax=(RImax+GImax+BImax)/3$ $RGBImin=(RImin+GImin+BImin)/3$ if (RGBin<RGBmin){RGBin=RGBmin}
if (RGBmax<RGBin){RGBin=RGBmax}

$R=(RCmax-RCmin)*(RGBin-RGBImin)/(RGBImax-RGBImin)+RCmin$ $G=(GCmax-GCmin)*(RGBin-RGBImin)/(RGBImax-RGBImin)+GCmin$ $B=(BCmax-BCmin)*(RGBin-RGBImin)/(RGBImax-RGBImin)+BCmin$ (2)

With the above conversion formulas (grayscale converting conditions), (grayscale of) the skin reference color obtained from the input image can be converted into (grayscale of) the skin color used in the portrait image.

FIGS. 8A and 8B are diagrams showing an example of specific numerical values of color adjustment setting for the skin color.

FIG. 8A shows [XImin, XImax] as the color range in the skin reference color of the RGB values, and FIG. 8B shows [XCmin, XCmax] as the color range in the portrait image of the RGB values.

In other words, the color range of the skin reference color designated by [RImin, RImax]=[90, 170] is converted into [RCmin, RCmax]=[217, 255] as a color range in a portrait image.

In the same manner, [GImin, GImax]=[60, 140] is converted into [GCmin, GCmax]=[191, 231], and [BImin, BImax]=[40, 120] is converted into [BCmin, BCmax]=[172, 212].

Figure 3:
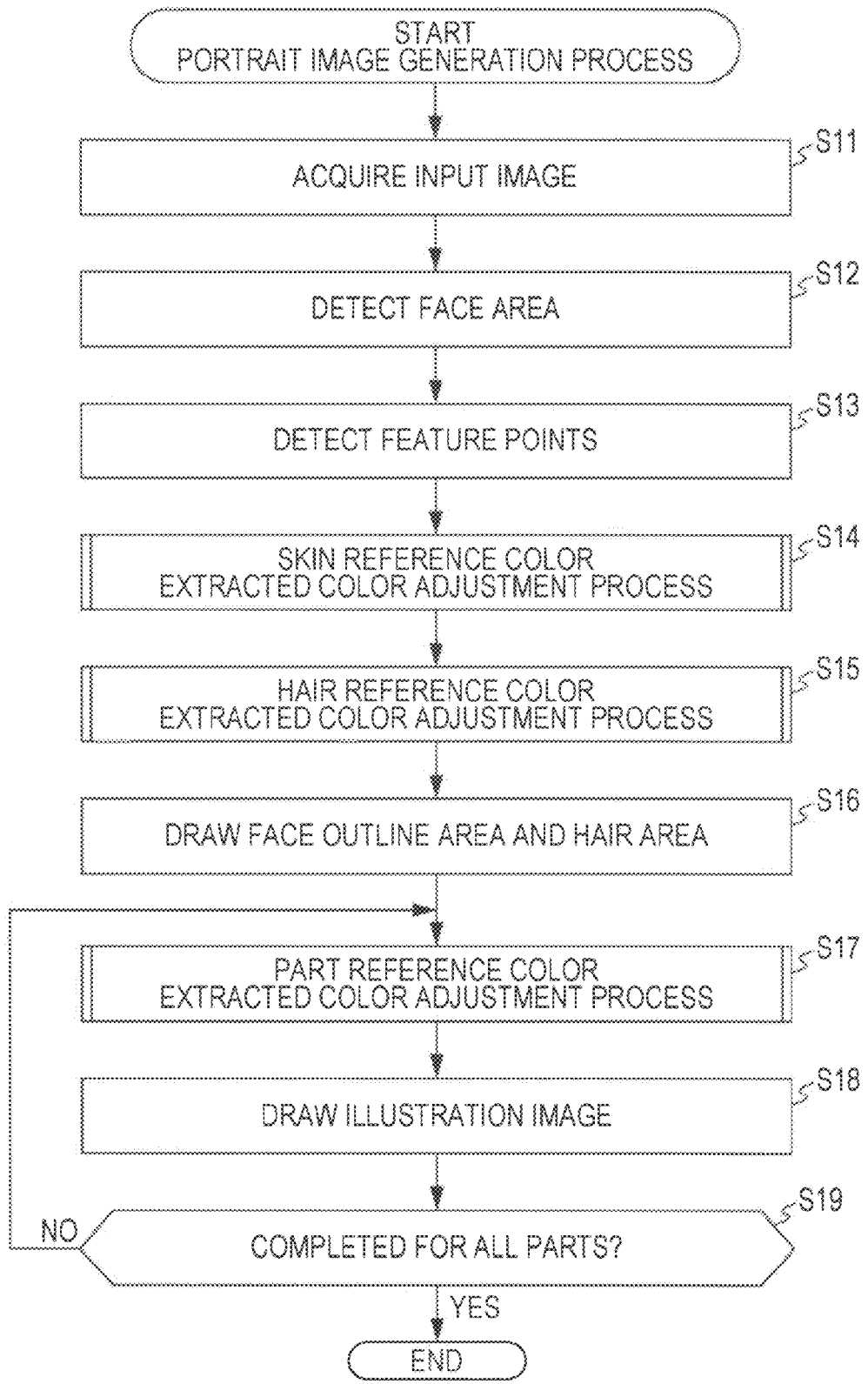
FIG. 3 is a flowchart describing a portrait image generation process.

As such, the color adjustment setting of the skin color is adjusted, and the process returns to the process of Step S14 of FIG. 3.

In Step S15, a hair reference color extracted color adjustment process is performed by the hair reference color extracted color adjustment unit 20B.

Here, the details of the hair reference color extracted color adjustment process corresponding to the process of Step S15 of FIG. 3 will be described with reference to the flowchart of FIG. 9.

In Step S51, the hair area determination unit 15 determines the hair area based on the feature points supplied from the feature point detection unit 13.

For example, the hair area determination unit 15 performs clustering for the RGB values obtained from the image of the area of the upper half (the area of the top of the head) of the face image in the face area (or the input image) detected by the face detection unit 12 by using, for example, k-means algorithm, and determines a predetermined area as the hair area.

FIGS. 10A to 10C are diagrams illustrating the details of a hair area determination process executed by the hair area determination unit 15.

As shown in FIG. 10A, as the hair area determination process, first, the upper half of the upper face area $A_U$ in the face area is determined. Then, if all pixels (R, G, and B) in the upper face area $A_U$ is subjected to clustering with three colors by using k-means algorithm, all the pixels belong to any of three classes. Next, when it is determined whether the labels of adjacent pixels coincide with each other or not, and area division is performed, the area is divided into three areas of the background, hair, and skin as shown in FIG. 10B.

Furthermore, in the division process, the area is divided into three or more areas, but the hair area determination unit 15 may determine the largest area as the hair area among areas closest to, for example, black color, as shown in FIG. 10C.

Figure 9:
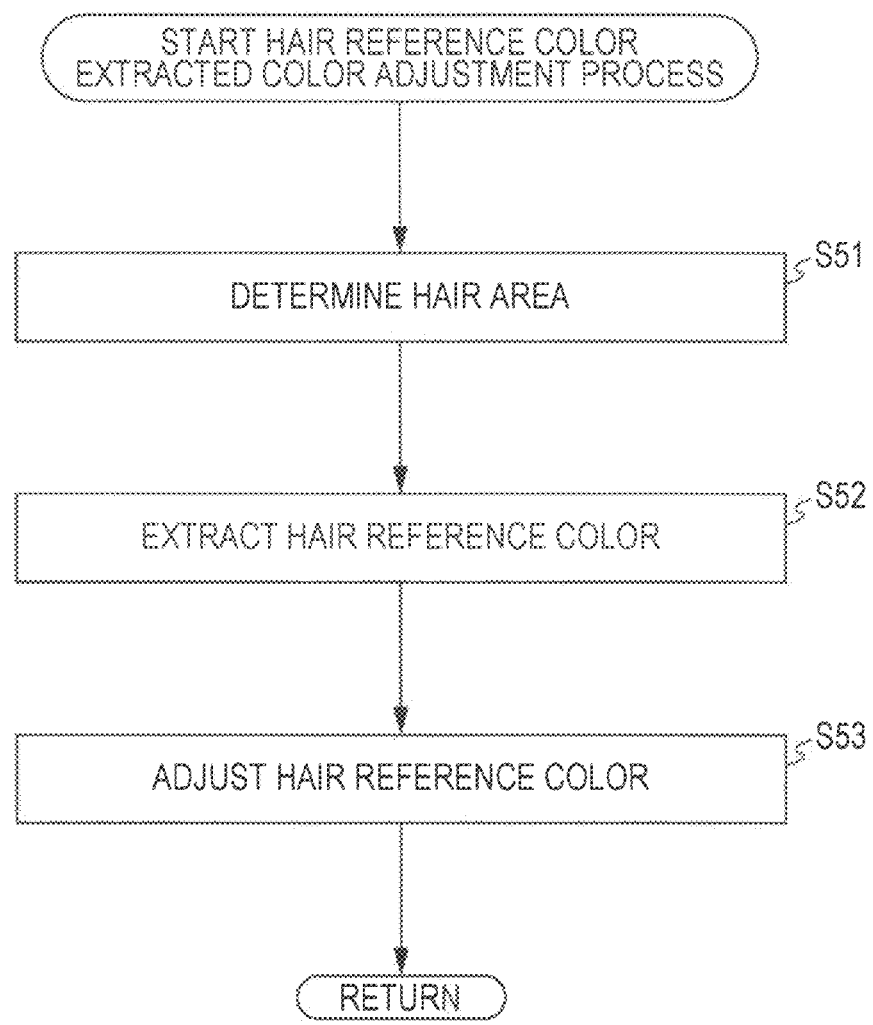
FIG. 9 is a flowchart describing the details of a hair reference color extracted color adjustment process.

Returning to the flowchart of FIG. 9, in Step S52, the hair reference color extraction unit 17B extracts the hair reference color from the hair area determined by the hair area determination unit 15.

The above description is of the method of extracting the hair reference color, but in the same manner as the method of extracting the skin reference color of FIGS. 6A to 6D described above, for example, the color in the area occupying 50% of more of the total area is extracted as the hair reference color in the designated range of the hair area of FIG. 10C.

In Step S53, the hair color adjustment unit 18B adjusts the hair reference color extracted by the hair reference color extraction unit 17B and converts the color into the hair color used in the portrait image according to predetermined grayscale converting conditions.

The above description is of the adjustment of color adjustment setting of the hair reference color, but in the same manner as the color adjustment setting (FIGS. 7A to 7C and FIGS. 8A and 8B) of the skin reference color described above, for example, the adjustment is performed such that a color range of the hair reference color designated by [XImin, XImax] is converted into [XCmin, XCmax] as a color range in the portrait image.

As such, the color adjustment setting of the hair color is adjusted, and the process returns to the process of Step S15 of FIG. 3.

In Step S16, the drawing creation unit 19 fills the area of the union of the face outline area and the hair area with the skin color subjected to the adjustment of the color adjustment setting, and then fills the area with the hair color subjected to the adjustment of the color adjustment setting to draw a base image of the face.

FIGS. 11A to 11D are diagrams illustrating the details of a drawing process of the base image executed by the drawing creation unit 19.

As shown in FIG. 11A, when the feature points on the detected outline are linked by a predetermined interpolation process such as splined curve interpolation, and an area surrounded by the curve is obtained, the face outline area is formed as shown in FIG. 11B. Then, as shown in FIG. 11C, after the face outline area and the inside the hair area are filled with the skin color subjected to the adjustment of the color adjustment setting, and the hair area is filled with the hair color subjected to the adjustment of the color adjustment setting, the base image of FIG. 11D is obtained.

Furthermore, herein, for the sake of simplicity of the description, description on a re-sizing process for an image size of the input image is omitted, but actually, an expanded area mainly from the face area detected by the face detection unit 12 is cut out from the input image, and a process of re-sizing is performed for the area in accordance with the image size of the generated portrait image. When it comes to the extent of the re-sizing, since an area projecting a little from the entire face in the face area detected by the face detection unit 12 is extracted, for example, an area with 1.6 times thereof mainly from the area is cut out from the input image. At this time, for example, if the image size of a desired portrait image is set to 300×300 pixels, the face image in the detected face area is re-sized to the image size. In addition, at this time, the locations of the feature points of the face area detected by the feature point detection unit 13 are converted into the locations of the cut-out image.

Returning to the flowchart of FIG. 3, in Step S17, a part reference color extracted color adjustment process is performed by the part reference color extracted color adjustment unit 20C.

Here, the part reference color extracted color adjustment process of Step S17 in FIG. 3 will be described in detail with reference to the flowchart of FIG. 12. Furthermore, in order to make the description easily understood, an example where the illustration image of the eyes is selected from parts such as eyes, eyebrows, nose, mouth, and the like to perform the adjustment of the color adjustment setting will be mainly described.

In Step S71, the face area of the input image is re-sized to a predetermined image size in the part area processing unit 16, and a part area according to part area defining information is cut out from the face area that become the predetermined image size by the part area determination unit 31 in Step S72.

Figure 13:
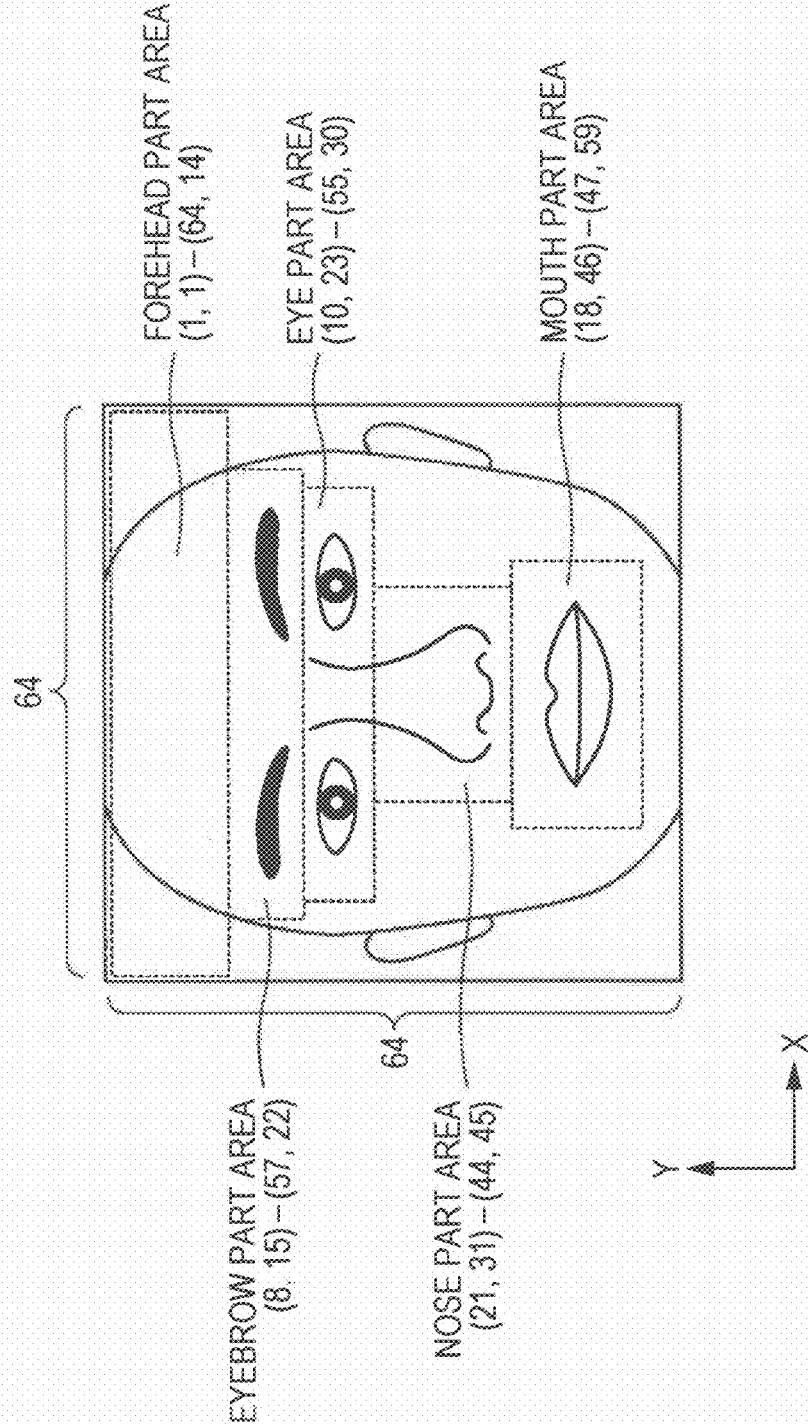
FIG. 13 is a diagram showing an example of part area definition information.

FIG. 13 is a diagram showing an example of the part area defining information.

As shown in FIG. 13, when each part area is cut out from the face area that has been re-sized to 64×64 pixels, a square area that has opposing corners of a point $(x_1, y_1)$ and a point $(x_2, y_2)$, which are arbitrary locations in the face area, is extracted. For example, since the eye part area is a square area that has opposing corners of a point (10, 23) and a point (55, 30), the area is cut out as the eye part area by the part area determination unit 31.

The eye part area that has been cut out as above is supplied to the part reference color extraction unit 17C and the K-class classifier 32.

Figure 12:
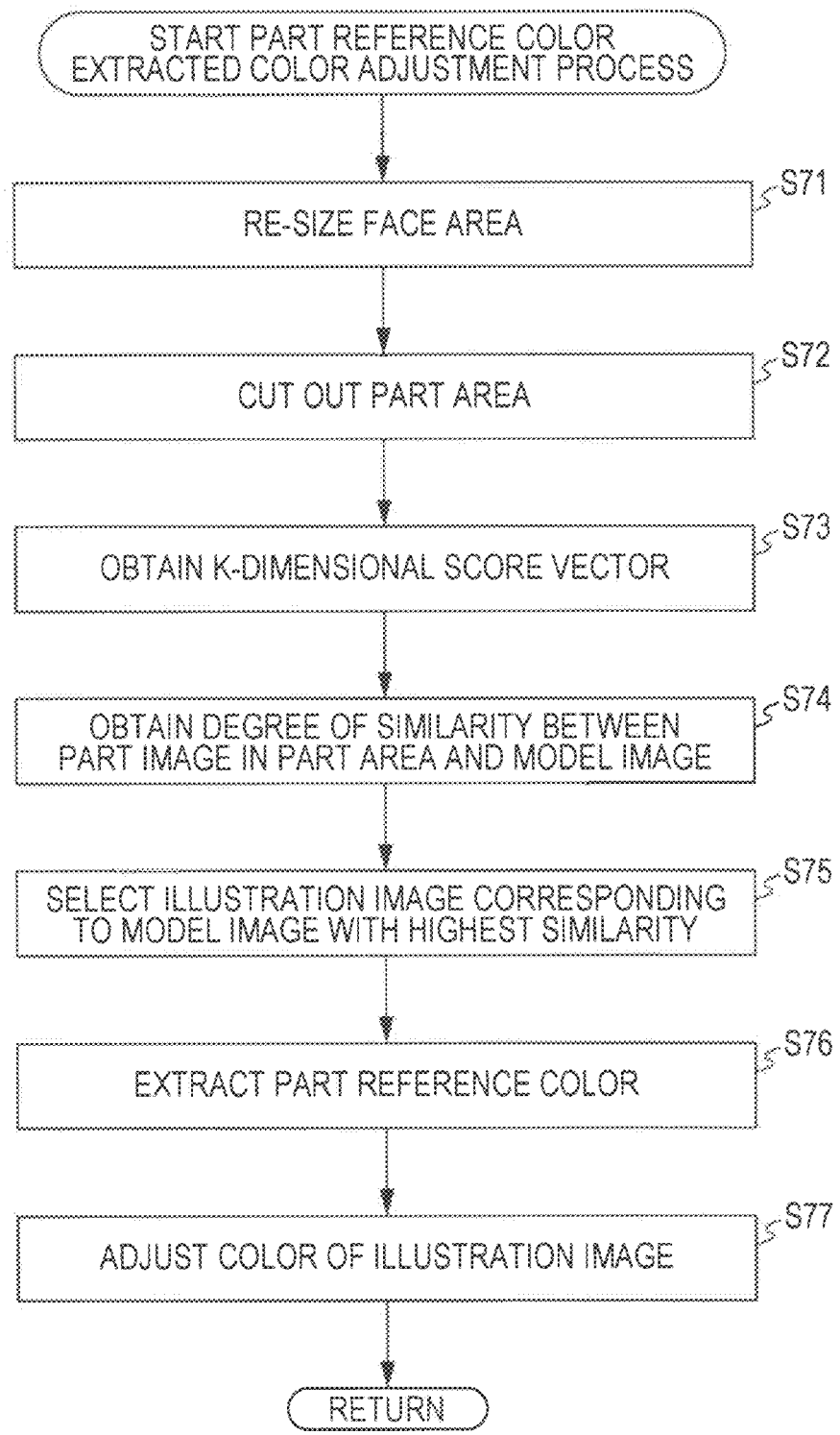
FIG. 12 is a flowchart describing the details of a part reference color extracted color adjustment process.

Returning to the flowchart of FIG. 12, in Step S73, the K-class classifier 32 for the eye part area obtains a K-dimensional score vector corresponding to the part image in the eye part area.

In Step S74, the similarity discrimination unit 33 specifies a K-dimensional score vector that is most similar to the K-dimensional score vector obtained from the part image in the eye part area computed by the K-class classifier 32 for the eye part area out of K-dimensional score vectors of the model images corresponding to the illustration images based on part correspondence information registered in the database 35, and discriminates the most similar model image. Furthermore, for example, Euclidean distance is employed for the similarity of the K-dimensional score vectors.

In Step S75, the illustration image selection unit 34 selects an illustration image corresponding to the model image that has been determined to be most similar from the part correspondence information registered in the database 35 based on the discrimination result of the similarity discrimination unit 33.

Figure 14:
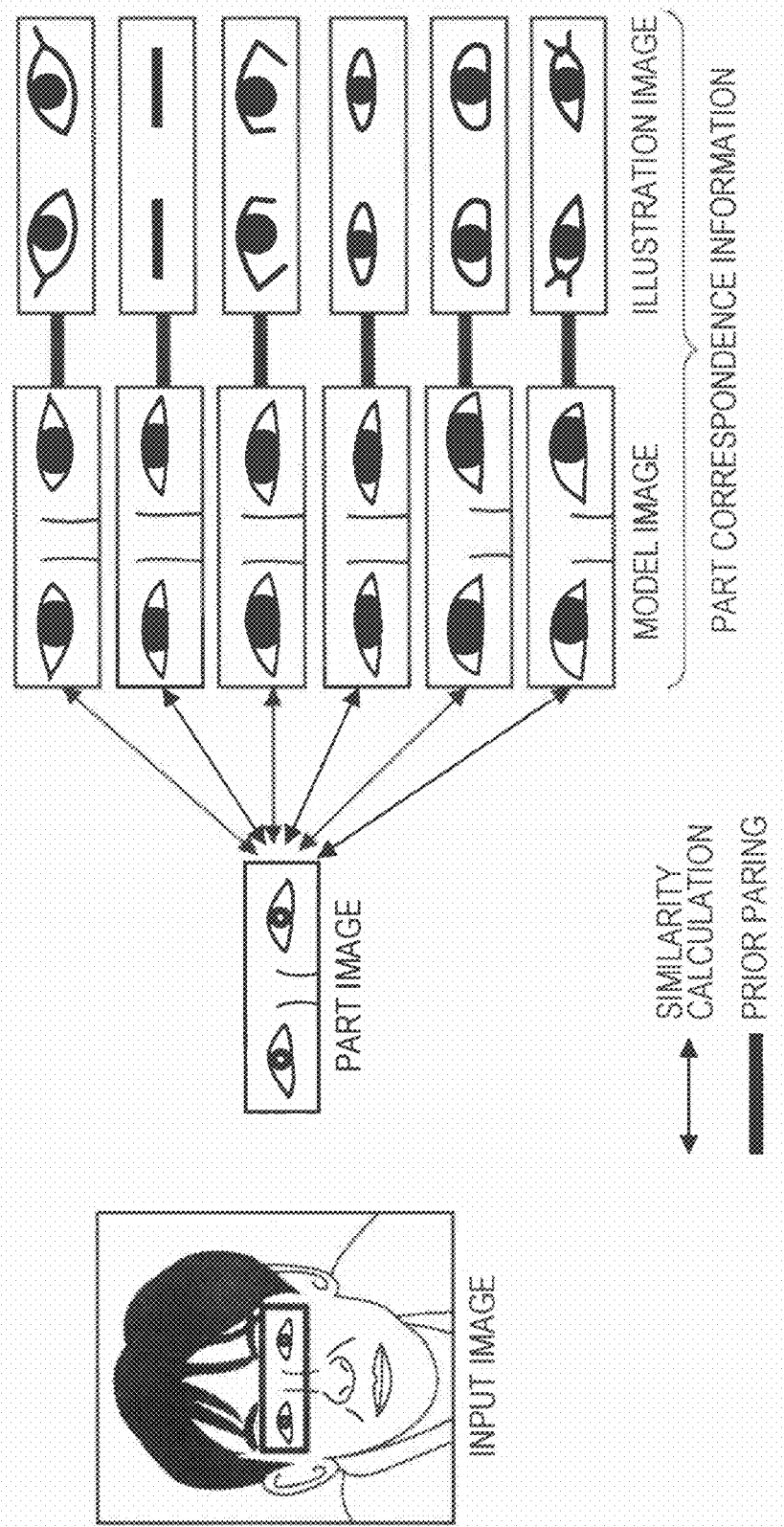
FIG. 14 is a diagram illustrating the details of a process of selecting illustration images.

FIG. 14 is a diagram illustrating the details of a process of selecting an illustration image.

As shown in FIG. 14, when a part image in the eye part area is extracted from the face area of the input image by the part area determination unit 31, the similarity discrimination unit 33 discriminates similarity of the part image and a plurality of model images from the computation result of the K-class classifier 32, and discriminates a model image with the highest similarity. Since the model images and the illustration images correspond to each other in advance in the part correspondence information, the illustration image selection unit 34 can select one illustration image paired with the model image with the highest similarity.

As such, one illustration image is selected that is paired with the model image having the highest similarity in the part image in the eye part area extracted from the face area out of the plurality of illustration images prepared in advance.

Returning to the flowchart of FIG. 12, in Step S76, the part reference color extraction unit 17C extracts the eye part reference color in the eye part area determined by the part area determination unit 31.

The above description is of a method of extracting the reference color in the eye part area, but in the same manner as the method of extracting the skin reference color of FIGS. 6A to 6D described above, for example, the color of the area occupying 50% or more of the total area is extracted as the eye part reference color in the designated range of the eye part area.

In Step S77, the illustration image color adjustment unit 18C adjusts the color of the illustration image of the eyes selected by the illustration image selection unit 34 based on the eye part reference color extracted by the part reference color extraction unit 17C according to the predetermined grayscale converting conditions, and converts the color into a color for the eyes to be used in the portrait image.

The above description is of the adjustment of the color adjustment setting for the eye part reference color, but in the same manner as the color adjustment setting (FIGS. 7A to 7C and FIGS. 8A and 8B) of the skin reference color described above, the adjustment is performed such that, for example, the color range of the eye part reference color designated by [XImin, XImax] is converted into [XCmin, XCmax] as the color range in the portrait image.

As described above, the adjustment of the color adjustment setting for the illustration image is performed, and the process returns to the process of Step S17 of FIG. 3.

In Step S18, the drawing creation unit 19 performs an image process such as rotation, enlargement, reduction, or the like for the illustration image subjected to the adjustment of the color adjustment setting by the illustration image color adjustment unit 18C so that anchor points defined by anchor point defining information and corresponding part points coincide with each other, and the illustration image thus obtained is drawn to the base image obtained from the process of Step S16.

FIGS. 15A and 15B are diagrams illustrating an illustration image drawing process in detail.

As shown in FIGS. 15A and 15B, the correspondence of an anchor point $P_A$ of the illustration image of the eyes subjected to the adjustment of the color adjustment setting by the illustration image color adjustment unit 18C and a part point $P_P$ on the portrait image (base image) corresponding to the feature points in the face area detected by the feature point detection unit 13 based on anchor point defining information is as described before.

In other words, as shown in FIG. 15A, since an anchor point $P_{A1}$ and a part point $P_{P1}$ correspond to each other on one hand and an anchor point $P_{A2}$ and a part point $P_{P2}$ correspond to each other on the other hand, the drawing creation unit 19 performs an image process such as rotation, enlargement, reduction or the like for the illustration image so as to draw an illustration image for the eyes on the base image by making those points coincide with each other, and draws so as to coincide the corresponding anchor point $P_A$ and part point $P_P$. If drawing is performed as above, the illustration image for the right eye is drawn on the base image as shown in FIG. 15B.

Furthermore, at this time, since the skin area has already been drawn as the base image, only pixels corresponding to the illustration image are drawn over. In addition, the part point $P_P$ may be a point that coincides with a detected feature point, and may be a point set different from the feature point.

Returning to the flowchart of FIG. 3, in Step S19, the part reference color extracted color adjustment unit 20C determines whether or not all illustration images such as the eyes, eyebrows, nose, mouth, forehead, and the like are to be drawn on the base image.

In Step S19, when all illustration images are determined not to be drawn, the process returns to Step S17, and the part reference color extracted color adjustment/drawing process from Steps S17 to S19 described above is repeated.

In other words, by repeating the part reference color extracted color adjustment/drawing process, the eyebrows part area (point (8, 15)-point (57, 22)), the nose part area (point (21, 31)-point (44, 45)), the mouth part area (point (18, 46)-point (47, 59)), and the forehead part area (point (1, 1)-point (64, 14) each are extracted in addition to the eye part area defined in the part area defining information of FIG. 13, the similarity to the model images is discriminated by using the K-class classifier 32 prepared for every part area, and an illustration image corresponding to the model image with the highest similarity is each selected. Then, the selected illustration image is subjected to the adjustment of the color adjustment setting based on the corresponding part reference color, further subjected to the image process according to the anchor point defining information, and drawn and arranged at a predetermined location on the base image.

On the other hand, when drawing of all illustration images is determined to end, all parts are turned out to be drawn, and therefore, the part reference color extracted color adjustment/drawing process ends.

The exemplification of the portrait image generated as above is as follows. In other words, FIGS. 16A to 16F are diagrams showing examples where the portrait image (modified image) generated by the drawing creation unit 19 is displayed on the screen of the display device 2.

As shown the pairs of input images (the left side) and portrait images (the right side) of FIGS. 16A to 16F, the illustration images corresponding to each part area of the face image included in the input images of the left side are selected individually by executing the portrait image generation process, and after the adjustment of the color adjustment setting is performed for the selected illustration images, the images are drawn on the base image and the portrait images of the right side are each generated.

In other words, since the color of the face skin, the color of the hair, and the colors of each part such as the eyes and lip are appropriately adjusted in the portrait images, and the color reflecting the person of the face image in the input image is formed, the image looks like the original face image, and as a result, the quality of the portrait image is improved.

In addition, when the reference color is acquired from the input image, clustering is performed as a pre-process by a method of k-means algorithm or the like, and a color of an area that belongs to the same cluster is used to acquire the reference color with avoiding a place with a color other than the skin color such as surroundings of the eyes, lip, or the like, for example, in the case of the skin color. As a result, since a color that is more suitable for the objective can be obtained, the color of the face skin, the color of the hair, and the color of each part such as the eyes, lip, or the like can be turned into a suitable color that has no awkwardness in the portrait image.

In addition, since the portrait image is generated from the illustration images selected based not on the similarity between the part images in each part area and the illustration images but on the similarity between the part images and the model images, the illustration image paired with the model image most similar to each part image of the input image is directly selected from the view of the face image, and the portrait image having the features of the face image can be generated. In other words, it is difficult to directly have the similarity between the part image and the illustration image, but in the embodiment, the model image and the illustration image are paired in advance, the similarity between the part image and the model image is calculated, and the illustration image paired with the model image that is most similar to the part image is selected.

As above, the portrait image generation process is executed by the portrait image generating device 1 of FIG. 1.

<2. Second Embodiment>

Next, a second embodiment of the invention will be described with reference to FIGS. 17 to 20B.

[Adjustment Method of Color Adjustment Setting Using Fact Attribute Information]

Incidentally, in the portrait image, if, for example, black color is used for the skin color of a man and white color is used for the skin color of a woman, there is a case where the impression of the portrait image improves. In addition, there are various elements for improving the impression of a portrait image such as using pink color for the skin color of a smiling face, and aqua color for the skin color of a nervous face, for example.

In order to perform adjustment of color adjustment setting as above, for example, a method can be considered in which attributes of a face image such as man/woman attribute pertaining to the gender of a person, facial expression attribute pertaining to facial expressions are recognized, and the color adjustment setting is adjusted using the recognition result. Thus, as the second embodiment, an adjustment method of color adjustment setting using face attribute information will be described.

[Composition Example of Portrait Image Generating Device]

FIG. 17 is a diagram showing the composition of another embodiment of the portrait image generating device to which the present invention is applied.

The portrait image generating device 1 of FIG. 17 has a difference in that the device is provided with a face attribute recognition unit 21 for recognizing face attribute information from a face image, in comparison to the portrait image generating device 1 of FIG. 1. Furthermore, in FIG. 17, the same portions as in FIG. 1 are given with the same reference numerals, and description on portions with the same process will be appropriately omitted.

The face attribute recognition unit 21 is supplied with information pertaining to the face image in the face area from the face detection unit 12. The face attribute recognition unit 21 performs a predetermined image process for recognizing face attributes with respect to the face image, and recognize the face attributes.

The recognition result of the face attributes is supplied to the color adjustment unit 18 as face attribute information. As the face attribute, for example, the gender of a person, race, facial expression, presence of glasses, and the like are discriminated, and recognized.

The color adjustment unit 18 adjusts a reference color to a color for a portrait image according to a grayscale converting condition based on the face attribute information supplied from the face attribute recognition unit 21, and supplies the information obtained from the adjustment of the color adjustment setting to the drawing generation unit 19.

In other words, the skin color adjustment unit 18A adjusts the skin reference color to the skin color used in the portrait image with the face attribute information. In the same manner, the hair color adjustment unit 18B adjusts the hair reference color to the hair color used in the portrait image with the face attribute information. In addition, the illustration image color adjustment unit 18C adjusts the color of a corresponding illustration image to the color for the portrait image based on each part reference color and the face attribute information.

The drawing creation unit 19 fills the area of the union of the face outline area and the hair area with the skin color subjected to the adjustment of the color adjustment setting using the face attribute information, and further, fills the hair area with the hair color subjected to the adjustment of the color adjustment setting using the face attribute information thereon to draw a base image. Furthermore, the drawing creation unit 19 performs a predetermined image process for the illustration image subjected to the adjustment of the color adjustment setting using the face attribute information, and draws and arranges the thus-obtained illustration image on the base image to generate a portrait image.

The portrait image generating device 1 of FIG. 17 is constituted as above.

[Description on Portrait Image Generation Process]

Next, a portrait image generation process executed by the portrait image generating device 1 of FIG. 17 will be described.

Furthermore, the portrait image generation process executed by the portrait image generating device 1 of FIG. 17 is basically the same as the portrait image generation process of FIG. 3 described above, but has a difference in that the color adjustment setting is adjusted using the face attribute information in the skin reference color extracted color adjustment process (the process of Step S14), the hair reference color extracted color adjustment process (the process of Step S15), and the part reference color extracted color adjustment process (the process of Step S17). Therefore, herein, the skin reference color extracted color adjustment process corresponding to the process of Step S14 of FIG. 3 will be mainly described with reference to the flowchart of FIG. 18.

In Steps S91 and S92, the face outline area is determined by the face outline area determination unit 14 and the skin reference color is extracted by the skin reference color extraction unit 17A in the same manner as in Steps S31 and S32 of FIG. 4.

In Step S93, the face attribute recognition unit 21 performs a predetermined image process for recognizing face attributes for the face image, and acquires face attribute information that is thus obtained. The face attribute information is supplied to the skin color adjustment unit 18A.

In Step S94, the skin color adjustment unit 18A adjusts the skin reference color according to grayscale converting conditions based on the acquired face attribute information, and converts the reference color into the skin color used in the portrait image.

Herein, the adjustment of the color adjustment setting using the face attribute information will be described in detail with reference to FIG. 19.

Figure 19:
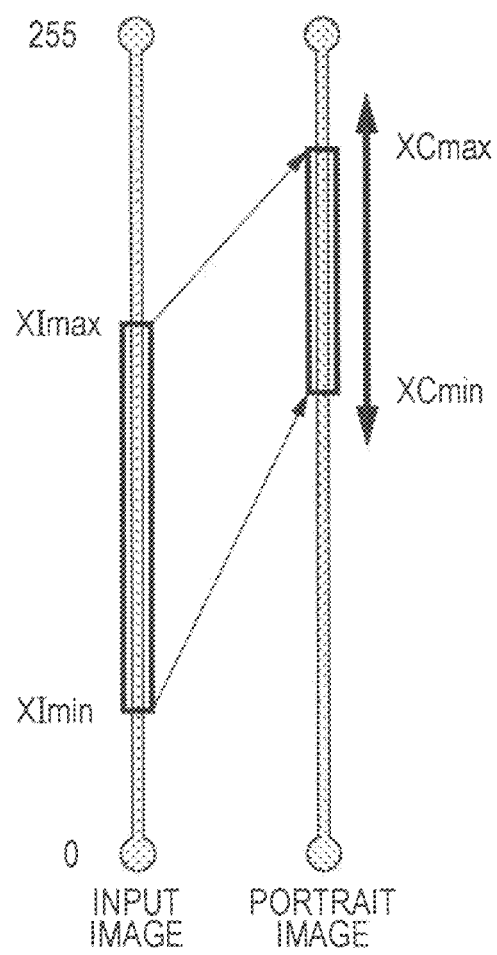
FIG. 19 is a diagram illustrating the adjustment of color adjustment setting using face attribute information.

FIG. 19 shows that the color range of the reference color shown by [XImin, XImax] is converted into [XCmin, XCmax] as the color range in the portrait image, but as shown by arrows in the drawing, values of XCmin and XCmax are adjusted according to score values obtained from the face attribute information.

To be more specific, as an example of a method of adjusting the color adjustment setting using the face attribute information, the description of the method for adjusting the skin color using the face attribute information indicating the gender of a person is as follows.

Herein, in man/woman attribute recognition of a face image, a score S is assumed to be obtained in the range of [0.0 (man), 1.0 (woman)]. If the color range in the portrait image when the man/woman attribute score S is 0.0 (maximum man score) is set to [XCFmin, XCMmax] (X is any one of RGB), and the color range in the portrait image when the man/woman attribute score S is 1.0 (maximum woman score) is set to [XCFmin, XCFmax], the color range [XCmain, XCmax] in the portrait image by the following Formula (3) can be obtained from the man/woman attribute score S.

$$RCmax=(RCFmax-RCMmax)*S+RCMmax$$

$$RCmin=(RCFmin-RCMmin)*S+RCMmin$$

$$GCmax=(GCFmax-GCMmax)*S+GCMmax$$

$$GCmin=(GCFmin-GCMmin)*S+GCMmin$$

$$BCmax=(BCFmax-BCMmax)*S+BCMmax$$

$$BCmin=(BCFmin-BCMmin)*S+BCMmin \qquad (3)$$

By using thus-obtained [XCmin, XCmax], colors [R, G, B] to be used in the portrait image are obtained.

FIGS. 20A and 20B show examples of specific values necessary when the color adjustment setting for the skin color is adjusted by using scores of man/woman attributes and facial expression attributes as face attribute information.

FIG. 20A shows an example of values of the color adjustment setting by man/woman attributes, and while the base setting is [RCmin, RCmax]=[217, 255], [GCmin, GCmax]=[191, 231], and [BCmin, BCmax]=[172, 212], the case where man/woman attribute scores are used is as follows. So to speak, on one hand, when the man/woman attribute is of woman, the setting is [RCmin, RCmax]=[227, 255], [GCmin, GCmax]=[214, 254], [BCmin, BCmax]=[205, 245], on the other hand, when the man/woman attribute is of a man, the setting is [RCmin, RCmax]=[197, 237], [GCmin, GCmax]=[142, 182], and [BCmin, BCmax]=[101, 141].

The average color expressed by those RGB values is shown in the field of "average color" of FIG. 20A, but it is obvious that the average color of a woman is white, and the average color of a man is black, in comparison to the average color of the base setting. Accordingly, since the black color is used for the skin color of a man, and the white color is used for the skin color of a woman, the impression of the portrait image can be improved.

FIG. 20B shows an example of values of the color adjustment setting by the facial expression attributes, but while the base setting is [RCmin, RCmax]=[217, 255], [GCmin, GCmax]=[191, 231], and [BCmin, BCmax]=[172, 212], the case where facial expression attribute scores are used is as follows. So to speak, on one hand, when the facial expression attribute is of a smiling face, the setting is [RCmin, RCmax]=[220, 255], [GCmin, GCmax]=[171, 211], [BCmin, BCmax]=[170, 210], on the other hand, when the facial expression attribute is of a depressed face, the setting is [RCmin, RCmax]=[177, 217], [GCmin, GCmax]=[212, 252], and [BCmin, BCmax]=[213, 253].

The average color expressed by those RGB values is shown in the field of "average color" of FIG. 20B, but it is obvious that the average color of a smiling face is pink, and the average color of a depressed face is aqua, in comparison to the average color of the base setting. Accordingly, since the pink color is used for the skin color of a smiling face, and the aqua color is used for the skin color of a nervous face, the impression of the portrait image can be improved.

As such, the adjustment of the color adjustment setting using the face attribute information is performed.

In other words, if the color of the input image is used as it is to generate the portrait image, the color may be unnatural depending on the face attributes or the ambiance (for example, the gender, the facial expression, or the like) of the portrait image, and a color to be used is different. Therefore, in the second embodiment, in order to avoid the color being unnatural in the portrait image, the range of a color to be used in the portrait image is determined in advance, and a color to be used according to color information of the input image and face attributes is determined within the range.

Accordingly, for example, man/woman attributes pertaining to the gender of a person are acquired as face attribute information from the input image, and the color adjustment setting can be changed according to the face attribute, for example, by making the skin color be white in case of a woman.

Hereinabove, the skin reference color extracted color adjustment process has been described, but the adjustment of the color adjustment setting using the face attribute information is performed in the same manner as in the hair reference color extracted color adjustment process (the process of Step S15) and the part reference color extracted color adjustment process (the process of Step S17) as described above. Since the adjustment of the color adjustment setting using the face attribute information performed in the hair reference color extracted color adjustment process and the part reference color extracted color adjustment process is the same as the adjustment of the color adjustment setting using the face attribute information performed in the skin reference color extracted color adjustment process described above, the description thereof will not be repeated.

In addition, in the same manner as in the above-described method, the color of the portrait image can be adjusted by using the face attribute information such as the race, age, and the like obtained from the face image. For example, face attribute information regarding the race is acquired from the input image, and the eyes can be painted with blue color if, for example, the race is turned out to be a westerner. Furthermore, when such face attribute information is obtained from a monochrome face image, a colorful portrait image is generated from the monochrome face image (input image).

Furthermore, herein, an example where the value of the color adjustment setting is consecutively changed according to score values of man/woman attribute recognition has been described, but color adjustment setting with a fixed value may be used, for example, for a man when the man/woman attribute score is less than 0.5, and for a woman when the score is 0.5 or more.

As such, the portrait image generation process is executed by the portrait image generating device 1 of FIG. 17.

<3. Third Embodiment>

Next, a third embodiment of the present invention will be described with reference to FIGS. 21A to 25.

[Method of Adjusting Color Adjustment Setting According to Capturing Conditions During Capturing]

Incidentally, if capturing conditions (for example, an illumination state, or the like) of a captured image are different, the extracted reference color is largely different for the face image of the same person.

FIGS. 21A to 21B show images captured indoors and outdoors and the relationship between a skin color area (face outline area) and the skin reference color of faces in those images.

When the skin reference color ([R, G, B]=[131, 62, 32]) extracted from the image captured indoors in FIG. 21A is compared to the skin reference color ([R, G, B]=[175, 138, 132]) extracted from the image captured outdoors in FIG. 21B, it is notable that the indoor image is darker overall than the outdoor image.

Originally, it is desirable that a similar reference color is extracted even if capturing conditions are different in images of a same person. In order to perform the adjustment of such color adjustment setting, a method can be considered in which color adjustment setting is adjusted by using information regarding capturing conditions obtained during capturing (for example, illumination information regarding an illumination state). Thus, as the third embodiment, a method of adjusting the color adjustment setting using illumination information during capturing will be described.

[Composition Example of Portrait Image Generation Device]

Figure 22:
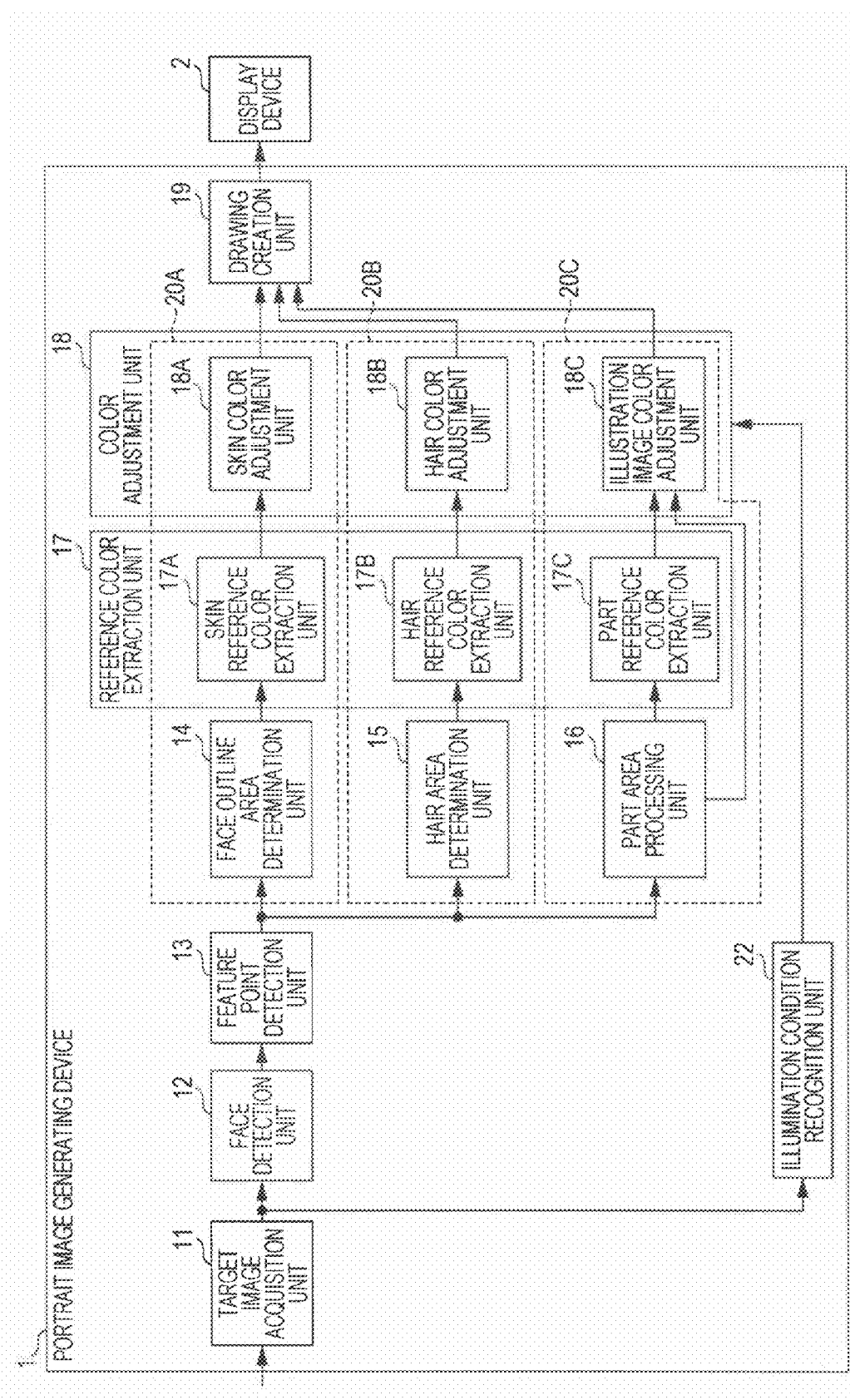
FIG. 22 is a diagram showing the composition of an embodiment of a portrait image generating device to which the present invention is applied.
Figure 23:
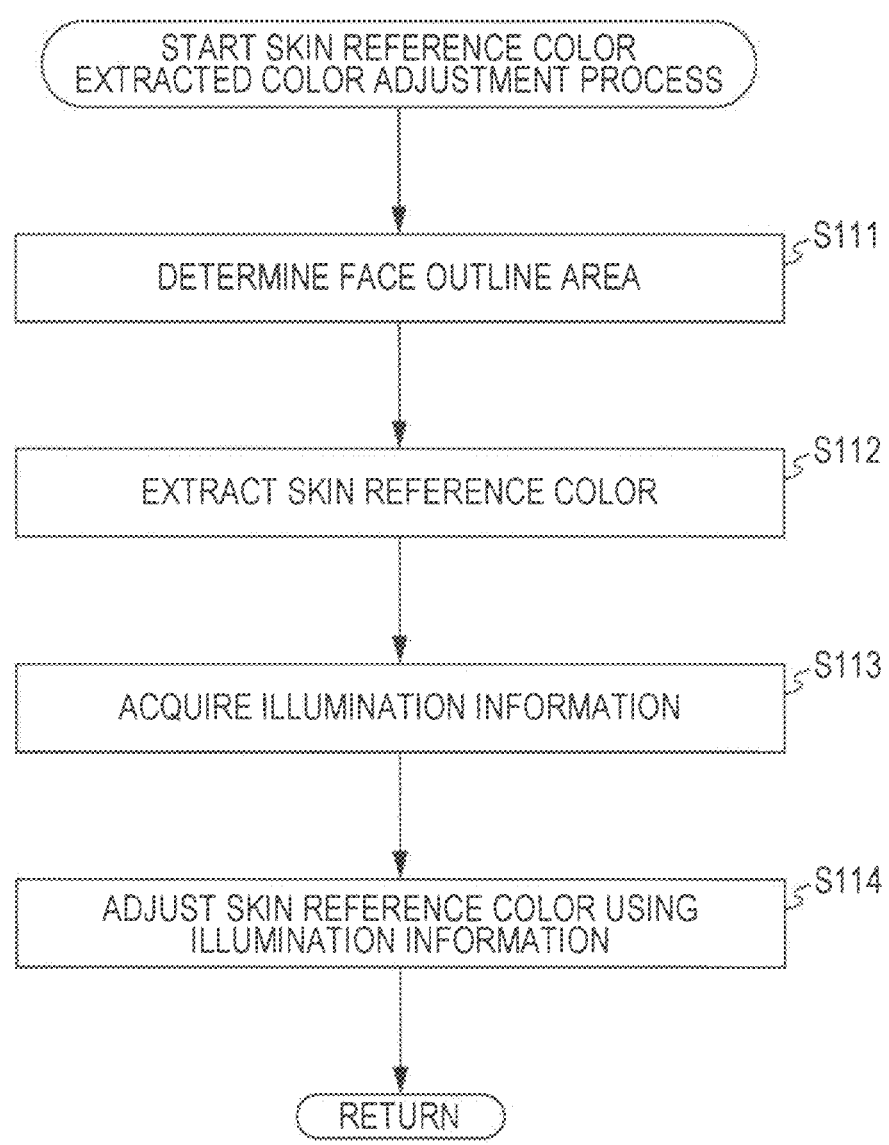
FIG. 23 is a flowchart describing the details of a skin reference color extracted color adjustment process.

FIG. 22 is a diagram showing still another composition of an embodiment of the portrait image generating device to which the present invention is applied.

The portrait image generating device 1 of FIG. 22 has a difference in that there is provided an illumination condition recognition unit 22 for recognizing an illumination state from the input image, in comparison to the portrait image generating device 1 of FIG. 1. Furthermore, in FIG. 22, the same portions as those of FIG. 1 will be given with the same reference numerals, and description on portions for the same process will be appropriately omitted.

The illumination condition recognition unit 22 is supplied with an input image from the target image acquisition unit 11. The illumination condition recognition unit 22 performs a predetermined image process for recognizing the illumination state for the input image supplied from the target image acquisition unit 11 to recognize the illumination state.

The recognition result of the illumination state is supplied to the color adjustment unit 18 as illumination information. It is discriminated and recognized, for example, whether the input image has been captured outdoors or indoors as the illumination state.

The color adjustment unit 18 adjusts the reference color to the color for the portrait image according to grayscale converting conditions based on the illumination information from the illumination condition recognition unit 22, and supplies the information obtained by the adjustment of the color adjustment setting to the drawing creation unit 19.

In other words, the skin color adjustment unit 18A adjusts the skin reference color to the skin color to be used in the portrait image based on the illumination information. In the same manner, the hair color adjustment unit 18B adjusts the hair reference color to the hair color to be used in the portrait image based on the illumination information. In addition, the illustration image color adjustment unit 18C adjusts the color of the corresponding illustration image to the color for the portrait image based on each part reference color and the illumination information.

The drawing creation unit 19 fills the area of the union of the face outline area and the hair area with the skin color subjected to the adjustment of the color adjustment setting using the illumination information, and fills the hair area with the hair color subjected to the adjustment of the color adjustment setting using the illumination information thereon, to draw a base image. The drawing creation unit 19 further performs a predetermined image process for the illustration image subjected to the adjustment of the color adjustment setting using the illumination information, draws and arranges the thus-obtained illustration image on the base image, and generates the portrait image.

The portrait image generating device 1 of FIG. 22 is constituted as above.

[Description on Portrait Image Generation Process]

Next, a portrait image generation process executed by the portrait image generating device 1 of FIG. 22 will be described.

Furthermore, the portrait image generation process executed by the portrait image generating device 1 of FIG. 22 is basically the same as the portrait image generation process of FIG. 3 described above, but has a difference in that the color adjustment setting is adjusted using the illumination information in the skin reference color extracted color adjustment process (the process of Step S14), the hair reference color extracted color adjustment process (the process of Step S15), and the part reference color extracted color adjustment process (the process of Step S17). Therefore, herein, the skin reference color extracted color adjustment process mainly corresponding to the process of Step S14 of FIG. 3 will be described with reference to the flowchart of FIG. 23.

In Steps S111 and S112, the face outline area is determined by the face outline area determination unit 14, and the skin reference color is extracted by the skin reference color extraction unit 17A in the same manner as in Steps S31 and S32 of FIG. 4.

In Step S113, the illumination condition recognition unit 22 performs a predetermined image process for recognizing the illumination state for the input image, and acquires thus-obtained illumination information. The illumination information is supplied to the skin color adjustment unit 18A.

In Step S114, the skin color adjustment unit 18A adjusts the skin reference color according to grayscale converting conditions based on the acquired illumination information, and converts the color to the skin color to be used in the portrait image.

Herein, the adjustment of the color adjustment setting using the illumination information will be described in detail with reference to FIG. 24.

Figure 24:
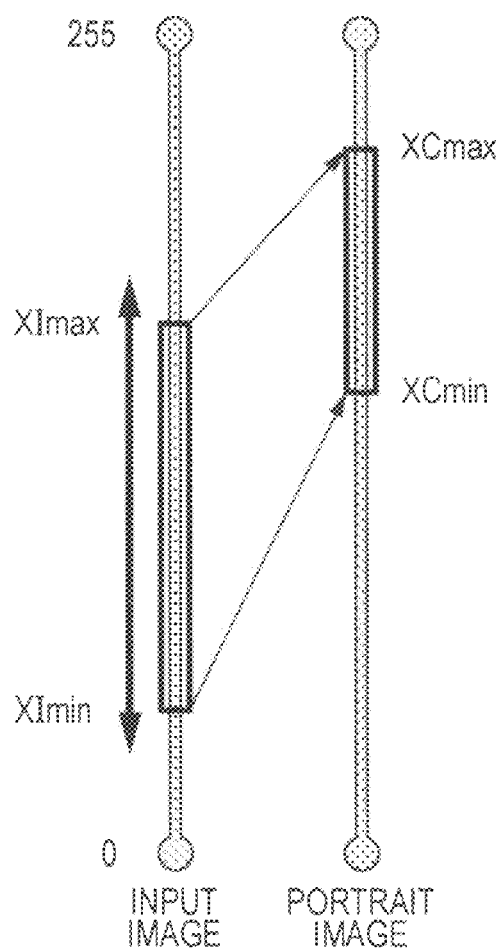
FIG. 24 is a diagram illustrating the adjustment of color adjustment setting according to an illumination state during capturing.

FIG. 24 shows that the color range of the reference color indicated by [XImin, XImax] is converted to [XCmin, XCmax] as the color range in the portrait image, but as shown by arrows in the drawing, values of XImin and XImax are adjusted according to score values obtained from the illumination information.

To be more specific, as an example of a method of adjusting the color adjustment setting using the illumination information, the description of a method using outdoor information is as follows.

Herein, in indoor/outdoor recognition of the input image, it is assumed that a score S is obtained in the range of [0.0 (indoor), 1.0 (outdoor)]. If the color range of the reference color when an indoor/outdoor recognition score S is 0.0 (maximum indoor score) is set to [XIImin, XIImax] (X is any one of RGB), and the color range of the reference color when an indoor/outdoor recognition score S is 1.0 (maximum outdoor score) is set to [XIOmin, XIOmax], the color range of the reference color [XImin, XImax] by the following Formula (4) can be obtained from the indoor/outdoor recognition score S.

$RI\text{max}=(RI O\text{max}-RII\text{max})*S+RII\text{max}$ $RI\text{min}=(RI O\text{min}-RII\text{min})*S+RII\text{min}$ $GI\text{max}=(GI O\text{max}-GII\text{max})*S+GII\text{max}$ $GI\text{min}=(GI O\text{min}-GII\text{min})*S+GII\text{min}$ $BI\text{max}=(BI O\text{max}-BII\text{max})*S+BII\text{max}$ $BI\text{min}=(BI O\text{min}-BII\text{min})*S+BII\text{min}$ (4)

By using [XImin, XImax] obtained as above, colors [R, G, B] to be used in the portrait image are obtained.

FIG. 25 shows an example of specific values necessary when the color adjustment setting for the skin color is adjusted by using the indoor/outdoor recognition scores.

In the outdoor case, the setting is [RImin, RImax]=[155, 195], [GImin, GImax]=[118, 158], and [BImin, BImax]=[112, 152], on the other hand, in the indoor case, the setting is [RImin, RImax]=[111, 151], [GImin, GImax]=[42, 82], and [BImin, BImax]=[12, 52]. The average color expressed by those RGB values is shown in the field of "average color" of FIG. 25, but it is obvious that the average color of the indoor setting is darker overall than the average color of the outdoor setting. Accordingly, a similar reference color is extracted even if the capturing conditions are different in the images captured indoors and outdoors in FIGS. 21A and 21B described above.

The adjustment of the color adjustment setting using the illumination information is performed as above.

In other words, if the color of the input image is used as it is to generate the portrait image, the color may be unnatural depending on the capturing conditions (for example, the illumination state or the like). Therefore, in the third embodiment, in order to avoid the color being unnatural in the portrait image, the range of a color to be used in the portrait image is determined in advance, and a color to be used according to color information of the input image and the illumination state or the like is determined within the range.

Accordingly, the illumination state during capturing, for example, capturing of a dark room, use of a flash, or the like can be presumed from image recognition of the input image, and the information can be reflected in the color adjustment setting. For example, if there is an image captured in a dark place, the illumination is made to be bright, if necessary, to reflect on the color for skin, or the like.

Hereinabove, the skin reference color extracted color adjustment process has been described, but the adjustment of the color adjustment setting using the illumination information is performed in the same manner as in the hair reference color extracted color adjustment process (the process of Step S15) and the part reference color extracted color adjustment process (the process of Step S17) as described above. Since the adjustment of the color adjustment setting using the illumination information performed in the hair reference color extracted color adjustment process and the part reference color extracted color adjustment process is the same as the adjustment of the color adjustment setting using the illumination information performed in the skin reference color extracted color adjustment process described above, the description thereof will not be repeated.

Furthermore, the color of the portrait image can be adjusted by using parameters such as information on lens aperture, or capturing with a flash added during capturing, for example, Exif (Exchangeable Image File Format), or the like, in the same manner as in the method described above.

Furthermore, as capturing conditions, information regarding weathers such as sunny, cloudy, rainy, or the like and information regarding time such as morning, afternoon, night (a night view), or the like can be used in addition to indoor/outdoor information as described above.

The portrait image generation process by the portrait image generating device 1 of FIG. 22 is executed as above.

<4. Fourth Embodiment>

Next, a fourth embodiment of the present invention will be described with reference to FIGS. 26 to 31.
[Method of Adjusting Color Adjustment Setting by User]

In the example described above, a method is described in which recognition of capturing conditions such as face attributes, the illumination state, or the like is automatically performed, and the color adjustment setting is performed using the scores. The information used in the color adjustment setting, for example, the fact attribute information such as the gender of a person, the facial expression, or the like, or the illumination information such as indoor or outdoor capturing may be set by a user. In other words, in such a case for example, a face attribute mode pertaining to the face attribute information and a illumination state mode pertaining to the illumination information are switched by a user. Hence, hereinbelow, as the fourth embodiment, a method of adjusting the color adjustment setting performed according to a mode set by a user will be described.

[Composition Example of Portrait Image Generating Device]

Figure 26:
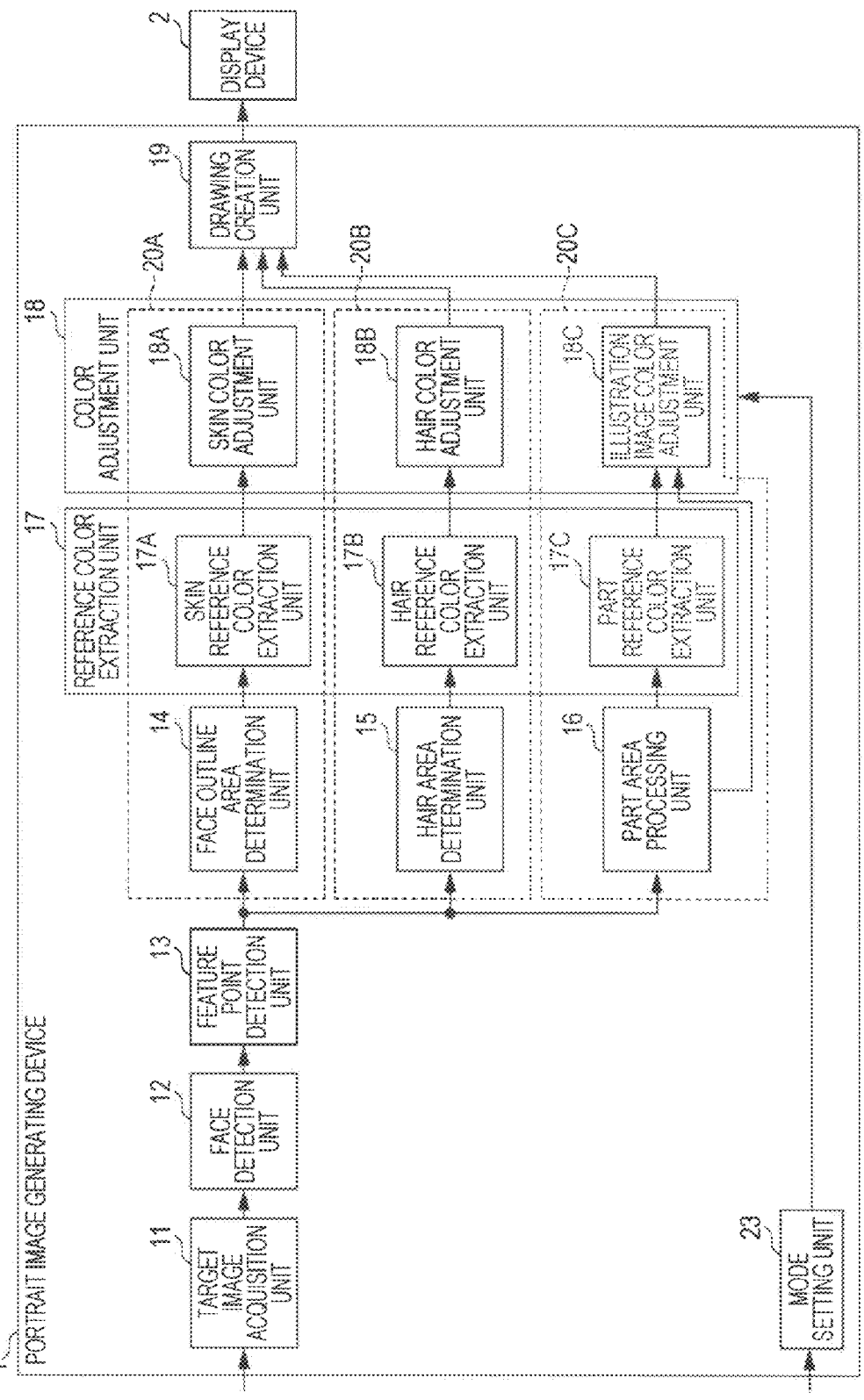
FIG. 26 is a diagram showing the composition of an embodiment of a portrait image generating device to which the present invention is applied.

FIG. 26 is a diagram showing still another composition of an embodiment of the portrait image generating device to which the present invention is applied.

The portrait image generating device 1 of FIG. 26 has a difference in that there is provided a mode setting unit 23, in comparison to the portrait image generating device 1 of FIG. 1. In FIG. 26, the same portions as in FIG. 1 is given with the same reference numerals, and description on portions for the same process will be appropriately omitted.

The mode setting unit 23 sets various modes according to the operation of a user. Information regarding the set mode is supplied to the color adjustment unit 18. As such as mode, for example, a face attribute mode regarding the face attribute information such as the gender of a person, the facial expression, and the like, or an illumination state mode regarding the illumination information such as indoor or outdoor capturing is set.

The color adjustment unit 18 adjusts the reference color to a color for the portrait image according to the grayscale converting conditions based on the information regarding the mode supplied from the mode setting unit 23, and supplies the information obtained from the adjustment of the color adjustment setting to the drawing creation unit 19.

In other words, the skin color adjustment unit 18A adjusts the skin reference color to the skin color to be used in the portrait image based on the information regarding the mode. In the same manner, the hair color adjustment unit 18B adjusts the hair reference color to the hair color to be used in the portrait image based on the information regarding the mode. In addition, the illustration image color adjustment unit 18C adjusts the color of the corresponding illustration image to a color for the portrait image based on each part reference color and the information regarding the mode.

The drawing creation unit 19 fills the area of the union of the face outline area and the hair area with the skin color subjected to the adjustment of the color adjustment setting using the mode information, and fills the hair area with the hair color subjected to the adjustment of the color adjustment setting using the mode information thereon, to draw a base image. After that, the drawing creation unit 19 further performs a predetermined image process for the illustration image subjected to the adjustment of the color adjustment setting using the mode information, draws and arranges the thus-obtained illustration image on the base image, and generates the portrait image.

The portrait image generating device 1 of FIG. 26 is constituted as above.

[Description on Portrait Image Generation Process]

Figure 27:
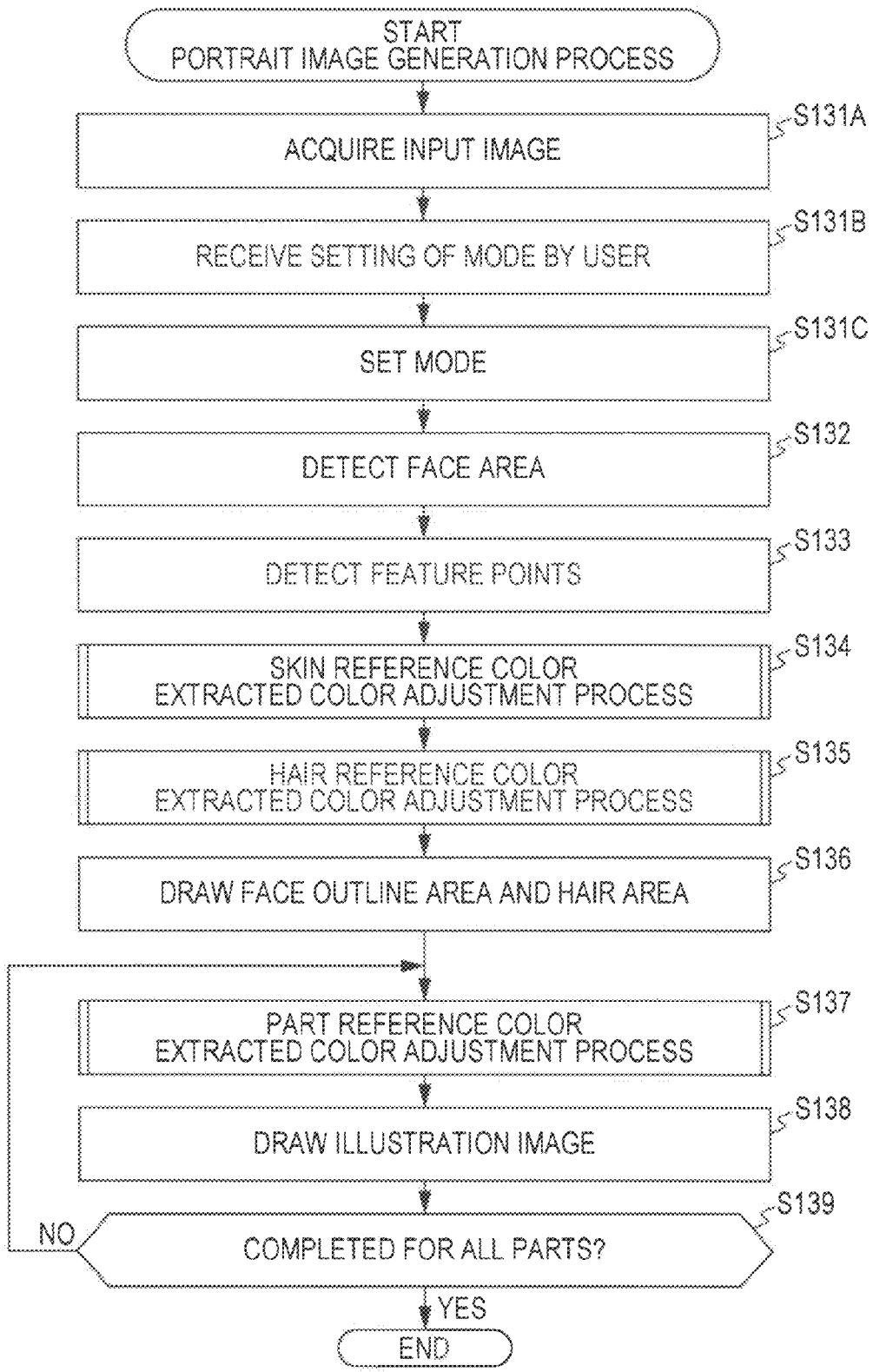
FIG. 27 is a flowchart describing a portrait image generation process.

Next, a portrait image generation process executed by the portrait image generating device 1 of FIG. 26 will be described with reference to the flowchart of FIG. 27.

In Step S131A, an input image including a face image such as a captured image is acquired by the target image acquisition unit 11 as in Step S11 of FIG. 3.

The mode setting unit 23 receives setting of a mode by a user in Step S131B and sets a mode designated by the user in Step S131C.

For example, the user who recognized the input image sets a mode according to the target input image. After that, when the generation of a portrait image is designated at the mode set by the user, the process of Steps S132 and thereafter is executed. Basically in Steps S132 to S139, the same process as in Steps S12 to S19 of FIG. 3 is executed, but it is different that the adjustment of the color adjustment setting using the information regarding mode is performed in the skin reference color extracted color adjustment process (the process of Step S134), the hair reference color extracted color adjustment process (the process of Step S135), and the part reference color extracted color adjustment process (Step S137).

Therefore, herein, the skin reference color extracted color adjustment process corresponding to the process of Step S134 of FIG. 27 will mainly be described with reference to the flowchart of FIG. 28.

In Steps S151 and S152, the face outline area is determined by the face outline area determination unit 14, and the skin reference color is extracted by the skin reference color extraction unit 17A in the same manner as in Steps S31 and S32 of FIG. 4.

In Step S153, the skin color adjustment unit 18A acquires the information regarding mode set by the mode setting unit 23.

In Step S154, the skin color adjustment unit 18A adjusts the skin reference color according to the grayscale converting conditions based on the information regarding mode set by the user, and converts the color to the skin color to be used in the portrait image.

Herein, the adjustment of the color adjustment setting using the information regarding mode will be described in detail with reference to FIGS. 29A to 30B.

Figure 29A:
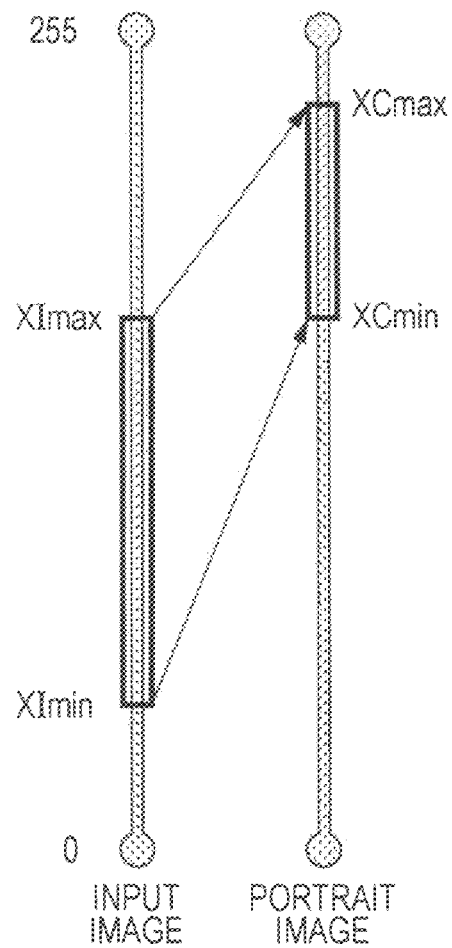
FIGS. 29A and 29B are diagrams illustrating the adjustment (gender) of color adjustment setting by a user.
Figure 29B:
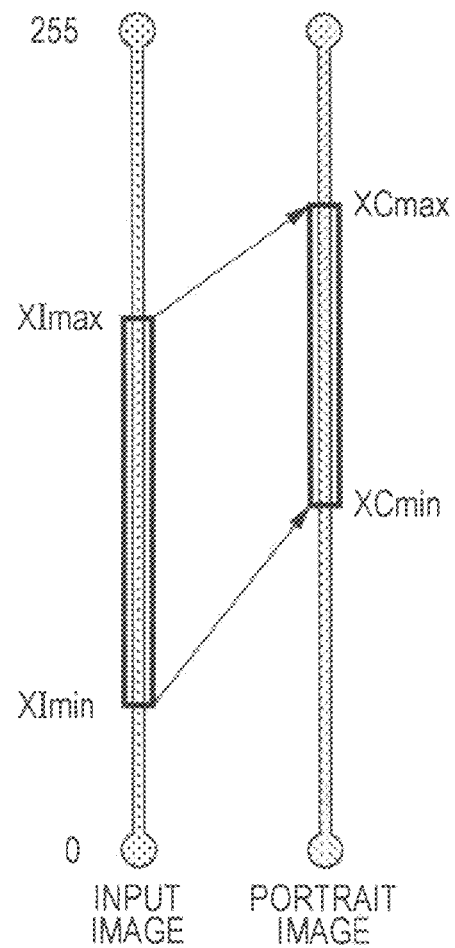

FIGS. 29A and 29B are diagrams describing the adjustment of the color adjustment setting when the gender of a person is set as a face attribute mode by a user.

FIGS. 29A and 29B show that the color range of the reference color indicated by [XImin, XImax] is converted to [XCmin, XCmax] as the color range in the portrait image, but values of XCmin and XCmax are adjusted according to the set mode. In other words, when a mode is within the color range in the portrait image, but the mode set for a woman is selected, the maximum grayscale value and the minimum grayscale value are increased together as shown in FIG. 29A, in comparison to the case where a mode set for a man of FIG. 29B is selected.

By using information regarding a mode for gender as above, when the mode set for a woman is selected by the user, the skin color of the portrait image can be close to white, on the other hand, when the mode set for a man is selected, the skin color of the portrait image can be close to black.

Figure 30A:
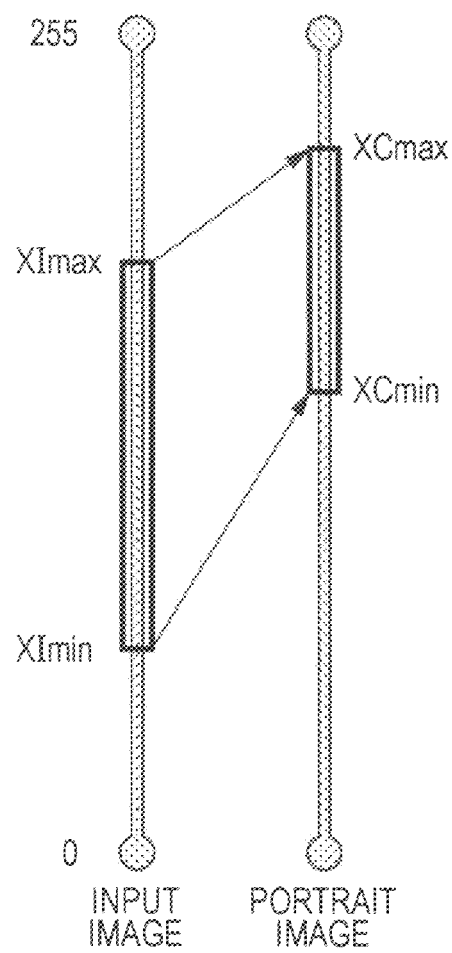
FIGS. 30A and 30B are diagrams illustrating the adjustment (capturing place) of color adjustment setting by a user.
Figure 30B:
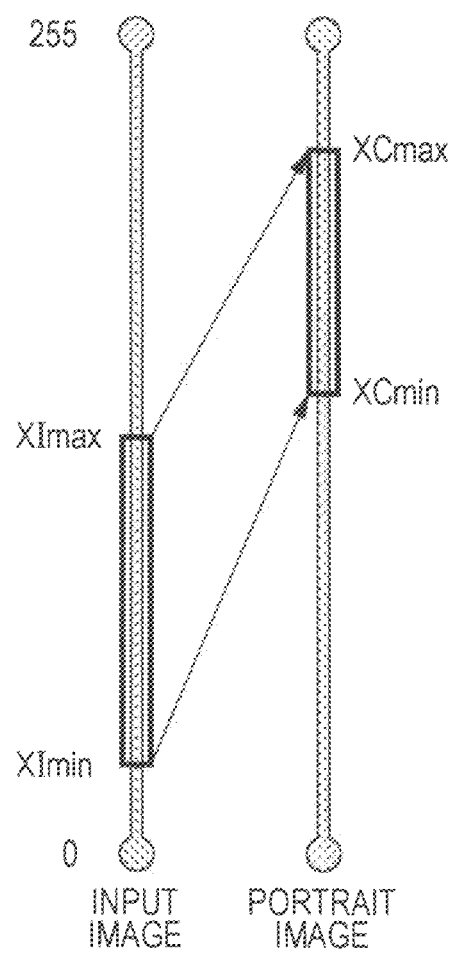

FIGS. 30A and 30B are diagrams describing the adjustment of the color adjustment setting when a capturing place such as indoor or outdoor is set as an illumination state mode by the user.

FIGS. 30A and 30B show that the color range of the reference color indicated by [XImin, XImax] is converted to [XCmin, XCmax] as the color range in the portrait image, but values of XImin and XImax are adjusted according to the set mode. In other words, when the mode in the color range of the reference color obtained from the input image but the mode set for outdoor capturing is selected, the maximum grayscale value and the minimum grayscale value are increased together, in comparison to a case where a mode set for indoor capturing is selected.

By using the information regarding mode for capturing place as above, for example, a similar reference color is extracted even if capturing conditions are different in the images captured indoors and outdoors.

FIG. 31 is a diagram showing an example of specific values of a color adjustment setting of a mode for gender and capturing place.

As shown in FIG. 31, as a default setting, the R value is converted from [RImin, RImax]=[90, 170] to [RCmin, RCmax]=[217, 255], the G value is converted from [GImin, GImax]=[60, 140] to [GCmin, GCmax]=[191, 231], and the B value is converted from [BImin, BImax]=[40, 120] to [BCmin, BCmax]=[172, 212].

As the mode for gender, when a mode set for a woman is selected, the R value is converted from [RImin, RImax]=[90, 170] to [RCmin, RCmax]=[227, 255], the G value is converted from [GImin, GImax]=[60, 140] to [GCmin, GCmax]= [214, 254], and the B value is converted from [BImin, BImax]=[40, 120] to [BCmin, BCmax]=[205, 245].

On the other hand, as the mode for gender, when the mode set for a man is selected, the R value is converted from [RImin, RImax]=[90, 170] to [RCmin, RCmax]=[197, 237], the G value is converted from [GImin, GImax]=[60, 140] to [GCmin, GCmax]=[142, 182], and the B value is converted from [BImin, BImax]=[40, 120] to [BCmin, BCmax]=[101, 141].

In addition, as the mode for capturing place, when the mode set for outdoor capturing is selected, the R value is converted from [RImin, RImax]=[155, 195] to [RCmin, RCmax]=[217, 255], the G value is converted from [GImin, GImax]=[118, 158] to [GCmin, GCmax]=[191, 231], and the B value is converted from [BImin, BImax]=[112, 152] to [BCmin, BCmax]=[172, 212].

On the other hand, as the mode for capturing place, when the mode set for indoor capturing is selected, the R value is converted from [RImin, RImax]=[111, 151] to [RCmin, RCmax]=[217, 255], the G value is converted from [GImin, GImax]=[42, 82] to [GCmin, GCmax]=[191, 231], and the B value is converted from [BImin, BImax]=[12, 52] to [BCmin, BCmax]=[172, 212].

As such, the adjustment of the color adjustment setting using the information regarding mode is performed.

In other words, if the color of the input image is used as it is to generate the portrait image, the color may be unnatural depending on the ambiance (for example, the gender, the facial expression, or the like) and capturing conditions (the illumination state or the like) of the portrait image, and a color to be used is different. Therefore, in the fourth embodiment, in order to avoid the color being unnatural in the portrait image, the range of a color to be used in the portrait image is determined in advance, and a color to be used according to the mode set by the user and the color information of the input image is determined within the range.

Hereinabove, the skin reference color extracted color adjustment process has been described, but the adjustment of the color adjustment setting using the information regarding mode is performed in the same manner as in the hair reference color extracted color adjustment process (the process of Step S135 of FIG. 27) and the part reference color extracted color adjustment process (the process of Step S137 of FIG. 27) as described above. Since the adjustment of the color adjustment setting using the information regarding mode performed in the hair reference color extracted color adjustment process and the part reference color extracted color adjustment process is the same as the adjustment of the color adjustment setting using the information regarding mode performed in the skin reference color extracted color adjustment process described above, the description thereof will not be repeated.

In addition, in the same manner as in the method described above, for example, a mode pertaining to facial expression attributes such as a smiling face, weather attributes such as sunny, cloudy, or the like, or time attributes such as a night view, or the like may be set by a user, and a plurality of color adjustment setting may be prepared for one kind of attribute. For example, a plurality of color adjustment settings regarding the attribute of the gender of a person may be prepared to be switched to one another.

The portrait image generation process by the portrait image generating device 1 of FIG. 26 is executed as above.

<5. Modified Example>

With the combination of the second to the fourth embodiments of the present invention, both of the face attribute information and the illumination information may be used to perform the adjustment of the color adjustment setting, and further, the information may be selected by a user as a mode.

In addition, in the above description, description has been provided for the example where the color adjustment setting is adjusted for all the face outline area, the hair area, and each part area, but the color adjustment setting may be adjusted only for a part of the areas, for example the color adjustment setting is adjusted only for the skin reference color in the face outline area. Furthermore, there is a method of determining those face outline area, hair area or part area, but the method is not limited thereto, and an existing method can be used.

In addition, in this embodiment, the color of the skin, the hair or the like of the portrait image may be a plurality of colors, not a single color, and gradation may be applied thereto. For the adjustment of a parameter for setting gradation, the above-described face attributes, capturing conditions and the like may be used. Furthermore, the adjustment of the color adjustment setting may be performed according to a predetermined theme for the portrait image. The theme of a portrait image is, for example, of an abstract icon, of a drama, or the like, and the color range of a color to be used in a portrait image is supposed to be determined by combining, for example, the theme of a portrait and each part to be used.

In addition, in the above description, an example where each part of a portrait image is selected from illustration images and model images corresponding to part correspondence information, but it is not limited to the method, and an image of each part may be selected and drawn by other methods. Furthermore, the presence of an eyeglass may be determined by the face attribute recognition unit 21 as a face attribute. Then, when the face attribute recognition unit 21 determines there is an eyeglass, the drawing creation unit 19 draws the image of the frame portion of the eyeglass on a predetermined position on a base image according to anchor point defining information.

Furthermore, in the above embodiments, the portrait image generating device 1 and the display device 2 are described as separate devices, but it can be understood that a display unit as a processing unit corresponding to the display device 2 is provided in the portrait image generating device 1. In this case, the drawing creation unit 19 causes the screen of the display unit to display a generated portrait image.

Moreover, the portrait image generated by the drawing creation unit 19 can be not only displayed on the screen of the display device 2, but also compressed in a predetermined compression format such as JPEG (Joint Photographic Experts Group), and stored in a predetermined recording medium as a file.

<6. Composition Example Of Pre-Processing Device>
[Composition Example of Pre-Processing Device]

Next, as a prior process necessary for the portrait image generating device 1 of FIG. 1 to execute the portrait image generation process, description sill be provided on a learning process for generating the K-class classifier 32, a generation process for generating a model image, a setting process for setting various information such as part correspondence information, anchor point defining information, and the like. Such pre-processes are executed by a pre-processing device.

Figure 32:
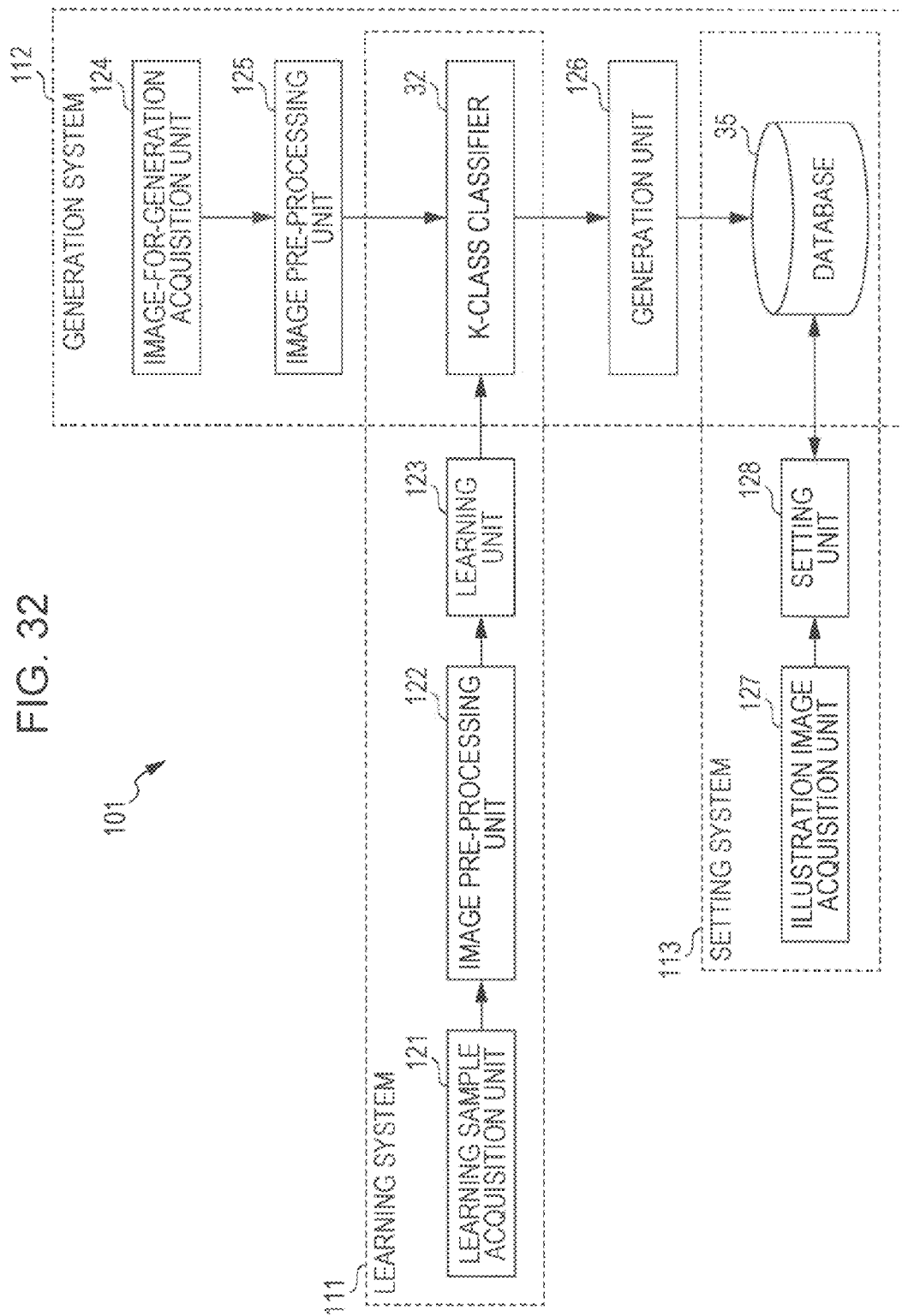
FIG. 32 is a diagram showing an example of the composition of a pre-processing device.

FIG. 32 is a diagram showing an example of the composition of the pre-processing device.

As shown in FIG. 32, the pre-processing device 101 is constituted by a learning system 111 for performing a learning process, a generation system 112 for performing a generation process, a setting system 113 for performing a setting process.

The learning system 111 includes a learning sample acquisition unit 121, an image pre-processing unit 122, a learning unit 123, and a K-class classifier 32. The generation system 112 includes an image-for-generation acquisition unit 124, an image pre-processing unit 125, a K-class classifier 32, a generation unit 126, and a database 35. The setting system 113 includes an illustration image acquisition unit 127, a setting unit 128, and a database 35.

Furthermore, in FIG. 32, portions corresponding to those of FIG. 1 are given with the same reference numerals, and the description thereof will be appropriately omitted. In other words, FIG. 32 illustrates the K-class classifier 32 and the database 35 same as in FIG. 1, but in the pre-processing device 101, the K-class classifier 32 constituting the portrait image generating device 1 is formed, and further, a process for setting and registering various information in the database 35 is performed.

First of all, the learning system 111 will be described.

The learning sample acquisition unit 121 acquires face images (hereinafter, referred to as sample image) prepared with a variety of K-number of sample persons (K=1, 2, ..., K), and supplies the images to the image pre-processing unit 122.

The image pre-processing unit 122 detects a face area from a sample image supplied from the learning sample acquisition unit 121, and performs a re-sizing process to a predetermined image size. In the re-sizing process, the area is re-sized to a size in accordance with an image size defined in the above-described part area defining information (FIG. 13). Then, the image pre-processing unit 122 cuts out a part area from the face area subjected to the re-sizing according to part area defining information, and supplies the area to the learning unit 123.

The learning unit 123 obtains a image feature amount of a part image in the part area supplied from the image pre-processing unit 122, learns a plurality of weak classifiers by AdaBoost ECOC (Error Correct Output Coding), and generates the K-class classifier 32 formed by the plurality of weak classifiers.

Next, the generation system 112 will be described.

The image-for-generation acquisition unit 124 acquires a plurality of face images (hereinafter, referred to as images-for-generation) extracted at random for generating model images, and supplies the images to the image pre-processing unit 125.

The image pre-processing unit 125 cuts out a part area by re-sizing an image-for-generation from the image-for-generation acquisition unit 124 and supplies the area to the K-class classifier 32, in the same manner as in the process of re-sizing the sample image in the image pre-processing unit 122.

The K-class classifier 32 obtains a K-dimensional score vector corresponding to the part image in the part area supplied from the image pre-processing unit 125, and supplies the score vector to the generation unit 126.

The generation unit 126 classifies the part image into N-number (N=1, 2, ..., N) prototypes based on the K-dimensional score vector supplied from the K-class classifiers 32, and generates a model image by obtaining an average image of a part image group that belong to each prototype. The model image is registered in the database 35.

Next, the setting system 113 will be described.

The illustration image acquisition unit 127 acquires illustration images for each part and supplies them to the setting unit 128.

The setting unit 128 sets part correspondence information by corresponding the illustration images supplied from the illustration image acquisition unit 127 and the model image registered in the database 35, and registers the information in the database. In addition, the setting unit 128 sets anchor point defining information and registers the information in the database 35.

As above, the pre-processing device 101 is constituted.
[Description on Pre-Process]

Figure 33:
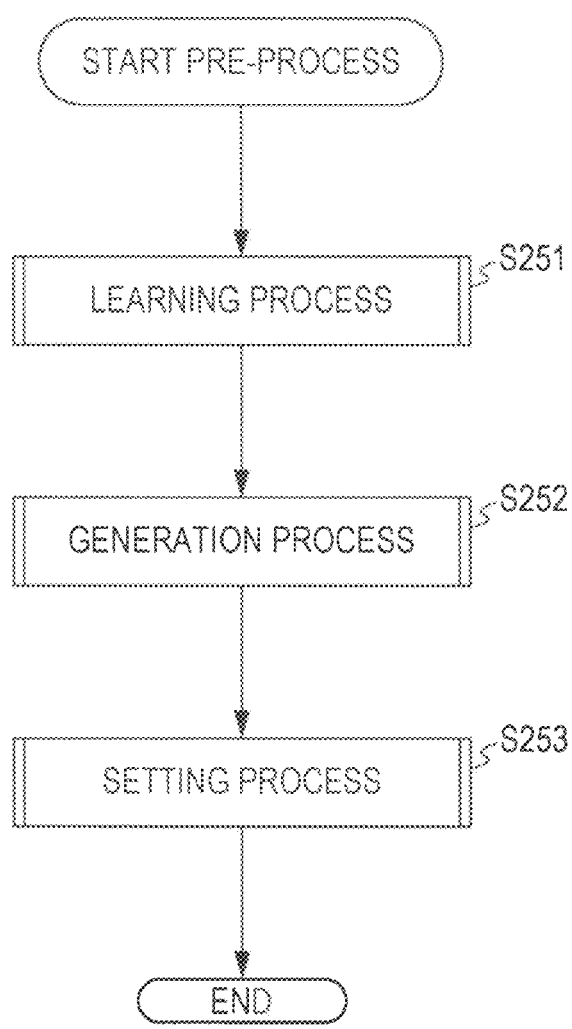
FIG. 33 is a flowchart describing the pre-process.

Next, a pre-process executed by the pre-processing device 101 of FIG. 32 will be described with reference to the flowchart of FIG. 33.

In Step S251, the learning system 111 of the pre-processing device 101 generates the K-class classifier 32 by performing a learning process.

In Step S252, the generation system 112 of the pre-processing device 101 generates a model image by performing a generation process and registers the image in the database 35.

In Step S253, the setting system 113 of the pre-processing device 101 sets each of part correspondence information and anchor point defining information by performing a setting process and registers the information in the database 35.

Hereinbelow, Steps S251 to S253 of FIG. 33 mentioned above will be described in detail.
[Details of Learning Process]

Figure 34:
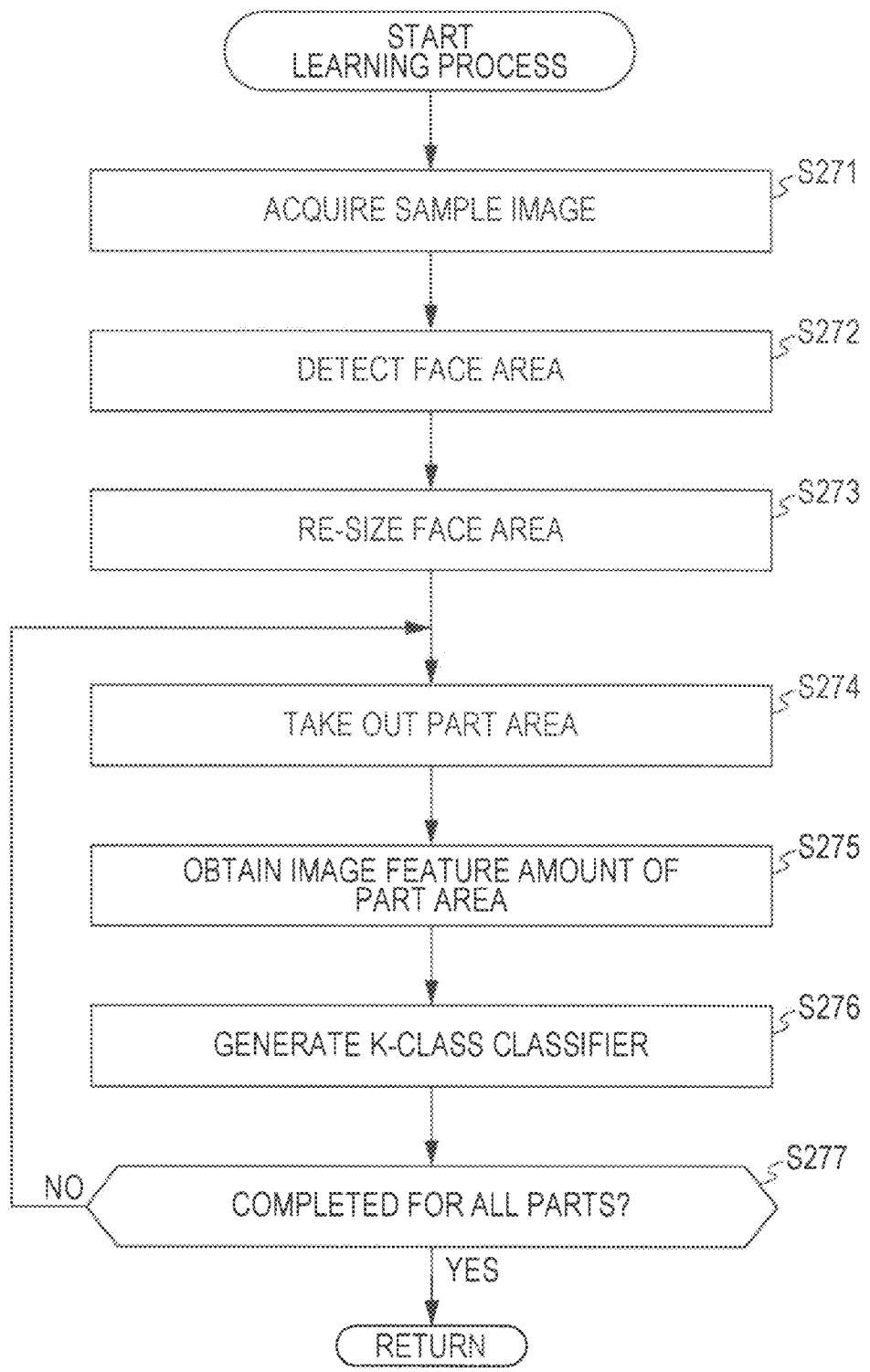
FIG. 34 is a flowchart describing a learning process.

FIG. 34 is a flowchart describing the learning process in detail.

In Step S271, the learning sample acquisition unit 121 acquires sample images prepared with a variety of K-number of sample persons.

The image pre-processing unit 122 detects the face area from the sample images acquired by the learning sample acquisition unit 121 in Step S272, then performs re-sizing for the detected face area to a predetermined image size based on the part area defining information (a process of Step S273), and cuts out a part area from the face area subjected to re-sizing (a process of Step S274).

In the re-sizing process, the area is re-sized to the size of, for example, 64×64 pixels in accordance with the image size defined in the part area defining information of FIG. 13 described before, and for example, an eye part area (point (10, 23)-point (55, 30)) is cut out.

Then, in the learning system 123, an image feature amount of a part image is obtained in Step S275, and the K-class classifier 32 is generated by learning a plurality of weak classifiers by AdaBoost ECOC in Step S276.

Furthermore, the image feature amount of the sample images (part images) is used as the standard of classification in the plurality of weak classifiers for discriminating whether or the each class belongs thereto. As the image feature amount, for example, the Pixel Difference Feature (PixDif Feature) that the present inventors have already suggested can be used.

The Pixel Difference Feature is disclosed in "Learning of Real-Time Arbitrary Posture Face Detector using Pixel Difference Feature" by Sabe and Hidai, Proc. of $10^{th}$ Image Sensing Symposium, pp. 547-552, 2004, and Japanese Unexamined Patent Application Publication No. 2005-157679.

Figure 35:
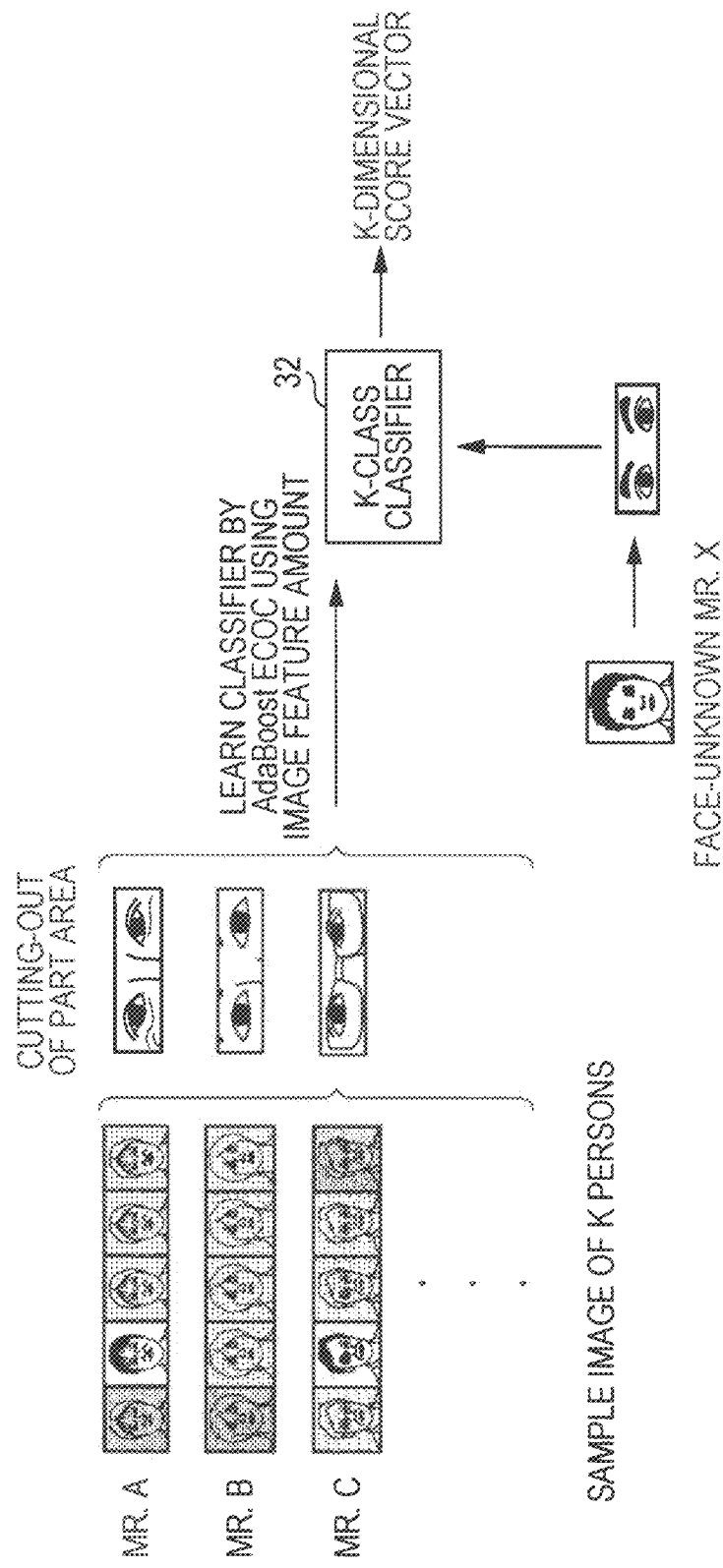
FIG. 35 is a diagram illustrating the details of a K-class classifier.

FIG. 35 is a diagram illustrating the K-class classifier 32 generated by the learning unit 123 in detail.

As shown in FIG. 35, a variety of sample images are acquired for K-number of sample persons including "Mr. A", "Mr. B", "Mr. C", . . . and the like, and after their face areas are re-sized, each part area is cut out from them as described in the process of Steps S271 to S274 of FIG. 34.

In the learning unit 123, the image feature amount for each part image of the face images of the K-number of sample persons obtained as above is calculated by the pixel difference feature, a plurality of weak classifiers are learned by AdaBoost ECOC using the image feature amount, and the K-class classifier 32 is generated as a multi-class classifier.

In the K-class classifier 32 generated as above, a score that indicates how much the input face image is similar to the K-number of sample persons is calculated. Furthermore, the similarity is deemed to get higher as the value of a score gets higher. Accordingly, as described before, the K-class classifier 32 outputs a K-dimensional score vector that is a score of a K-dimension.

As such, a score space formed of the K-dimension is obtained for each part, and for example, if an input par images is of the same person, the distance in the K-dimensional score space is deemed to be close. Then, when the input face image is of "Mr. X" who is an unknown person, each part of "Mr. X" can be quantified with numbers indicating how much the parts are similar to each part of the sample persons including "Mr. A", "Mr. B", "Mr. C", . . . , and the like. Accordingly, the similarity of each part can be determined with the distance in the K-dimensional score space for each part.

Figure 36:
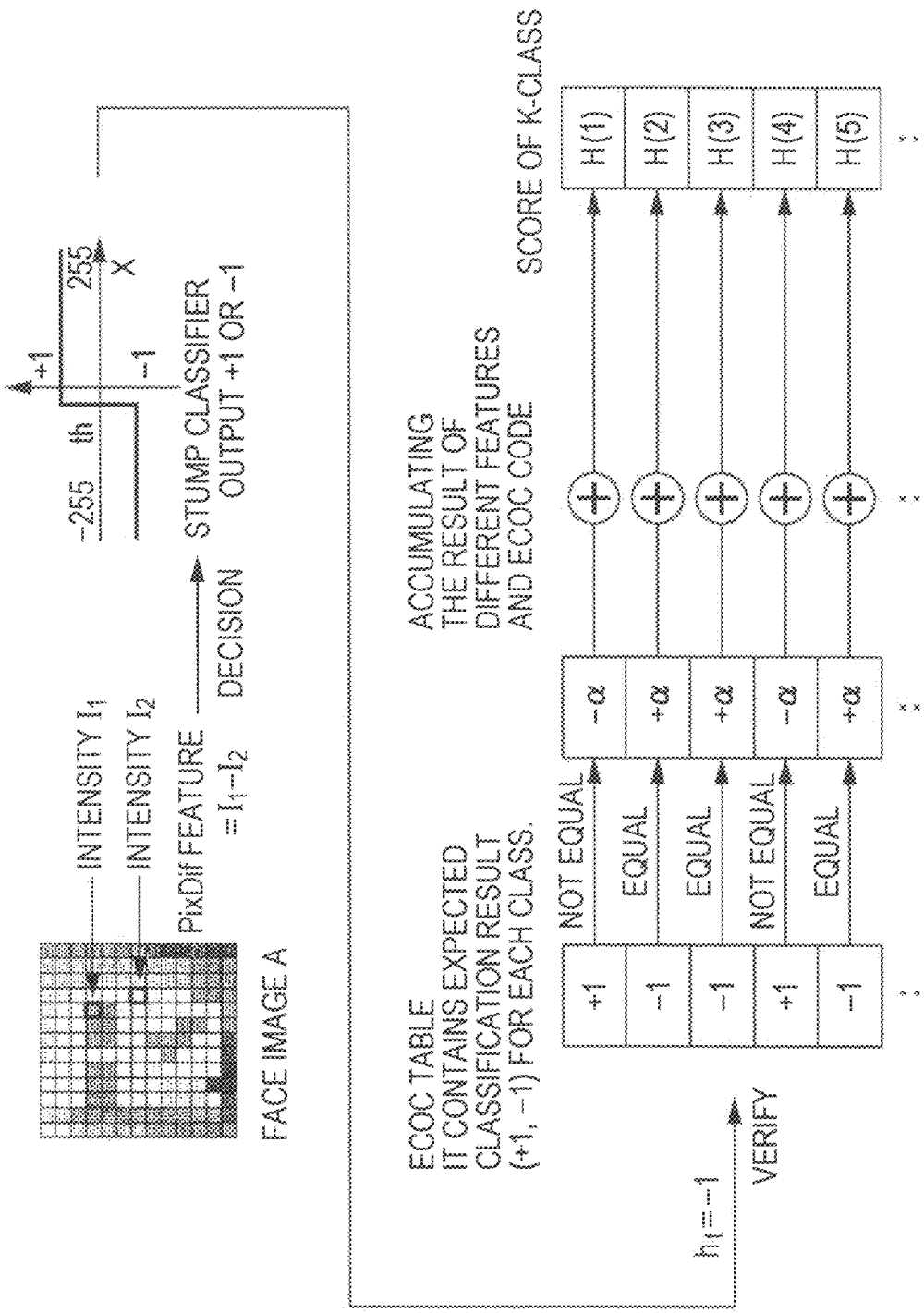
FIG. 36 is a diagram illustrating the details of a calculation procedure of a K-dimensional score vector.

To be more specific, the process shown in FIG. 36 is performed. In other words, by calculating the difference $(I_1-I_2)$ of pixel values (brightness values) $I_1$ and $I_2$ of two pixels on the face image (Face image A), the pixel Difference Feature (PixDif Feature) is obtained. In a binary classification weak classifier h(x) corresponding to the combination of two pixels, true (+1) or false (−1) is classified based on the pixel difference feature $(I_1-I_2)$ and a threshold value Th, as shown in the following Formula (5).

$h(x)=-1$ if $I_1-I_2 \leq Th$ $h(x)=+1$ if $I_1-I_2 > Th$ \hfill (5)

When the h(x) obtained by Formula (5) is compared to the value in the K-th column (+1 or −1) scored in the ECOC bit (ECOC table of the $1^{st}$ line and K-th column) defined for each class, and the classification result coincides with the ECOC bit, the score of the class increases by the degree of reliability α, and on the contrary, when the classification result does not coincide with the ECOC bit, the score decreases by the degree of reliability α.

By repeating the process by the number of the image feature amount, H(1), H(2), H(3), H(4), and H(5) can be obtained as the K-dimensional score vector (Score of K-Class).

Returning to FIG. 34, the learning unit 123 determines whether or not the generation of the K-class classifier 32 ends for all parts in Step S277.

When it is determined that the generation of the K-class classifier 32 does not end for all parts in Step S277, the process returns to Step S274, and the above-described generation process (the process from Steps S274 to S277) is repeated.

In other words, by repeating the generation process, each of the part areas including the eye part area, eyebrow part area, nose part area, mouth part area, and forehead part area is extracted from the face area that has been subjected to the re-sizing according to the part area defining information of FIG. 13, and each K-class classifier 32 is individually generated for those part areas.

Then, the K-class classifier 32 is obtained for each part area defined by the part area defining information of FIG. 13, and the learning process ends.

With the K-class classifier 32 for each part generated as above, the image feature amount of the input face image (part image) can be expressed by a K-dimensional score vector. In other words, for example, if sample persons are set to "Mr. A", "Mr. B", "Mr. C", . . . , and the like, each part of "Mr. X" who is an unknown person can be quantified with numbers indicating how much the part is similar to each part of the sample persons including "Mr. A", "Mr. B", "Mr. C", . . . , and the like.

[Details of Generation Process]

Figure 37:
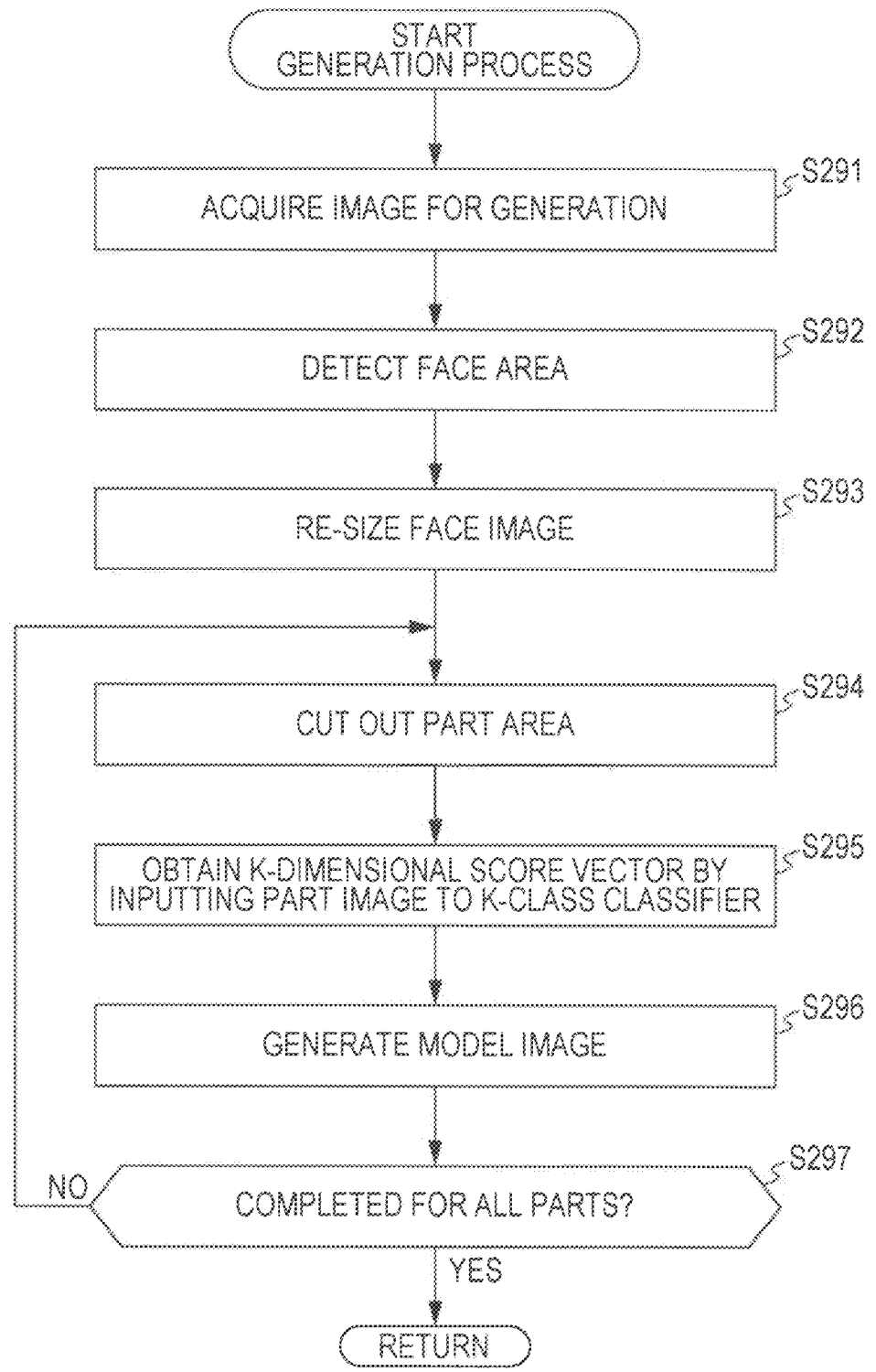
FIG. 37 is a flowchart describing a generation process.

FIG. 37 is a flowchart describing a generation process in detail.

In Steps S291 to S294, the image pre-processing unit 125 detects the face area from an image for generation acquired by an image-for-generation acquisition unit 124 and a part area is cut out from the face area that has been subjected to re-sizing, in the same manner as in Steps S271 to S274 of FIG. 34. Furthermore, as the image for generation, for example, images that includes 10000 sheets of face images extracted at random is used.

A part image that is obtained as above is input to the K-class classifier 32 for each part. In the K-class classifier 32, the pixel difference feature of the input part image is classified by the threshold value, and a K-dimensional score vector is obtained by comparing to an ECOC bit defined for each class in Step S295.

In Step S296, the generation unit 126 performs clustering for a set of the K-dimensional score vector corresponding to the part image computed by the K-class classifier 32 using, for example, k-means algorithm on the K-dimensional score space, and divides the set into N-number of subsets. Accordingly, since the part image is classified into N-number of prototypes, the generation unit 126 generates models images by obtaining an average image of a part image group where each of the classified prototypes belong, and registers the image in the database 35.

Figure 38:
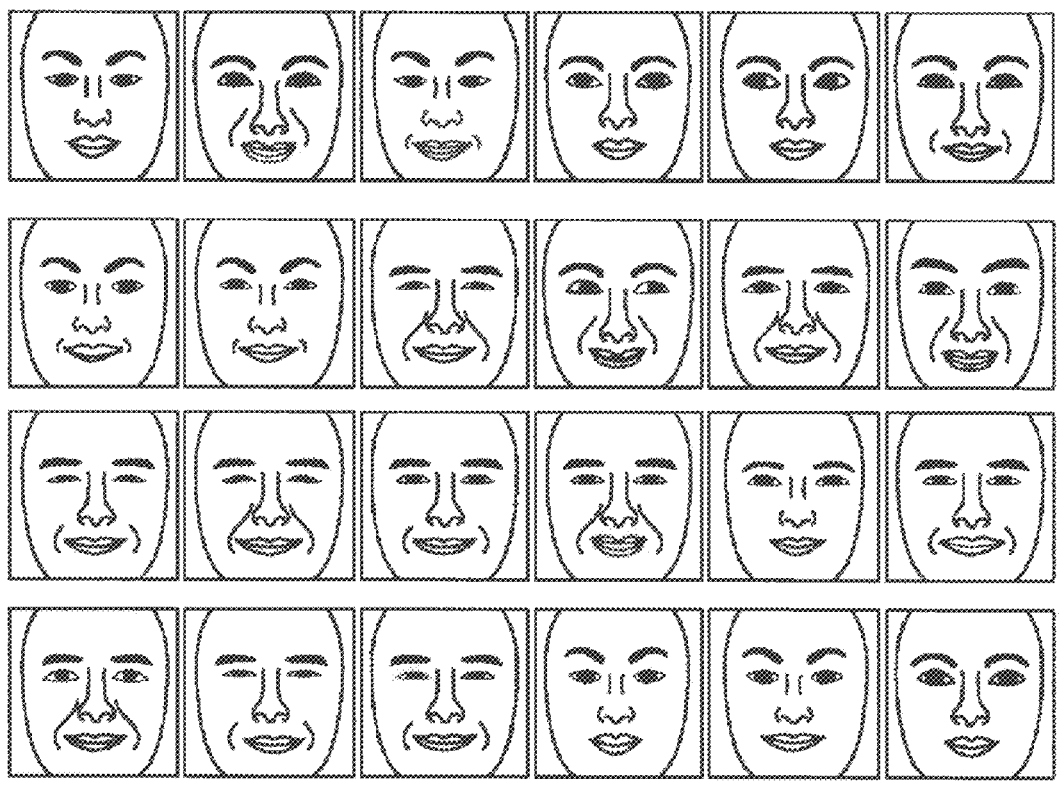
FIG. 38 is a diagram showing examples of model images of eyes.

FIG. 38 is diagram showing examples of model images for eyes.

As shown in FIG. 38, for example, as a cluster of eyes, when the part image for eyes is classified into 24 prototypes, an image that has the average of the part image groups where each prototype belong becomes a model image for eyes. In examples of FIG. 38, it can be understood that, particularly, only the shapes of the eyes are different for each model image of each prototype.

Returning to the flowchart of FIG. 37, in Step S297, the generation unit 126 determines whether or not the generation of the model image has been completed for all parts.

When the generation of the model image is determined to be completed for all parts in Step S297, the process returns to Step S294, and the above-described generation process (the process of Steps S294 to S297) is repeated.

In other words, by repeating the generation process, each part area including the eyebrow part area, the nose part area, the mouth part area, and the forehead part area in addition to the above-described eye part area is extracted from the face area that has been subjected to re-sizing according to the part area defining information of FIG. 13, N-sheets of model images are individually generated for the part areas, and registered in the database 35.

Then, N-sheets of model images for each part area defined by the part area defining information of FIG. 13 are obtained (it is not necessary to make the number of model images for each part area be the same), thereby the generation process ends.

[Setting Process]

Figure 39:
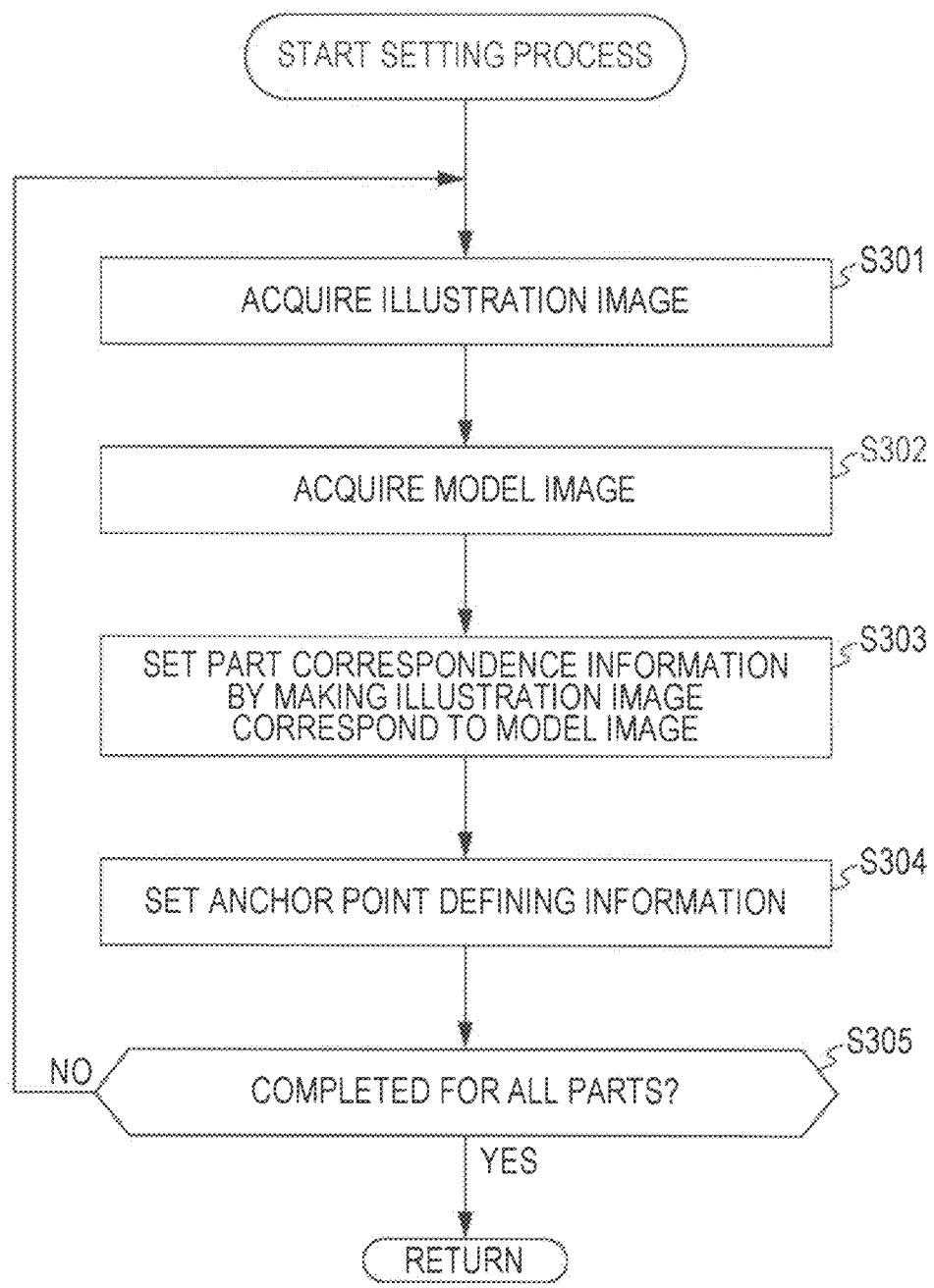
FIG. 39 is a flowchart describing a setting process.

FIG. 39 is a flowchart describing a setting process in detail.

Figure 40:
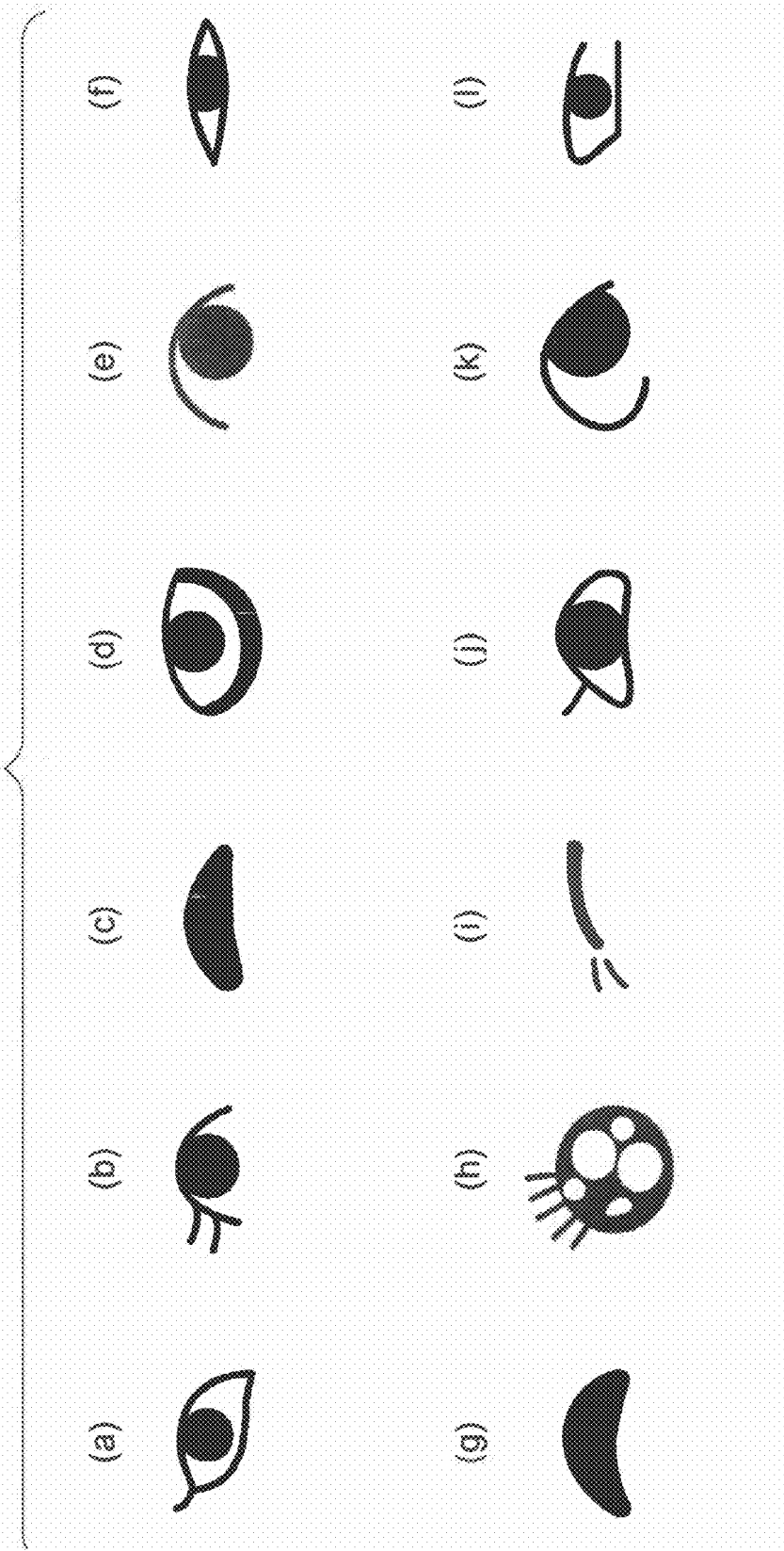
FIG. 40 is a diagram showing examples of illustrating images of eyes.

In Step S301, the illustration image acquisition unit 127 acquires illustration images of each part. When illustration images for eyes are to be set, for example, illustration images with a variety of shapes of eyes are prepared out of parts for constituting a portrait image as shown in (a) to (1) of FIG. 40 as illustration images.

In Step S302, the setting unit 128 acquires model images registered in the database 35. The model images are generated by the generation system 112 and registered in the database 35 (the generation process of FIG. 37), when an illustration image for eyes is to be set, for example, a model images for eyes of FIG. 38 is acquired out of the model images generated for each part area and registered in the database 35.

In Step S303, the setting unit 128 sets part correspondence information to register in the database 35 by making the acquired illustration image correspond to the model image.

As methods of correspondence, there are two kinds the first of which is a method of correspondence by executing an image process for making a pair of a certain model image and an illustration image with the highest similarity from a group of candidate illustration images, and the second of which is a method in which a user instructs correspondence after visually recognizing a model image and selecting an illustration image that is seemed to be similar to the model image from a group of candidate illustration images.

If the correspondence is performed with either of the methods, for example, illustration images (FIG. 40) and models images (FIG. 38) correspond to each other as shown in FIG. 41. In the example of FIG. 41, each of illustration images of 6×4 in accordance with the appearance of eyes corresponds to each of model images of 6×4. Accordingly, the similarity can be calculated not based on geometric size or ratio of a part but based on patterns of the appearance of part images and model images, and similarity that further matches with subjective notions of human beings can be defined.

Figure 42A:
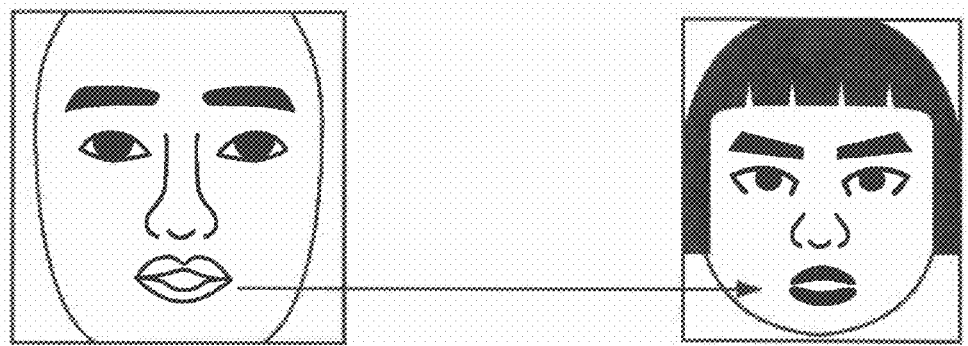
FIGS. 42A and 42B are diagrams illustrating examples when illustration images are extended and drawn.
Figure 42B:
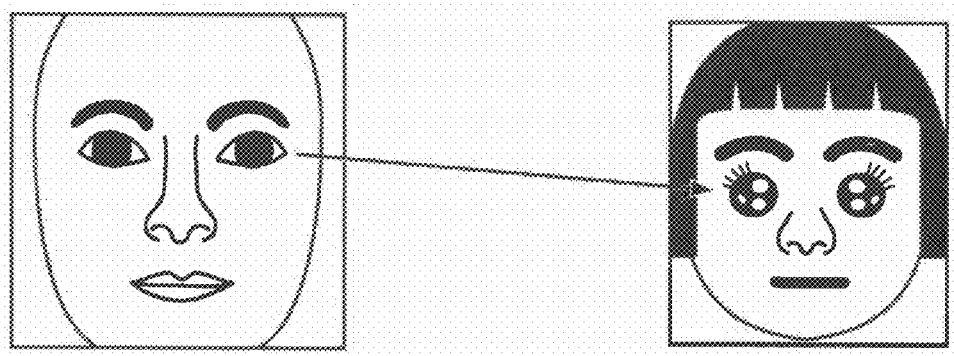

Furthermore, when the user performs visual correspondence, the setting unit 128 can intentionally make correspondence of a model image with a characteristic in the mouth with an illustration image with a characteristic mouth as shown in FIG. 42A. In addition, the setting unit 128 intentionally makes correspondence of a model image with a characteristic in the eyes with an illustration image with characteristic eyes as shown in FIG. 42B based on the instruction of the user.

As such, by assigning illustration images with more exaggerated facial expression than actual appearance to model image when part correspondence information is set, a portrait image having a characteristic of the face that matches with subjective notions of human beings (a portrait image in which a characteristic of the face is further emphasized) can be generated during the generation of the portrait image.

Returning to the flowchart of FIG. 39, in Step S304, the setting unit 128 sets anchor point defining information for each illustration image and registers the information in the database 35, for example, based on the instruction of the user.

As described before on the anchor point defining information with reference to FIGS. 15A and 15B, by setting the locations of each of the anchor points $P_{A1}$ and $P_{A2}$ to further inside and making the interval of the two points narrower than the part points $P_{P1}$ and $P_{P2}$, when the two points are arranged at the corresponding part points $P_{P1}$ and $P_{P2}$, since an image, for example, an illustration image for eyes, is drawn after enlargement, the eyes can be expressed to be larger even in the same illustrations. On the other hand, if the locations of each of the anchor points $P_{A1}$ and $P_{A2}$ are set to further outside, since the interval of the two points is wider than that of the part points $P_{P1}$ and $P_{P2}$ on the contrary, and an image, for example, an illustration image for eyes, is drawn after reduction, the eyes can be expressed to be smaller even in the same illustrations.

As such, since a part can be expressed in a variety of display forms in the same illustration images only by changing the locations of the anchor points, the number of prepared illustration images can be reduced, and modified part images having characteristics of each part can be provided.

Furthermore, the anchor points are not limited to two, but can be set to a number in accordance with the number of corresponding part points.

In Step S305, the setting unit 128 determines whether or not setting of the part correspondence information and the anchor point defining information has been completed for all parts.

When the setting of the part correspondence information and the anchor point defining information for all parts is determined not to be completed in Step S305, the process returns to Step S301, and the above-described setting process (the process of Steps S301 to S305) is repeated.

In other words, with the repetition of the setting process, the illustration images are individually paired with the model images generated for each part area, and the anchor points of the illustration images are individually set.

The correspondence information set in the setting process is registered in the database 35 as part correspondence information. Then, the part correspondence information and anchor point defining information for all parts are set, thereby ending the setting process.

As above, the pre-processing device 101 generates the K-class classifier 32 for each part, furthermore, the part correspondence information and the anchor point defining information are set and registered in the database 35 in advance, and thus, the portrait image generation device 1 using the K-class classifier 32 and the database 35 can generate a portrait image from an input image that includes a face image without the operation of a user.

[Other Example of Classification]

Up until now, model images are simply made to correspond to illustration images based on part correspondence information, but attribute information of a sample person may be assigned to a sample image as a class label and learned for each in the K-class classifier 32. With regard to the attribute information of a sample person, the same sample person is deemed to belong to the same attribute such as race, age, gender, presence of eyeglass, or the like.

By using the K-class classifier 32 where each kind of attribute information is learned as a class label, a part image and a model image can be described in further detail, in comparison to a case where the similarity of the part image and the model image is simply obtained. Therefore, the similarity of the part image and the model image can be obtained more accurately, and a proper illustration image can be selected.

Furthermore, in the embodiment, the portrait image generation device 1 of FIG. 1 is described as a separate device from the pre-processing device 101 of FIG. 32 but the devices can be understood as one constituted by a portrait image generation unit as one processing unit corresponding to the portrait image generation device 1 of FIG. 1 and a pre-processing unit as one processing unit corresponding to the pre-processing device 101 of FIG. 32. In this case, the K-class classifier 32 and the database 35 commonly constituting the devices are generated (set) by a pre-processing unit and used in a portrait image generation process by a portrait image generation unit.

[Description on Computer Applied with Present Invention]

Incidentally, a series of processes described above can be executed by hardware and by software. When the series of processes is executed by software, a program that makes up the software is installed in a computer incorporated into dedicated hardware or, for example, a general-purpose computer that can execute a variety of functions by installing various programs, or the like from a program recording medium.

Figure 43:
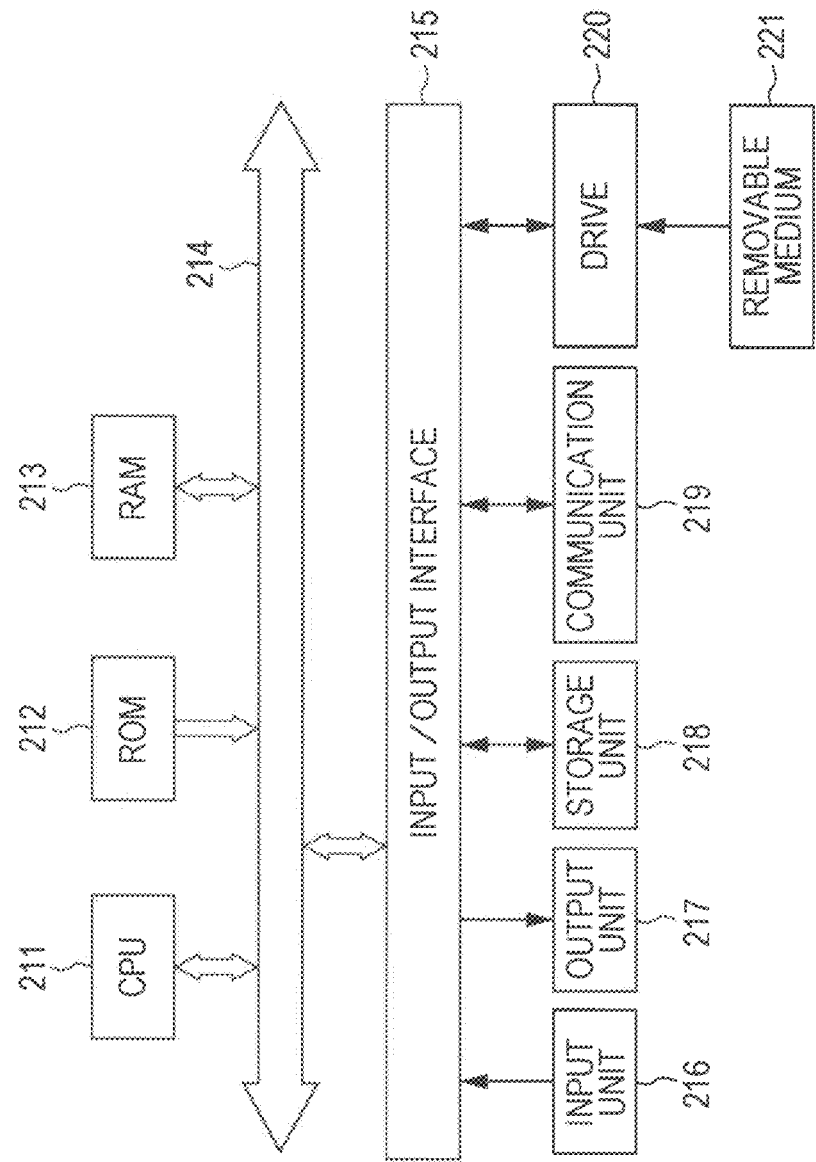
FIG. 43 is a diagram showing the composition of a computer.

FIG. 43 is a diagram showing an example of the composition of a personal computer in which the above-described series of processes is executed by programs. A CPU (Central Processing Unit) 211 executes various processes according to programs recorded in a ROM (Read Only Memory) 212 or a recording unit 218. A RAM (Random Access Memory) 213 appropriately stores programs executed by the CPU 211, data, and the like. The CPU 211, the ROM 212, and the RAM 213 are connected to one another by a bus 214.

The CPU 211 is also connected to an input/output interface 215 via the bus 214. The input/output interface 215 is connected to an input unit 216 including a microphone and the like, and an output unit 217 including a display, a speaker, and the like. The CPU 211 executes a variety of processes responding to commands input from the input unit 216. In addition, the CPU 211 outputs results of the processes to the output unit 217.

A storage unit 218 connected to the input/output interface 215 is constituted by, for example, a hard disk, and stores various data and programs executed by the CPU 211. A communication unit 219 communicates with external devices via a network such as the Internet, a local area network, or the like.

Furthermore, a program may be acquired via the communication unit 219, and stored in the storage unit 218.

A drive 220 connected to the input/output interface 215 drives a mounted removable medium 221 such as a magnetic disc, an optical disc, a magneto-optic disc, a semiconductor memory, or the like, and acquires a program or data recorded thereon. The acquired program or data is transferred to a storage unit 218 and stored if necessary.

As shown in FIG. 43, a program recording medium for storing a program installed in a computer and to be in an activated state by a computer includes the removable medium 221 that is a package medium such as a magnetic disc (including a flexible disc), an optical disc (including CD-ROM (Compact Disc-Read Only Memory) and DVD (Digital Versatile Disc)), a magneto-optic disc, a semiconductor memory or the like, the ROM 212 where a program is stored temporarily or permanently, or a hard disk constituting the storage unit 218. The storage of a program into such a program recording medium is performed by using a wired or wireless communication medium such as a local area network, the Internet, or digital satellite broadcasting via the communication unit 219 that is an interface of a router, a modem or the like if necessary.

Furthermore, in the present specification, steps to execute a program stored in a recording medium may include a process executed in a time series according to the described order, and are necessarily processed in a time series, but may include a process executed individually or in parallel.

The present application contains subject matter related to that disclosed in Japanese Priority Patent Application JP 2010-090716 filed in the Japan Patent Office on Apr. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
circuitry configured to:
detect a face area from a target image;
detect a feature point of the detected face area;
determine an attention area within the face area, wherein the determined attention area is an area to which attention is paid based on the detected feature point;
extract a range of each of a plurality of reference color components from the target image in the determined attention area;
adjust the extracted range of each reference color component of the plurality of reference color components to a corresponding color component range for a modified image generated from the target image as a base such that the corresponding color component range in the modified image for one reference color component of the plurality of reference color components depends on the extracted range of another reference color component of the plurality of reference color components; and
generate the modified image from the target image by drawing the determined attention area using the color component range for the modified image.

2. The information processing device according to claim 1, wherein the attention area is composed of a face outline area, a hair area, and a part area including a predetermined part,
wherein the circuitry is configured to:
extract the range of each reference color component of the plurality of reference color components in the face outline area, the hair area, and the part area,
adjust a grayscale of the extracted range of each reference color component of the plurality of reference color components to a grayscale of the corresponding color component range in the modified image according to a predetermined grayscale converting condition, and
draw the face outline area, the hair area, and the part area based on each of the grayscales in the color component range for the modified image.

3. The information processing device according to claim 2, wherein the circuitry is configured to adjust the grayscale of the extracted range of each reference color component of the plurality of reference color components to the grayscale of the corresponding color component range in the modified image according to the predetermined grayscale converting condition based on face attribute information obtained from the detected face area.

4. The information processing device according to claim 2, wherein the circuitry is configured to adjust the grayscale of the extracted range of each reference color component of the plurality of reference color components to the grayscale of the corresponding color component range in the modified image according to the predetermined grayscale converting condition based on illumination information regarding an illumination state obtained from the target image or information added to the target image.

5. The information processing device according to claim 2, wherein the circuitry is configured to adjust the grayscale of the extracted range of each reference color component of the plurality of reference color components to the grayscale of the corresponding color component range in the modified image according to the predetermined grayscale converting condition based on one or more of: face attribute information comprising information regarding attributes of the detected face or illumination information regarding an illumination state set by a user.

6. The information processing device according to claim 2, wherein the circuitry is configured to:
discriminate a model image to be similar to a part image in the part area from among model images corresponding to modified part images expressed by modifying the predetermined part;
select a modified part image from the modified part images corresponding to the model image according to the discrimination result;
adjust a grayscale of each color component of the plurality of a color components in the selected modified part image based on the grayscale of the corresponding color component range in the modified image; and
draw the modified part image of which the grayscale is adjusted.

7. The information processing device according to claim 6, wherein the target image is a captured image,
wherein the modified image is a portrait image obtained by expressing a face image in the detected face area by a picture, and
wherein the modified part image is an illustration image obtained by expressing the predetermined part by a picture.

8. The information processing device according to claim 1, wherein the circuitry is configured to display the generated modified image.

9. An information processing method to cause an information processing device to perform steps comprising:
detecting a face area from a target image;
detecting a feature point of the detected face area;
determining an attention area within the face area, wherein the determined attention area is an area to which attention is paid based on the detected feature point;
extracting a range of each reference color component of a plurality of reference color components from the target image in the determined attention area;
adjusting the extracted range of each reference color component of the plurality of reference color components to a corresponding color component range for a modified image generated from the target image as a base such that the corresponding color component range in the modified image for one reference color component of the plurality of reference color components depends on the extracted range of another reference color component of the plurality of reference color components; and
generating the modified image from the target image by drawing the determined attention area using the color component range for the modified image.

10. A non-transitory computer-readable medium encoded with computer-readable instructions thereon, the computer-readable instructions when executed by a computer cause the computer to perform a method comprising:
detecting a face area from a target image;
detecting a feature point of the detected face area;
determining an attention area within the face area, wherein the determined attention area is an area to which attention is paid based on the detected feature point;
extracting a range of each of a plurality of reference color components from the target image in the determined attention area;
adjusting the extracted range of each reference color component of the plurality of reference color components to a corresponding color component range for a modified image generated from the target image as a base such that the corresponding color component range in the modified image for one reference color component of the plurality of reference color components depends on the extracted range of another reference color component of the plurality of reference color components; and
generating the modified image from the target image by drawing the determined attention area using the color component range for the modified image.

11. The information processing device according to claim 1, wherein the extracted range of each reference color component of the plurality of reference color components is adjusted based on a red color component range, a green color component range, and a blue color component range.

12. The information processing device according to claim 1, wherein the extracted range of each reference color component of the plurality of reference color components is adjusted based on an average of a red color component range, a green color component range, and a blue color component range.

13. The information processing device according to claim 1, wherein the extracted range of each reference color component of the plurality of reference color components is adjusted based on attribute information of a face detected in the target image.

14. The information processing device according to claim 1, wherein the extracted range of each reference color component of the plurality of reference color components is adjusted based on a difference between an average of a maximum value of a red color component range, a green color component range, and a blue color component range and a minimum value of the color range of the red color component range, the green color component range, and the blue color component range of the extracted reference color range.

15. The information processing device according to claim 1, wherein the circuitry is configured to adjust the extracted range of each reference color component of the plurality of reference color components to the corresponding color component range for the modified image such that a maximum value of the color component range for the modified image is greater than a maximum value of the corresponding extracted range of the plurality of reference color components.

16. The information processing device according to claim 1, wherein a color setting in the color component range for the modified image is based on a difference between a maximum value and a minimum value of the color component range for the modified image, a difference between a maximum value and a minimum value of the extracted range of the corresponding reference color component, and a difference between a color setting of the extracted range of the corresponding reference color component and the minimum value of the extracted range of the corresponding reference color component.

* * * * *